US010623982B2

(12) United States Patent
Tsuda et al.

(10) Patent No.: US 10,623,982 B2
(45) Date of Patent: Apr. 14, 2020

(54) INFORMATION PROCESSING DEVICE FOR DISPLAYING INFORMATION OF BASE STATIONS AROUND PREDICTIVE MIGRATION PATH OF USER

(71) Applicant: Sony Corporation, Tokyo (JP)

(72) Inventors: Shinichiro Tsuda, Kanagawa (JP); Nishiki Mizusawa, Kanagawa (JP); Takashi Usui, Tokyo (JP); Kazuhisa Takamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 14/372,106

(22) PCT Filed: Jan. 11, 2013

(86) PCT No.: PCT/JP2013/000109
§ 371 (c)(1),
(2) Date: Jul. 14, 2014

(87) PCT Pub. No.: WO2013/108606
PCT Pub. Date: Jul. 25, 2013

(65) Prior Publication Data
US 2015/0003236 A1 Jan. 1, 2015

(30) Foreign Application Priority Data

Jan. 20, 2012 (JP) .................................. 2012-009646
Nov. 27, 2012 (JP) .................................. 2012-258370

(51) Int. Cl.
*H04W 28/02* (2009.01)
*H04W 48/20* (2009.01)
(Continued)

(52) U.S. Cl.
CPC ....... *H04W 28/0278* (2013.01); *H04W 4/029* (2018.02); *H04W 28/0226* (2013.01);
(Continued)

(58) Field of Classification Search
CPC ............. H04W 28/0278; H04W 4/029; H04W 28/0226; H04W 48/20; H04W 48/06;
(Continued)

(56) References Cited

U.S. PATENT DOCUMENTS 6,714,785 B1 * 3/2004 Han ...................... H04W 36/32
455/226.2
6,898,432 B1 5/2005 Jiang
(Continued)

FOREIGN PATENT DOCUMENTS

EP 0209930 A1 1/1987
EP 1209930 A2 5/2002
(Continued)

OTHER PUBLICATIONS

International Preliminary Report on Patentability Application No. PCT/JP2013/000109 dated Jun. 5, 2014.
(Continued)

*Primary Examiner* — Ian N Moore
*Assistant Examiner* — Justin T Van Roie
(74) *Attorney, Agent, or Firm* — Chip Law Group

(57) ABSTRACT

An information processing device may include a control unit to control display of information of a base station of a first wireless communication method existing around a predictive migration path by using position information of the information processing device, the information processing device using a second wireless communication method.

23 Claims, 45 Drawing Sheets

(51) Int. Cl.
*H04W 48/06* (2009.01)
*H04W 4/029* (2018.01)
*H04W 64/00* (2009.01)
*H04W 28/08* (2009.01)

(52) U.S. Cl.
CPC ........... *H04W 48/06* (2013.01); *H04W 48/20* (2013.01); *H04W 28/08* (2013.01); *H04W 64/003* (2013.01); *H04W 64/006* (2013.01)

(58) Field of Classification Search
CPC .. H04W 64/006; H04W 28/08; H04W 64/003
See application file for complete search history.

(56) References Cited

U.S. PATENT DOCUMENTS

| | | | |
|---|---|---|---|
| 2002/0002579 A1* | 1/2002 | Holden | G06Q 30/02 709/200 |
| 2002/0110105 A1* | 8/2002 | Awater | H04W 36/22 370/338 |
| 2010/0304742 A1 | 12/2010 | Tsuda | |
| 2011/0158207 A1* | 6/2011 | Alberth, Jr. | G06Q 10/109 370/338 |
| 2011/0310867 A1 | 12/2011 | Kennedy et al. | |
| 2013/0043980 A1* | 2/2013 | Havens | G06K 7/10386 340/10.1 |

FOREIGN PATENT DOCUMENTS

| | | | |
|---|---|---|---|
| JP | 2003209870 A | | 7/2003 |
| JP | 2004072546 A | | 3/2004 |
| JP | 2004235976 A | | 8/2004 |
| JP | 2004328389 A | | 11/2004 |
| JP | 2004357181 A | | 12/2004 |
| JP | 2005136660 A | | 5/2005 |
| JP | 2006332753 A | | 12/2006 |
| JP | 2010066820 A | | 3/2010 |
| JP | 2011-010267 A | | 1/2011 |
| JP | 2011019195 A | | 1/2011 |
| JP | 2013516938 A | | 5/2013 |
| WO | 03-102730 A2 | | 12/2003 |
| WO | 2010026799 A1 | | 3/2010 |
| WO | 2011087267 A2 | | 7/2011 |
| WO | 2011/132546 A1 | | 10/2011 |
| WO | 2011132546 A1 | | 10/2011 |
| WO | 2013/059696 A2 | | 4/2013 |
| WO | 2003/102730 A2 | | 12/2013 |

OTHER PUBLICATIONS

International Search Report from International Publication PCT/JP2013/000109 dated Jul. 18, 2013.
Japanese Office Action dated Oct. 13, 2015 in patent application No. 2012258370.
Office Action for CN Patent Application No. 201380005259.9, dated Jun. 26, 2017, 08 pages of Office Action and 12 pages of English Translation.
Extended European Search Report of EP Patent Application No. 13716068.5, dated Aug. 3, 2017, 08 pages.

\* cited by examiner

[Fig. 1]
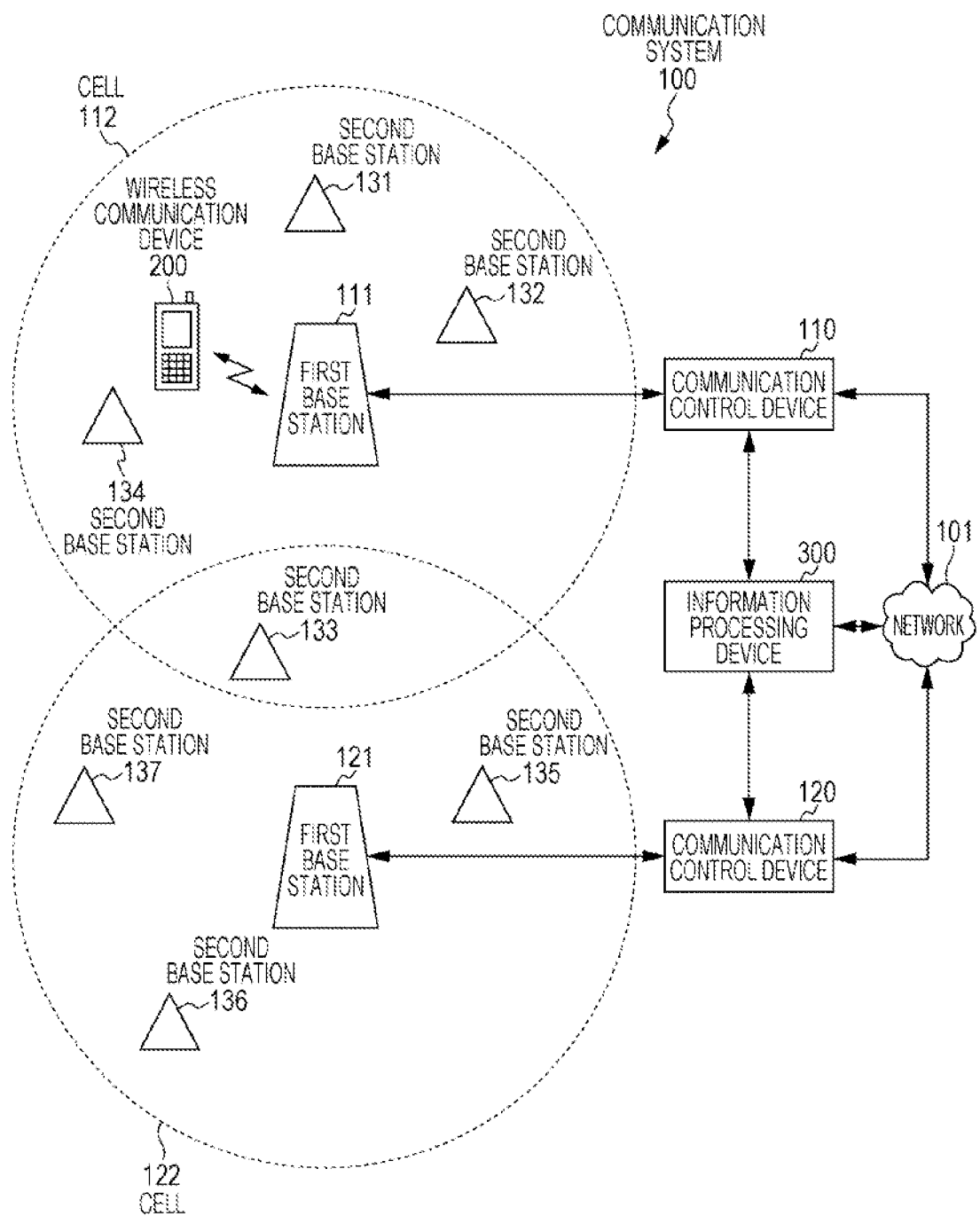

[Fig. 2]
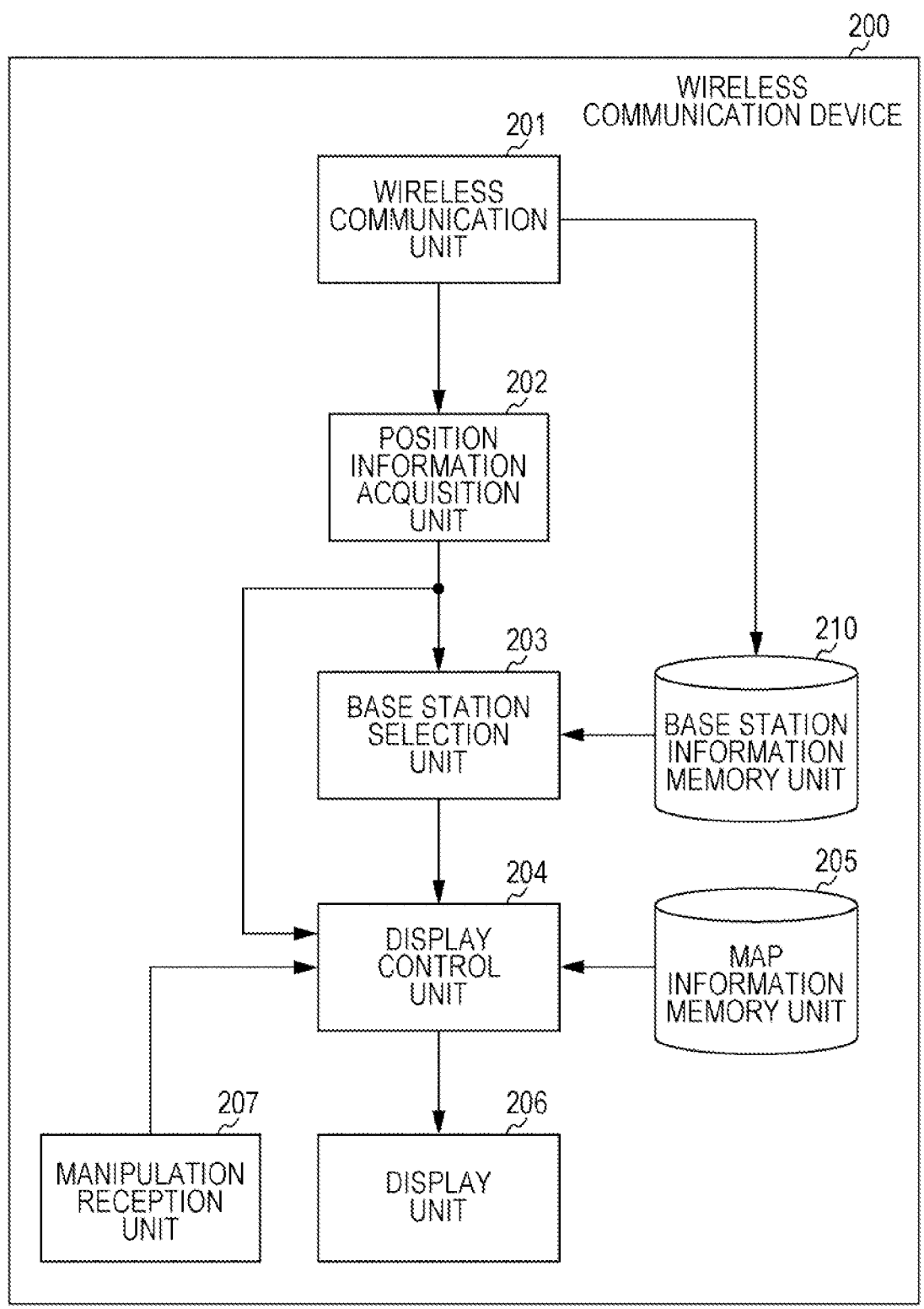

[Fig. 3]

BASE STATION INFORMATION MEMORY UNIT 210

| GROUP INFORMATION 211 | BASE STATION IDENTIFICATION INFORMATION (CELL ID) 212 | POSITION INFORMATION 213 | CONGESTION DEGREE INFORMATION 214 | COMMUNICATION COST INFORMATION (YEN/MB) 215 |
|---|---|---|---|---|
| FIRST GROUP | a98122 | LATITUDE : ○°○'<br>LONGITUDE : ○°△' | 5 | 0.17 |
|  | a95555 | LATITUDE : ○°□'<br>LONGITUDE : ○°○' | 4 | 0.23 |
|  | ... | ... | ... | ... |
| SECOND GROUP | a97777 | LATITUDE : △°○'<br>LONGITUDE : □°○' | 2 | 0 |
|  | ... | ... | ... | ... |

[Fig. 4]
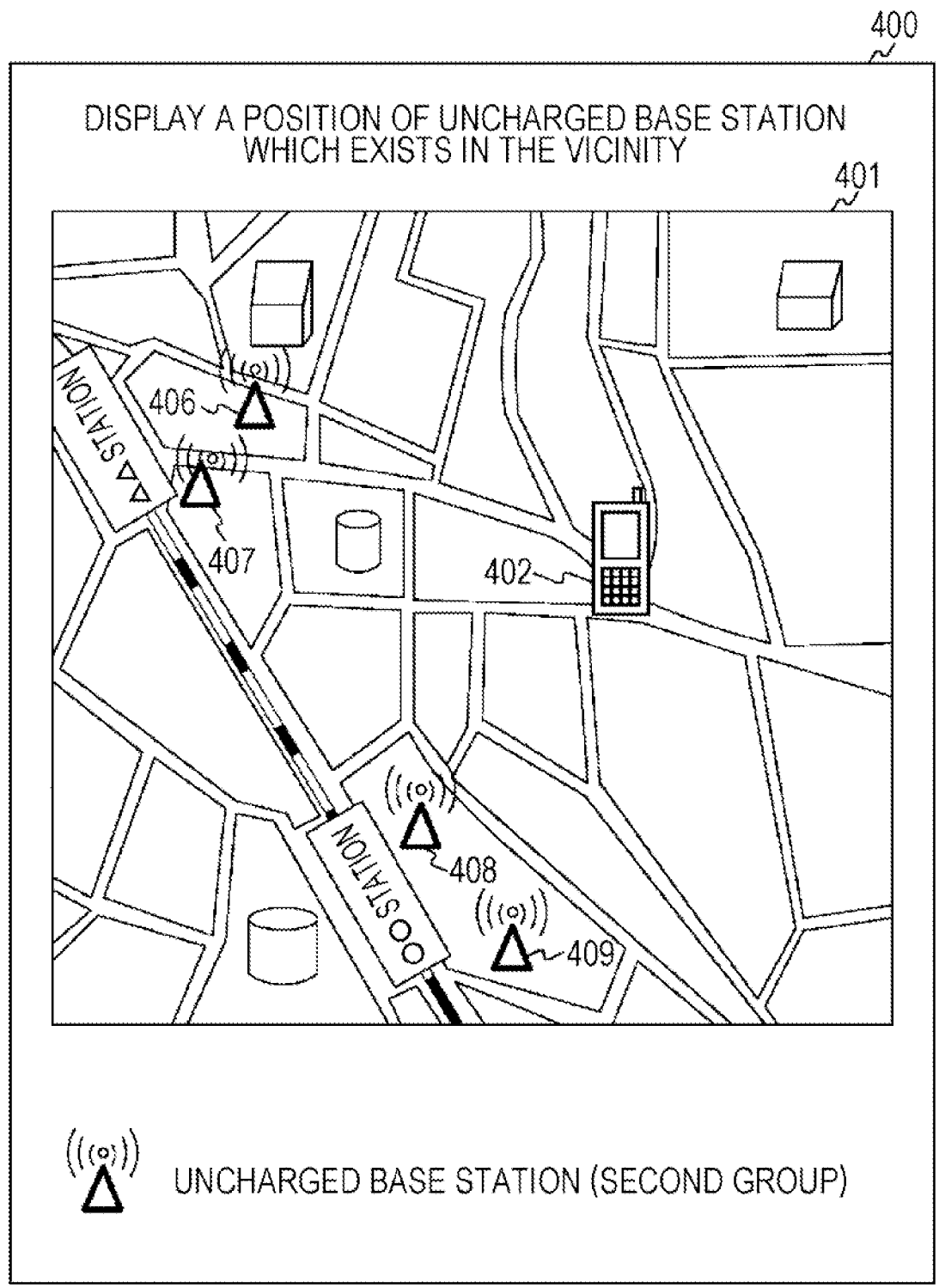

[Fig. 5]
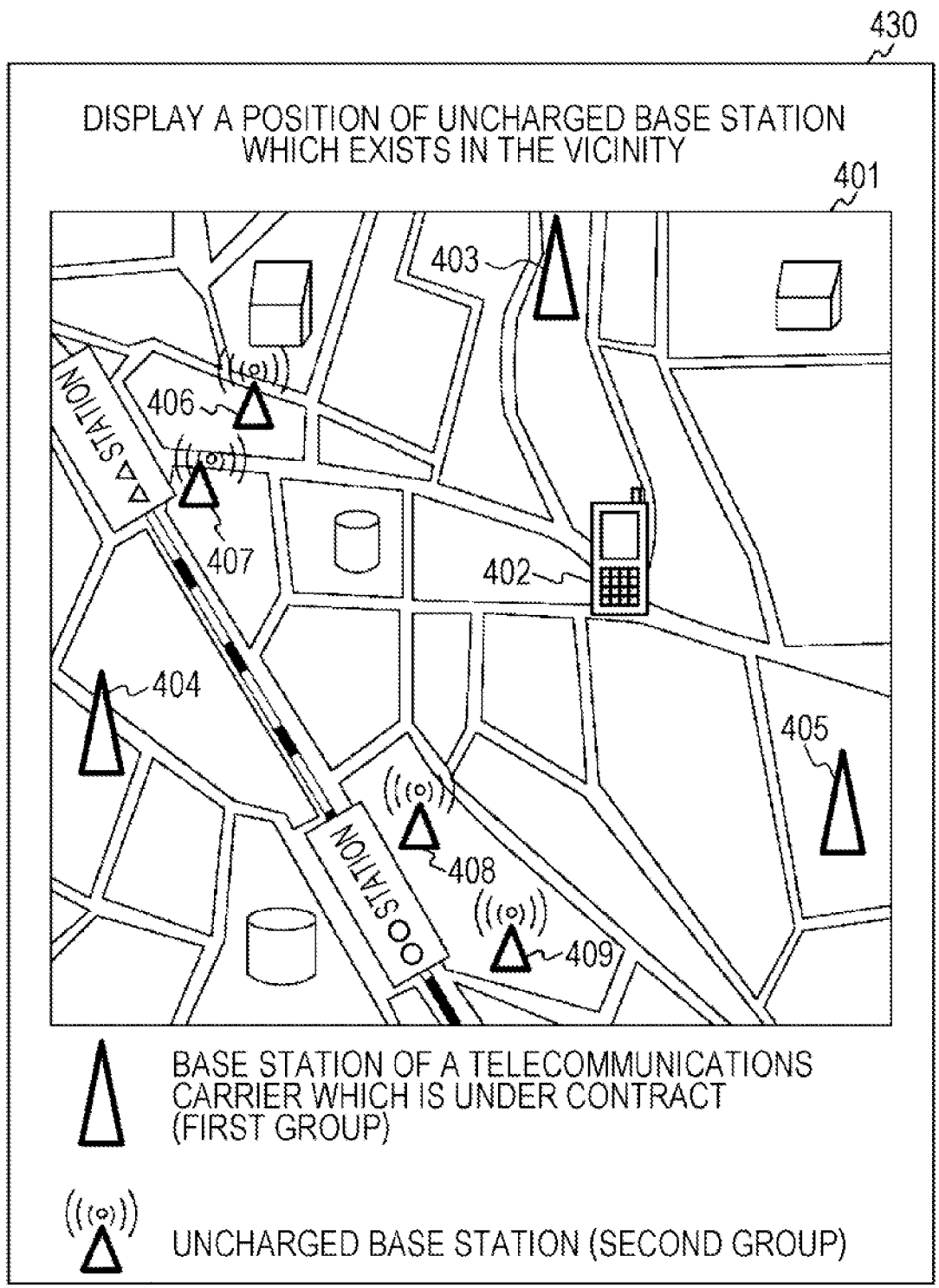

[Fig. 6]
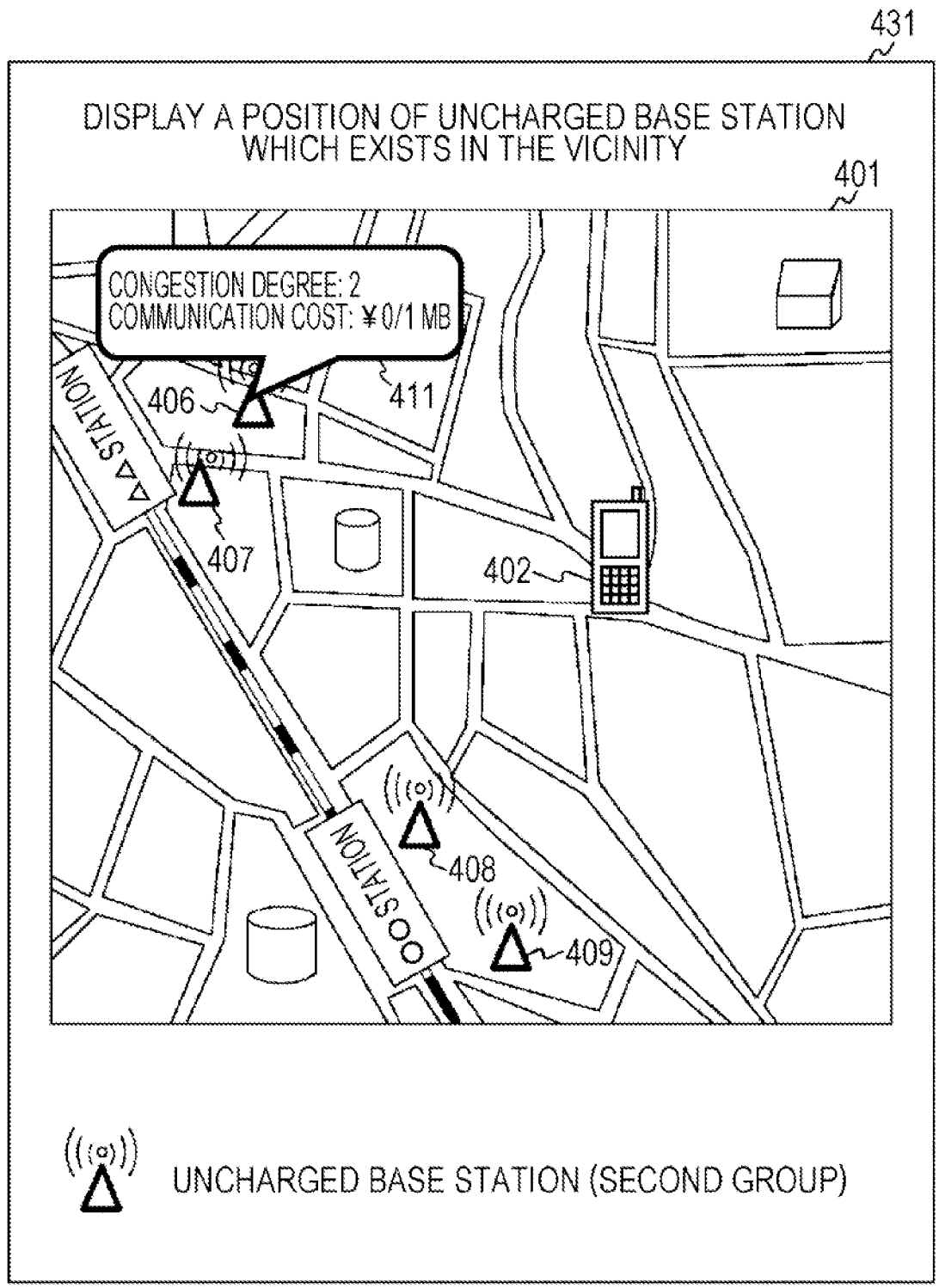

[Fig. 7]
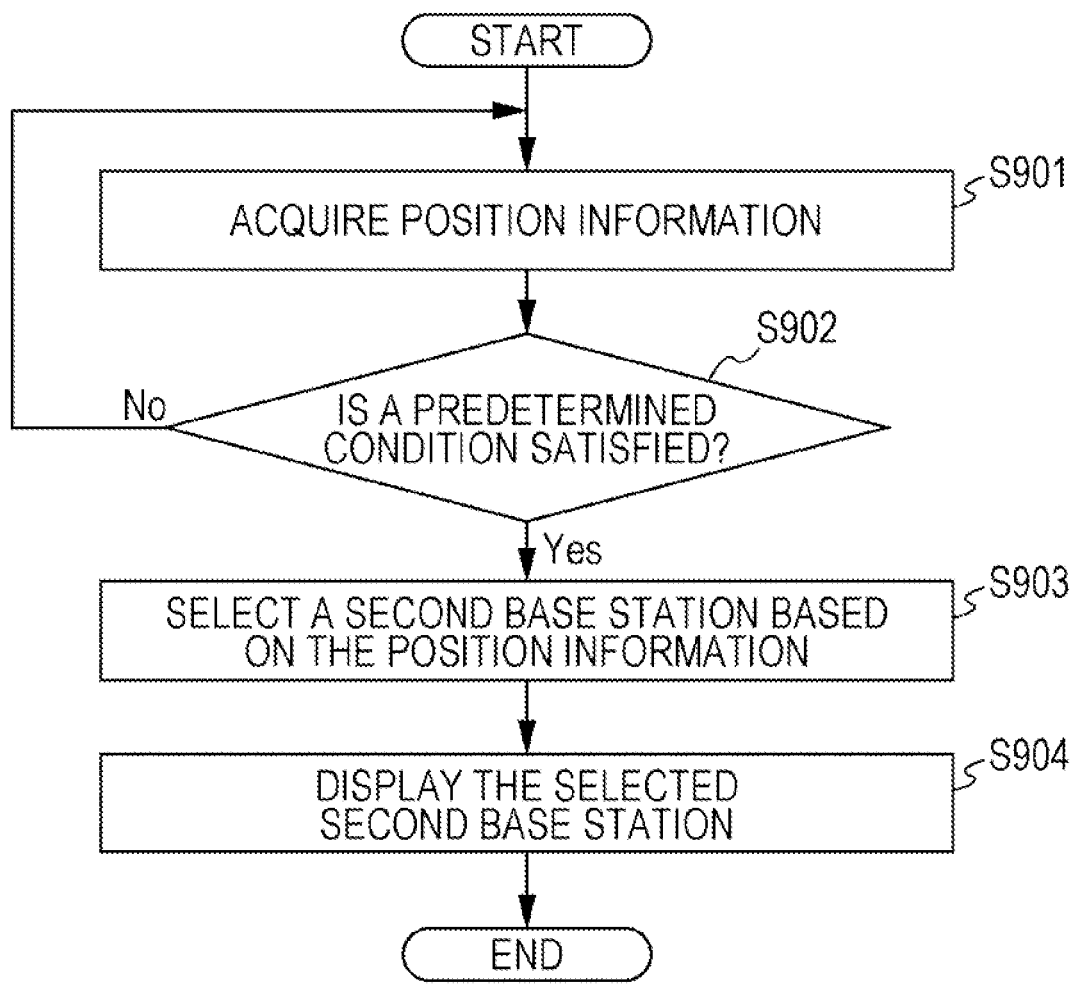

[Fig. 8]
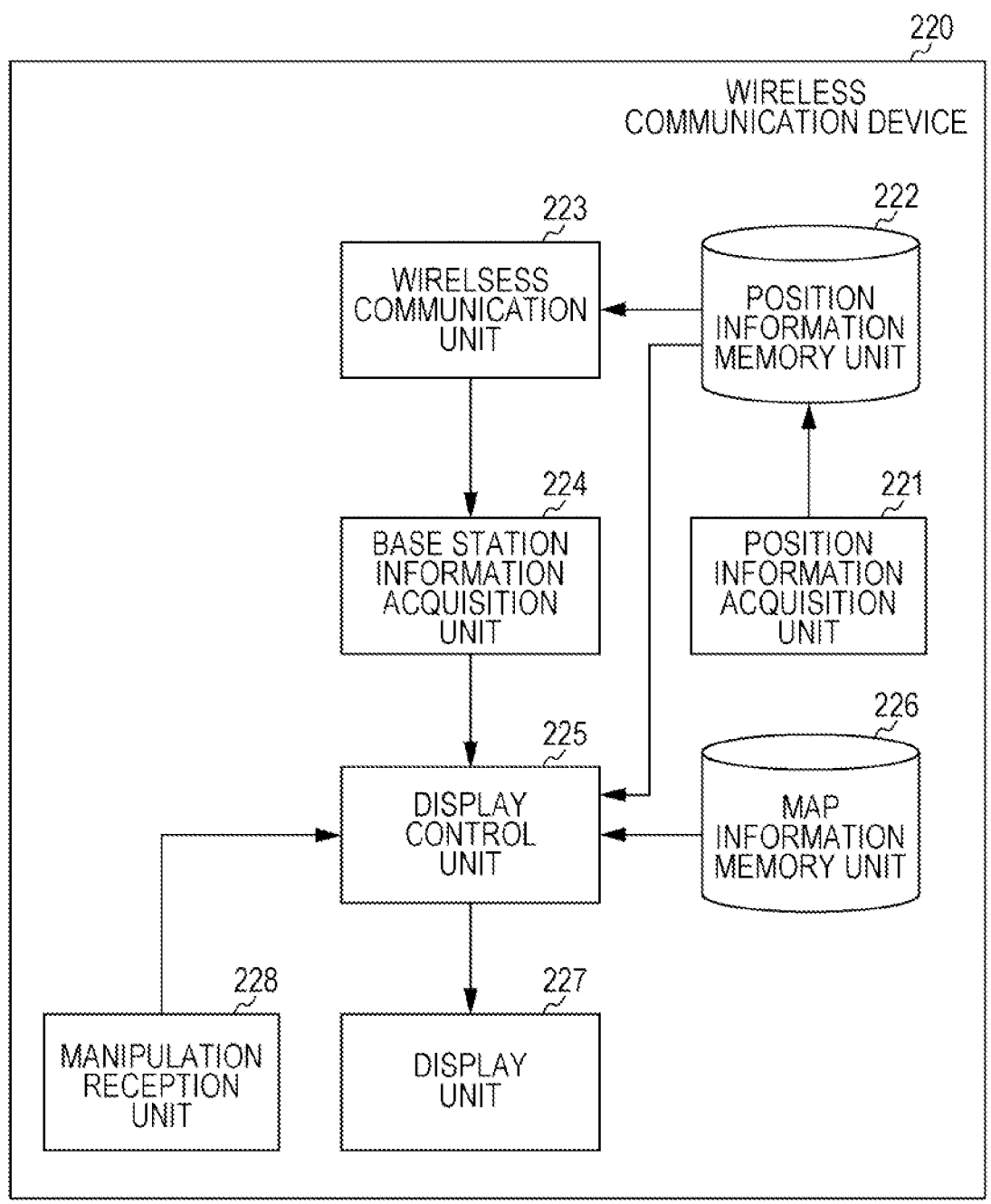

[Fig. 9]
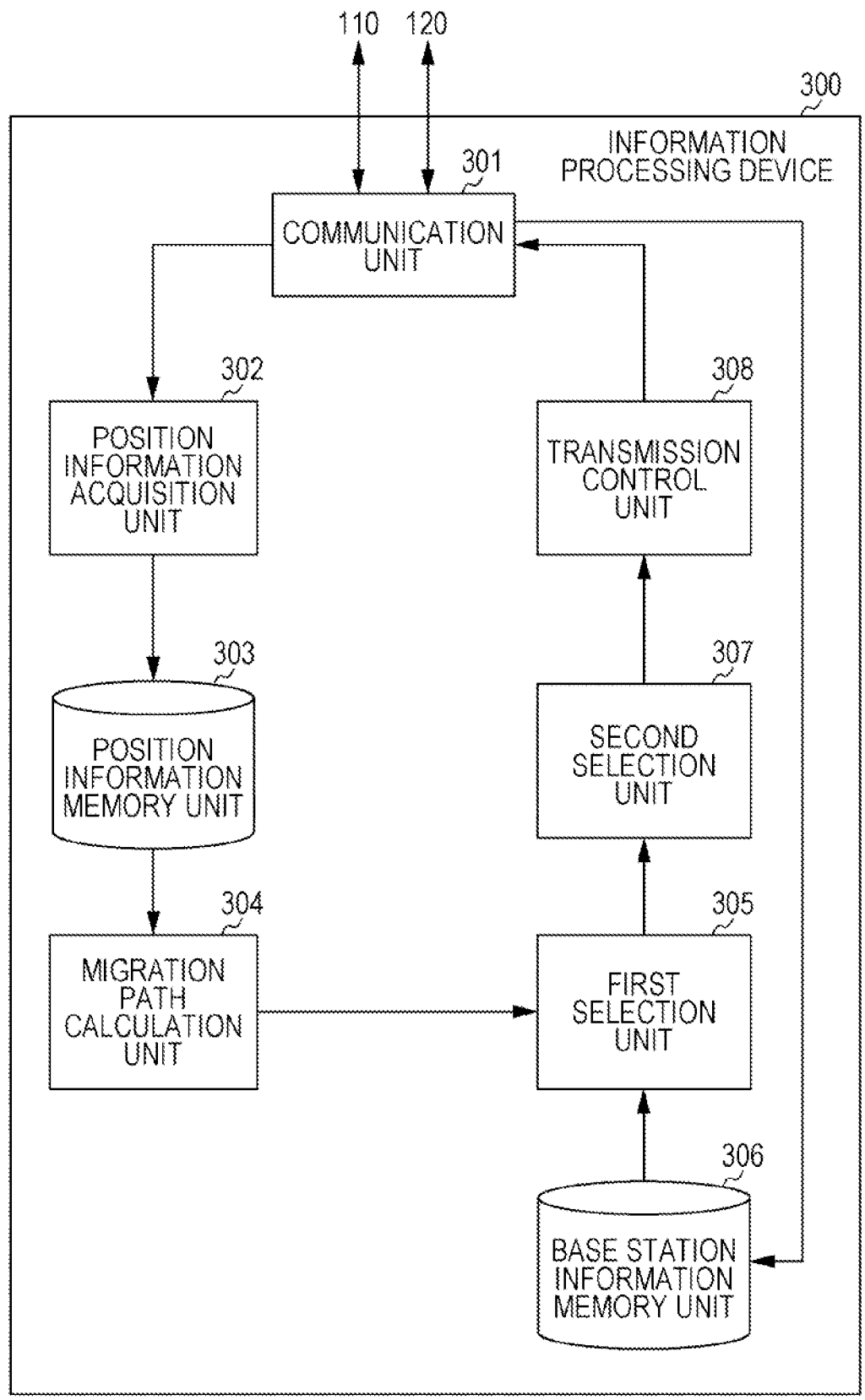

[Fig. 10]
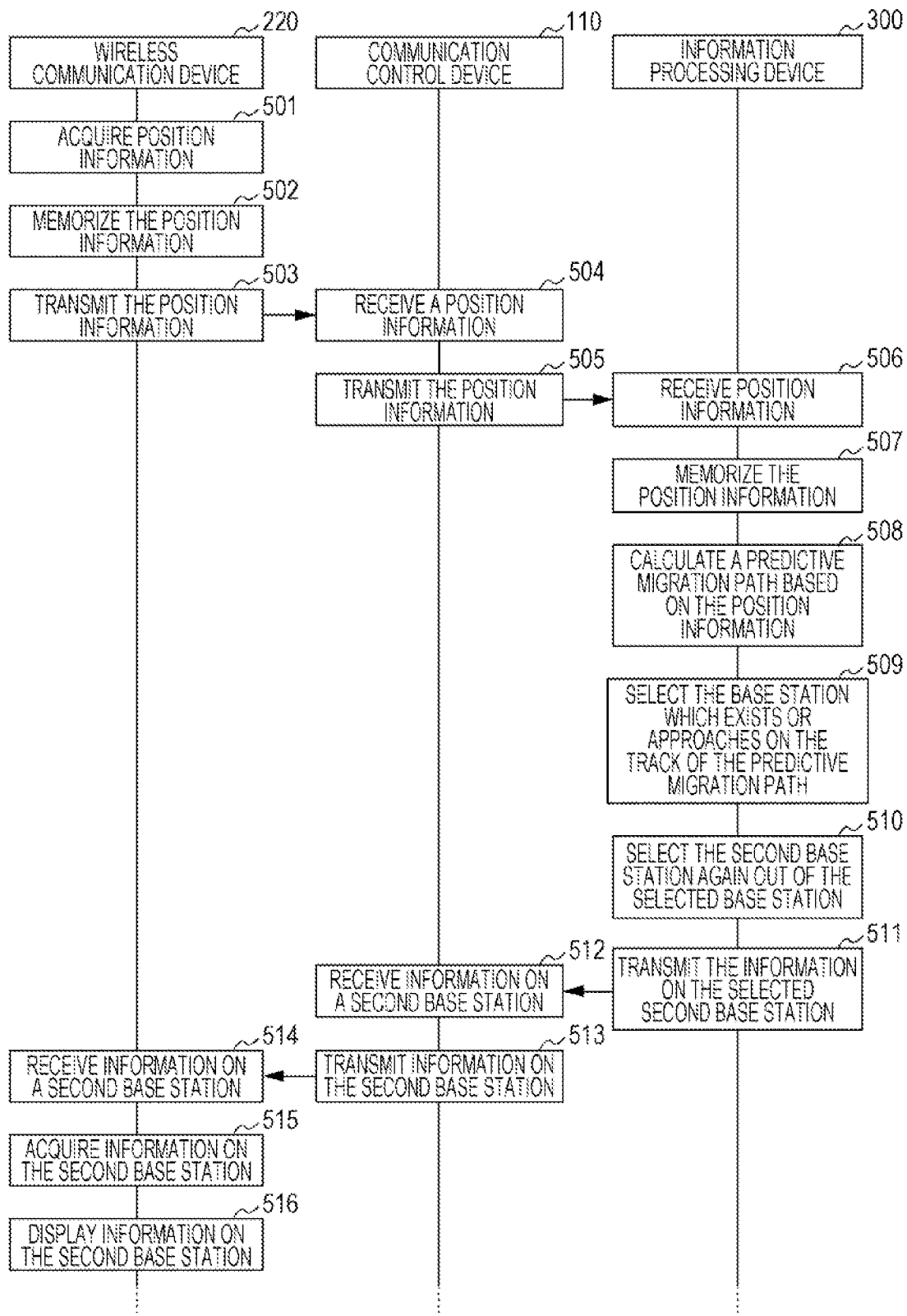

[Fig. 11]
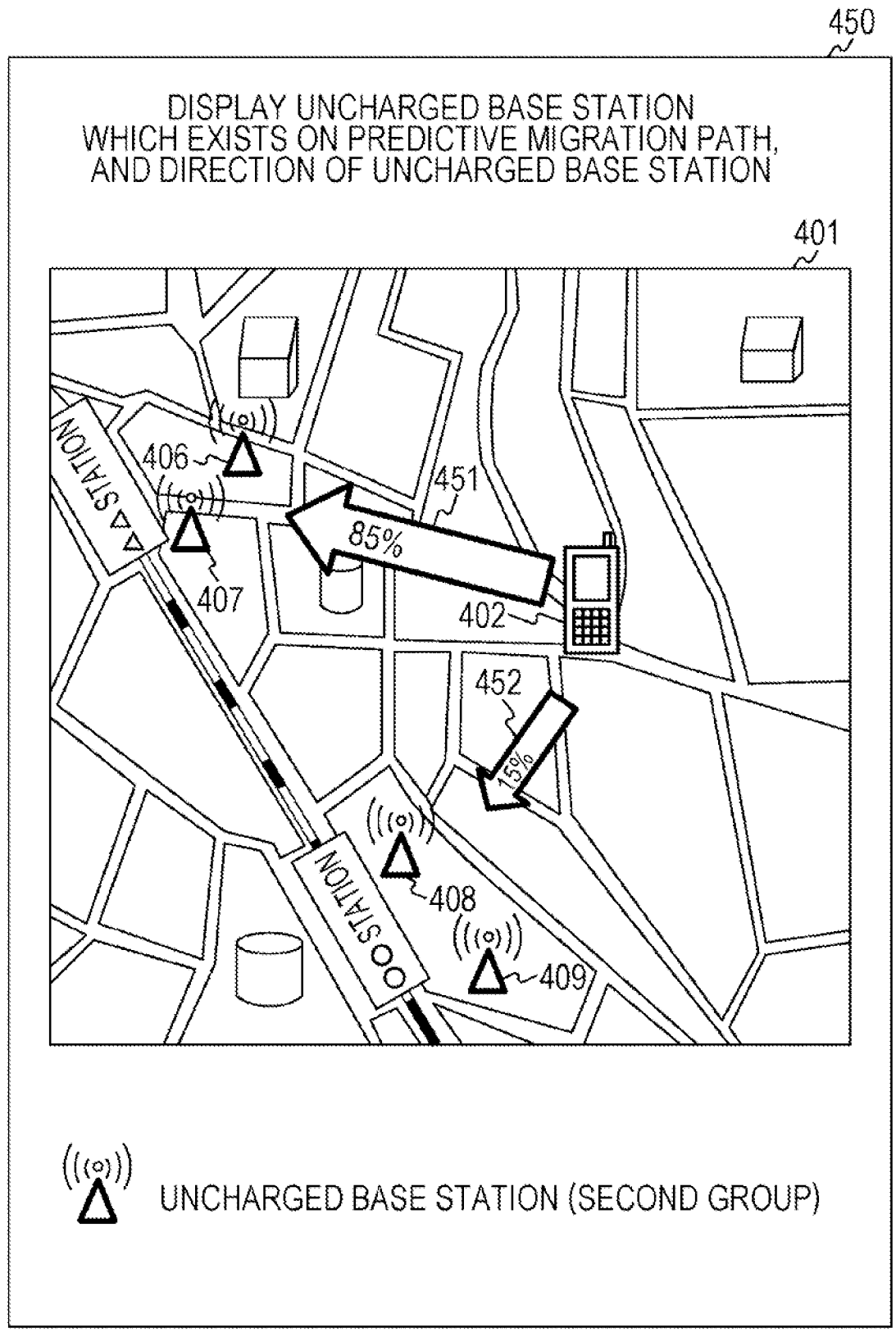

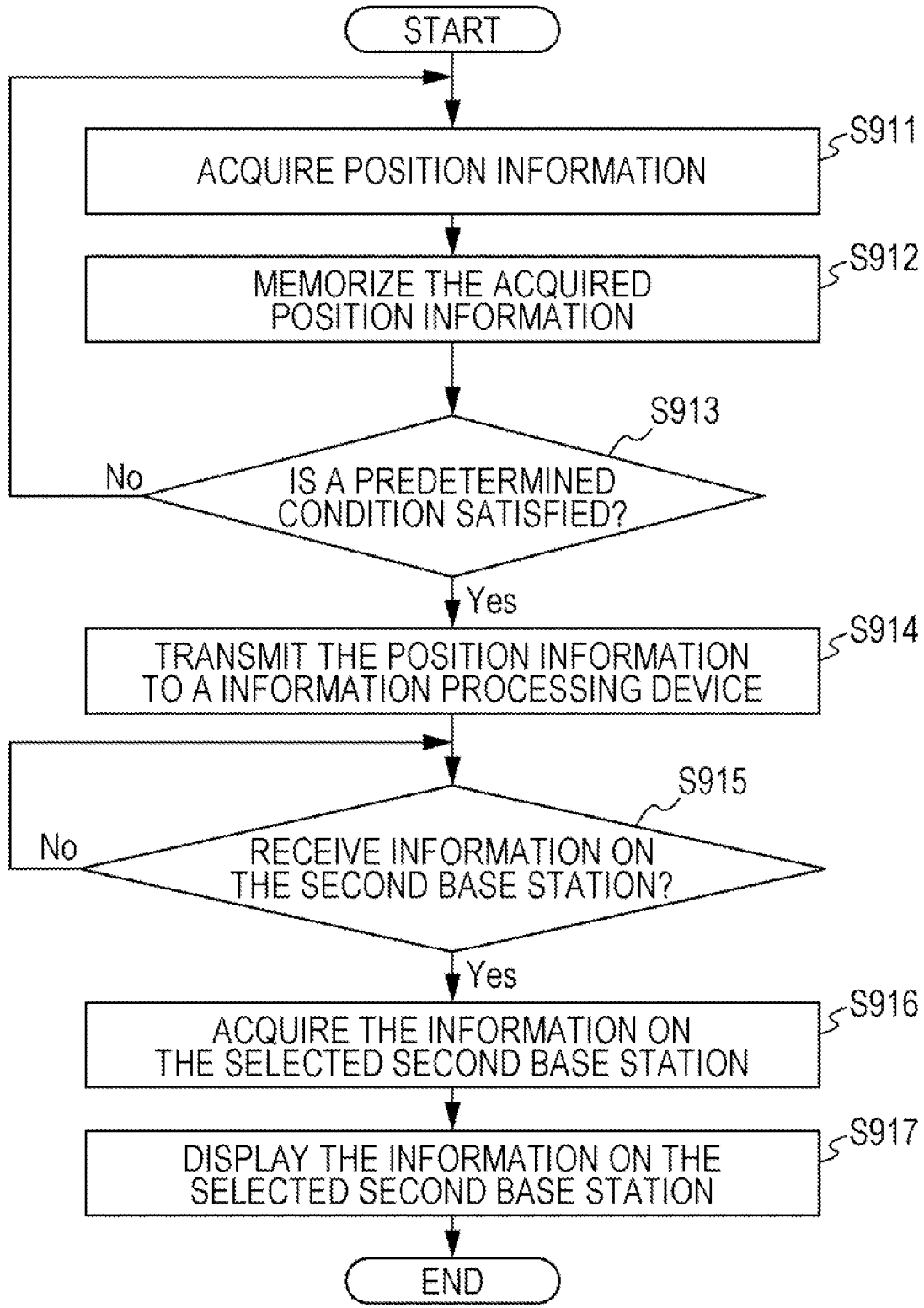
[Fig. 12]

[Fig. 13]
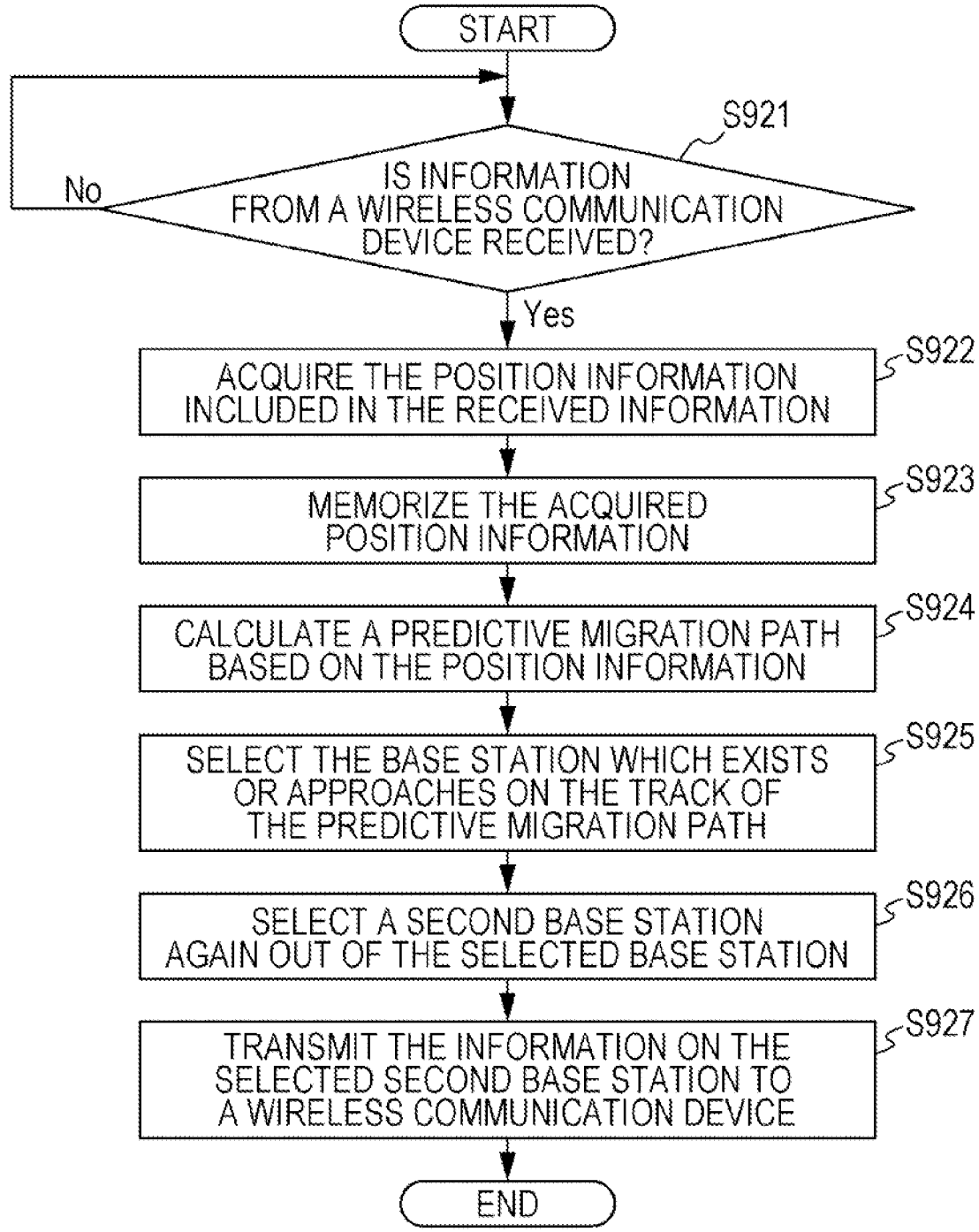

[Fig. 14]
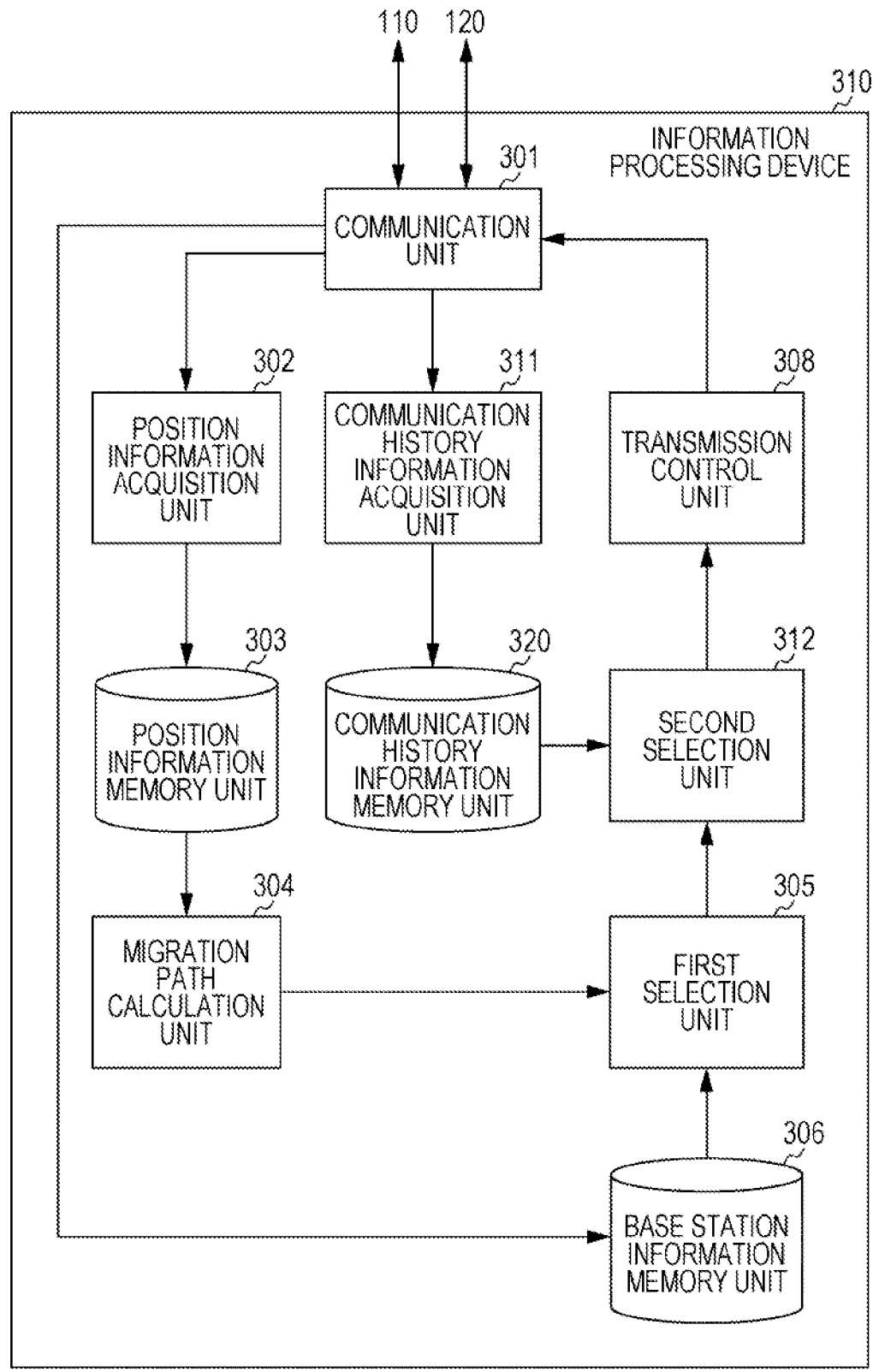

[Fig. 15]

| COMMUNICATION HISTORY INFORMATION MEMORY UNIT 320 | | | | | |
|---|---|---|---|---|---|
| TERMINAL IDENTIFICATION INFORMATION 321 | POSITION INFORMATION 322 | COMMUNICATION DATE AND TIME INFORMATION 323 | COMMUNICATION TRAFFIC INFORMATION 324 | COMMUNICATION COST INFORMATION (YEN/MB) 325 |
| 0001 | LATITUDE : ○°○' <br> LONGITUDE : ○°○' | START : 1.20.2012 PM △:△ <br> END : 1.20.2012 PM □:□ | 5 M | 0 |
| 0002 | ... | ... | ... | ... |
| ... | ... | ... | ... | ... |
| 0107 | ... | ... | ... | ... |
| ... | ... | ... | ... | ... |

[Fig. 16]
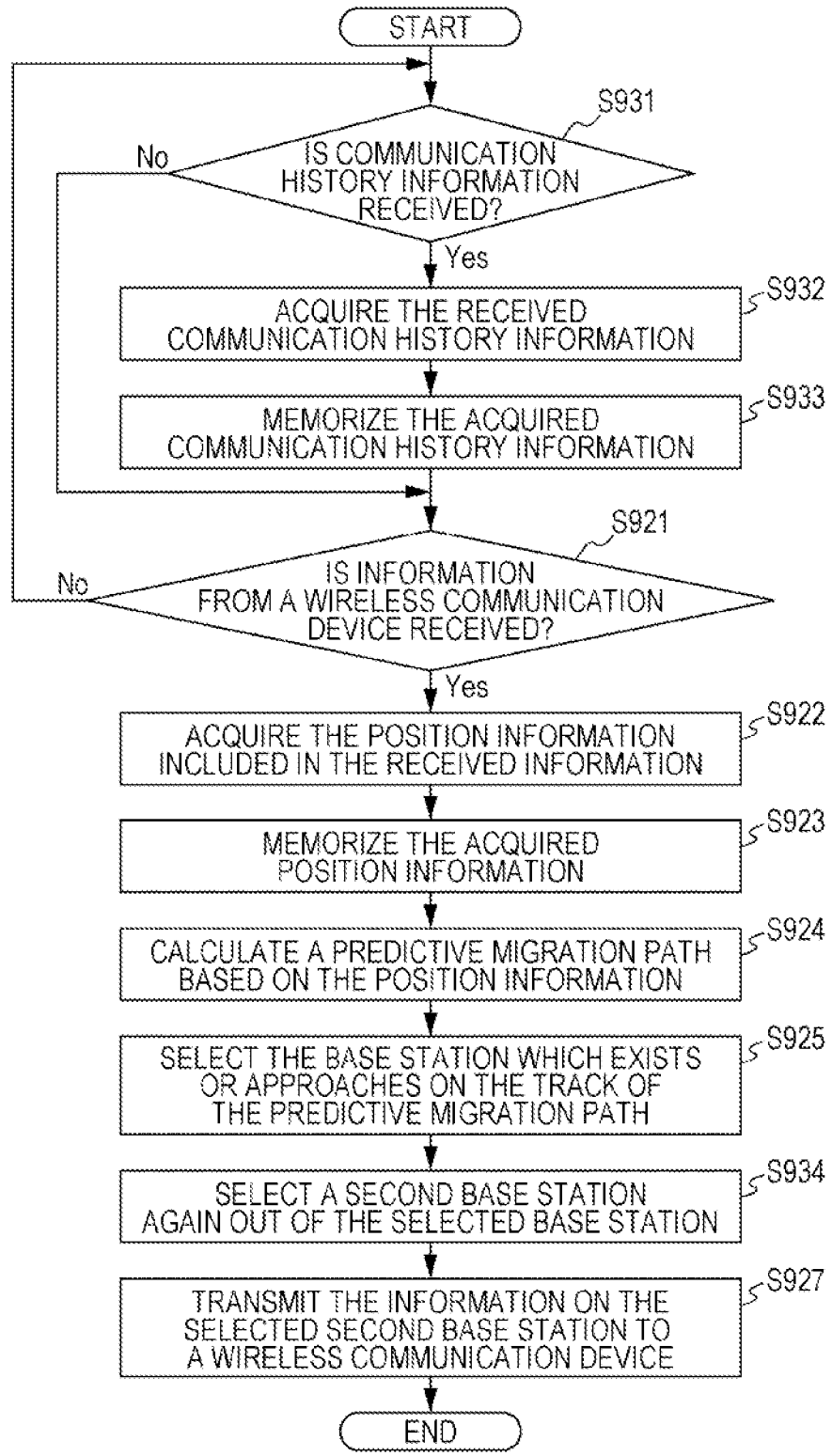

[Fig. 17]
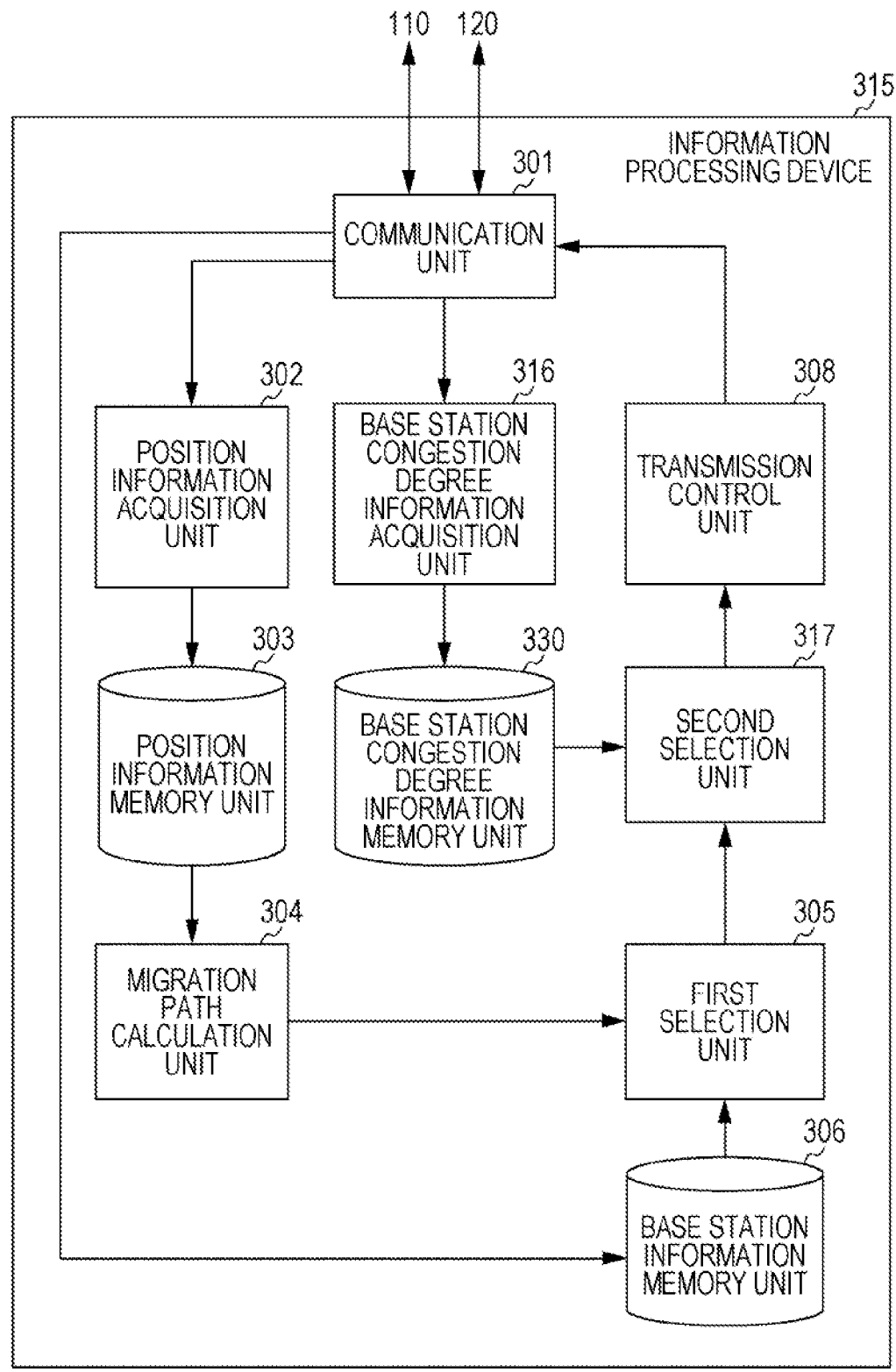

[Fig. 18]

BASE STATION
CONGESTION DEGREE
INFORMATION MEMORY UNIT
330

| IDENTIFICATION INFORMATION (CELL ID) 331 | DATE AND TIME INFORMATION 332 | CONGESTION DEGREE INFORMATION 333 |
|---|---|---|
| a98122 | 1.20.2012 PM △:□ | 5 |
| a95555 | 1.22.2012 PM △:○ | 3 |
| ⋮ | ⋮ | ⋮ |
| a95551 | 1.20.2012 PM ○:□ | 4 |
| ⋮ | ⋮ | ⋮ |

[Fig. 19]
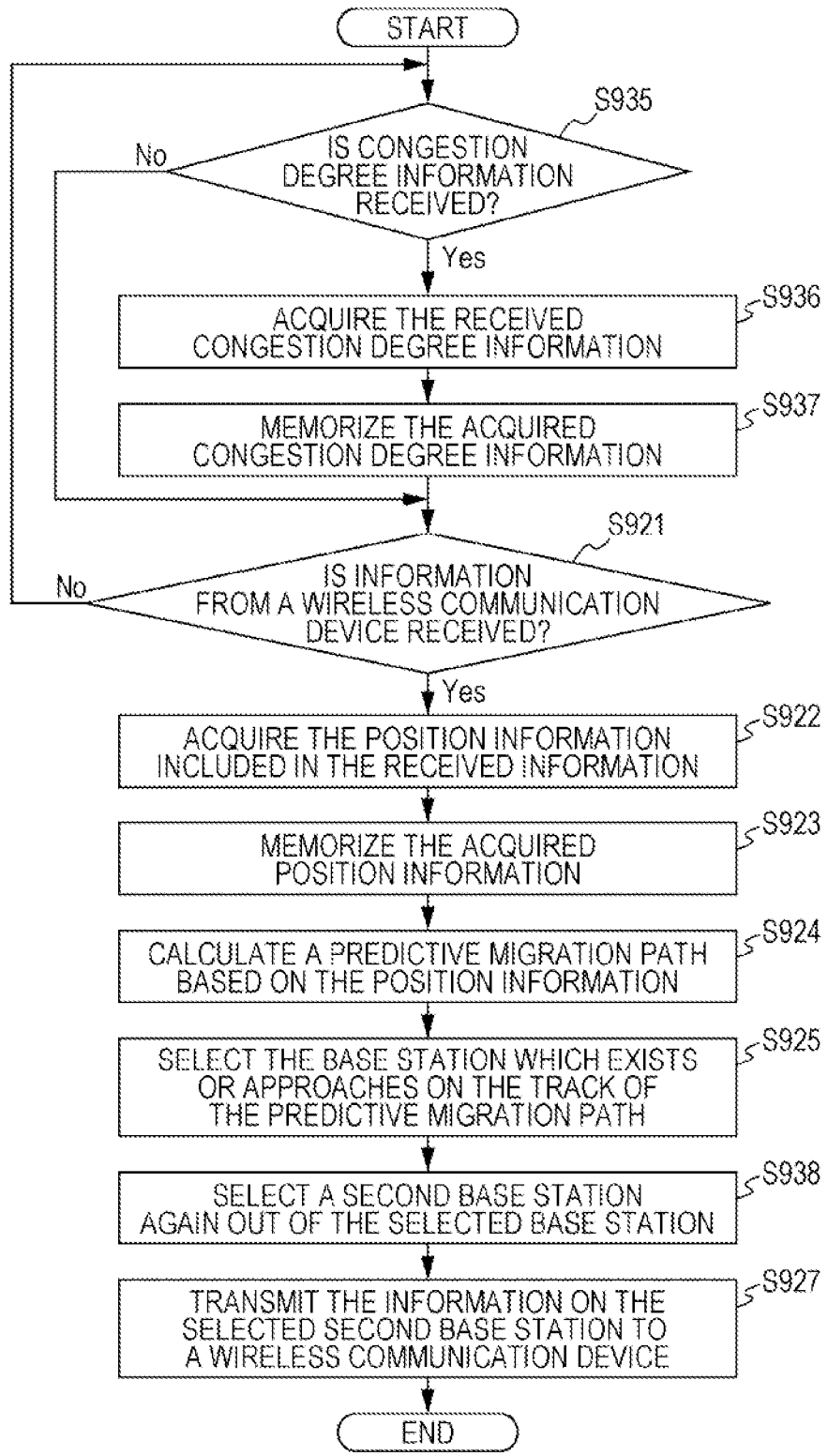

[Fig. 20]
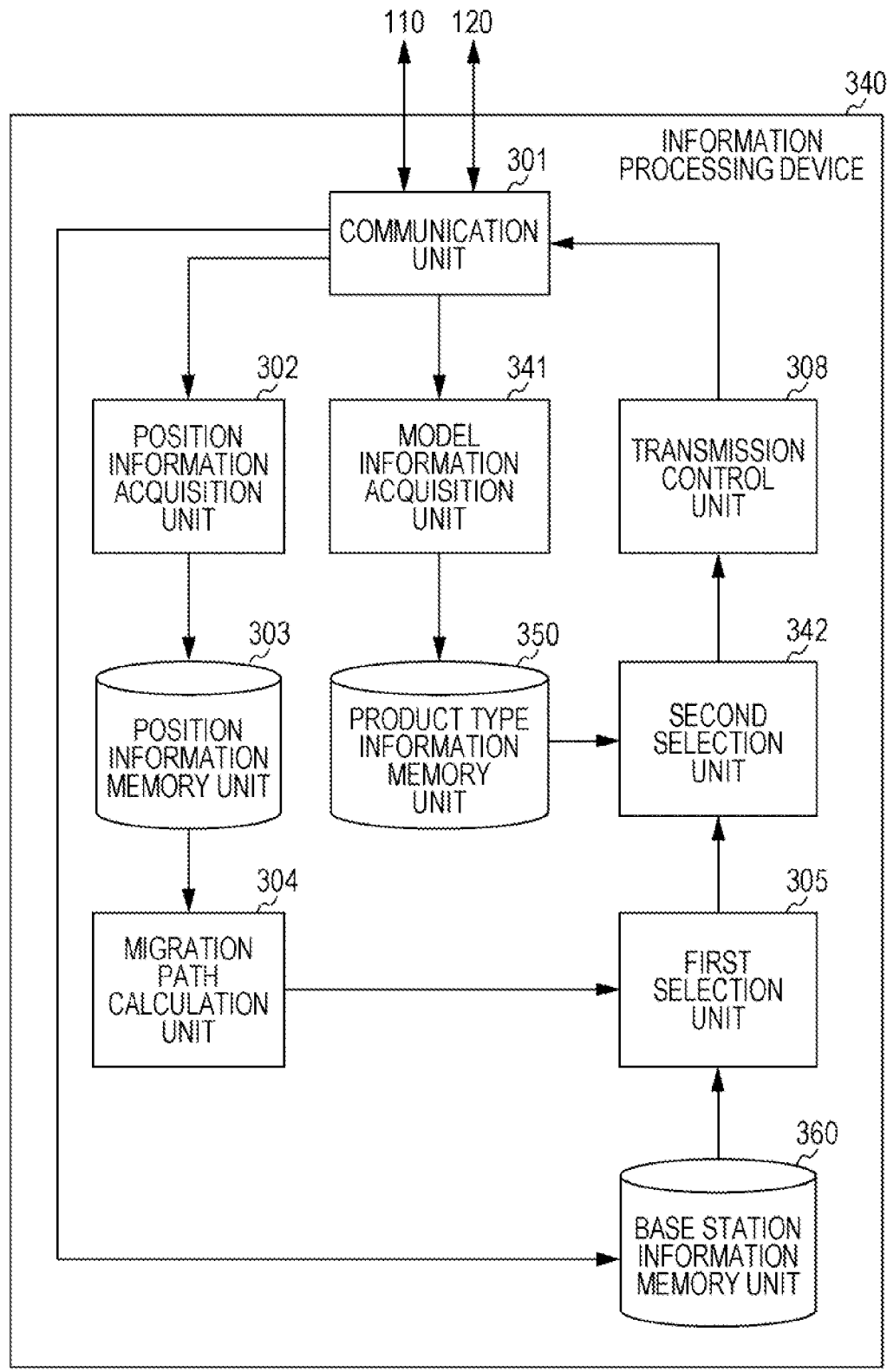

[Fig. 21]

PRODUCT TYPE
INFORMATION
MEMORY UNIT
350

| TERMINAL IDENTIFICATION INFORMATION | PRODUCT TYPE NAME | MODEL NAME | TYPE NAME | MODEL NUMBER | OS VERSION |
|---|---|---|---|---|---|
| 0001 | ... | ... | ... | ... | ... |
| 0002 | ... | ... | ... | ... | ... |
| ⋮ | ⋮ | ⋮ | ⋮ | ⋮ | ⋮ |
| 0107 | ... | ... | ... | ... | ... |
| ⋮ | ⋮ | ⋮ | ⋮ | ⋮ | ⋮ |

BASE STATION INFORMATION MEMORY UNIT 360

| GROUP INFORMATION 361 | BASE STATION IDENTIFICATION INFORMATION (CELL ID) 362 | POSITION INFORMATION 363 | CONGESTION DEGREE INFORMATION 364 | | TIMESLOT INFORMATION 365 | COMMUNICATION COST INFORMATION (YEN/PACKET) 366 | TABLET 367 | SMARTPHONE 368 | MOBILE PHONE 369 |
|---|---|---|---|---|---|---|---|---|---|
| | | | CURRENT | AFTER 10 MINUTES | | | | | |
| FIRST GROUP | ... | ... | ... | ... | ... | ... | ... | ... | ... |
| | ... | ... | ... | ... | ... | ... | ... | ... | ... |
| SECOND GROUP | a98761 | LATITUDE : 35.681382 LONGITUDE : 139.766084 | 1 | 1 | 1:00–7:00 | 0.12 | 1 | 1 | 1 |
| | | | | | 7:00–13:00 | 0.25 | 0 | 1 | 1 |
| | | | | | 13:00–1:00 | 0.30 | 0 | 0 | 1 |
| | a98762 | LATITUDE : 35.665498 LONGITUDE : 139.75964 | 1 | 2 | 1:00–7:00 | 0.12 | 1 | 1 | 1 |
| | | | | | 7:00–13:00 | 0.21 | 0 | 1 | 1 |
| | | | | | 13:00–1:00 | 0.25 | 0 | 1 | 1 |
| | a98763 | LATITUDE : 35.675069 LONGITUDE : 139.763328 | 2 | 4 | 1:00–7:00 | 0.12 | 1 | 1 | 1 |
| | | | | | 7:00–13:00 | 0.18 | 0 | 0 | 1 |
| | | | | | 13:00–1:00 | 0.20 | 0 | 0 | 1 |
| | ... | ... | ... | ... | ... | ... | ... | ... | ... |
| | a99999 | LATITUDE : 35.69384 LONGITUDE : 138.703549 | 1 | 1 | 1:00–7:00 | 0.00 | 1 | 1 | 1 |
| | | | | | 7:00–13:00 | 0.01 | 1 | 1 | 1 |
| | | | | | 13:00–1:00 | 0.01 | 1 | 1 | 1 |
| | ... | ... | ... | ... | ... | ... | ... | ... | ... |

[Fig. 23]
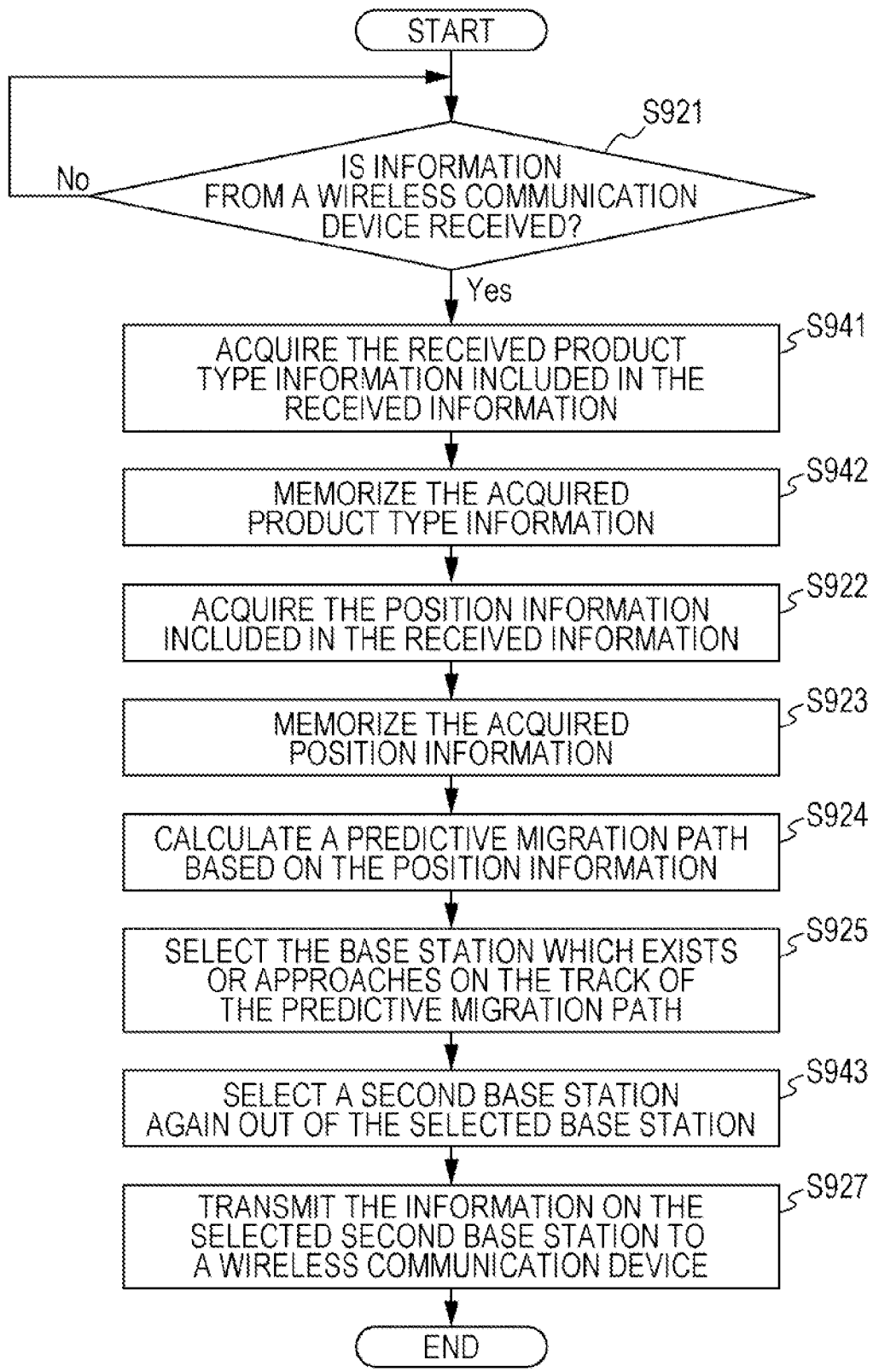

[Fig. 24]
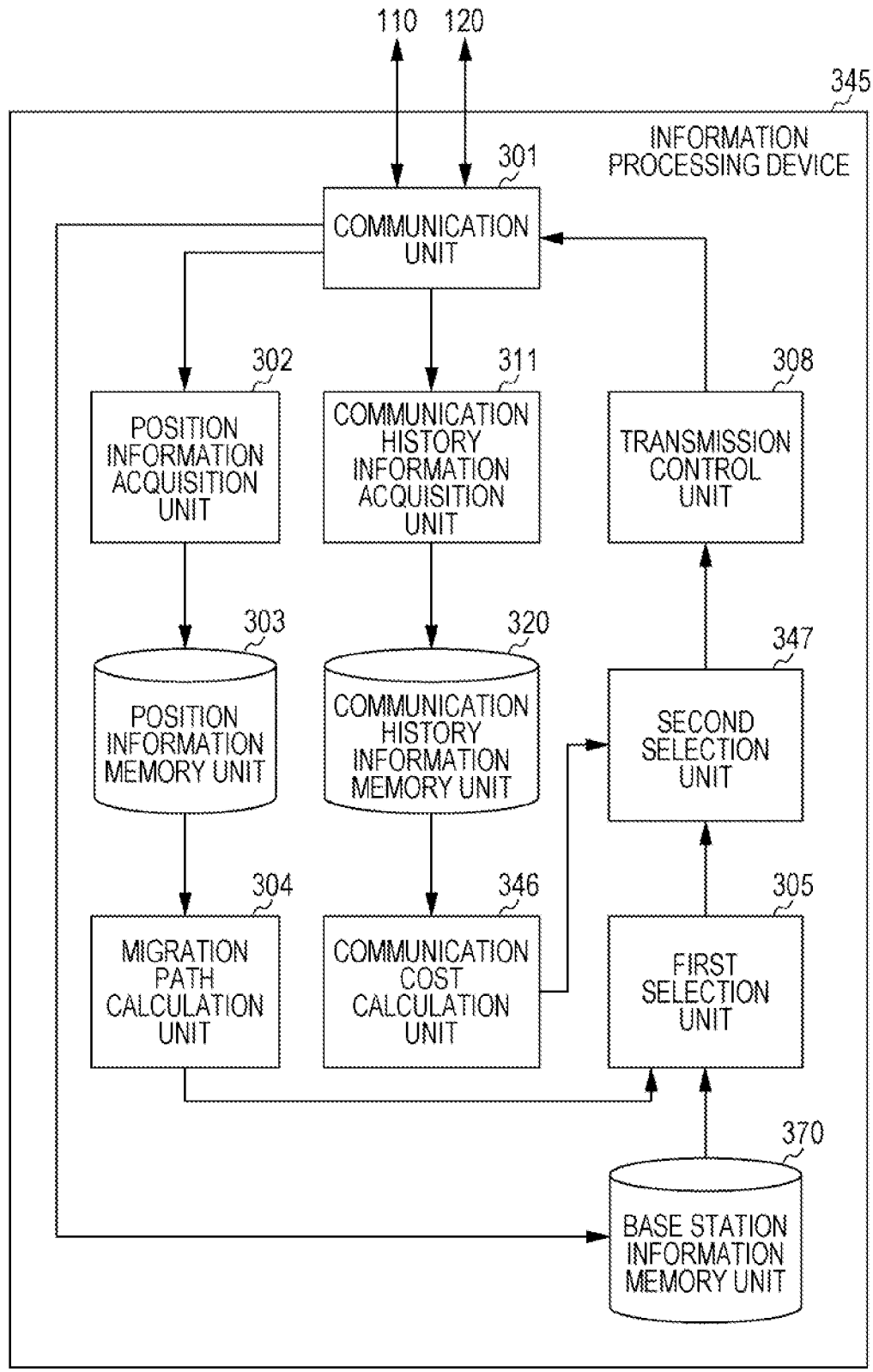

[Fig. 25]

BASE STATION INFORMATION MEMORY UNIT 370

| GROUP INFORMATION (361) | PREMIUM SERVICE INFORMATION (371) | BASE STATION IDENTIFICATION INFORMATION (CELL ID) (362) | POSITION INFORMATION (363) | CONGESTION DEGREE INFORMATION (364) CURRENT | CONGESTION DEGREE INFORMATION (364) AFTER 10 MINUTES | TIMESLOT INFORMATION (365) | COMMUNICATION COST INFORMATION (YEN/PACKET) (366) | TABLET (367) | SMARTPHONE (368) | MOBILE PHONE (369) |
|---|---|---|---|---|---|---|---|---|---|---|
| FIRST GROUP | 1 | ... | ... | ... | ... | ... | ... | ... | ... | ... |
| SECOND GROUP | 0 | a98761 | LATITUDE : 35.681382 LONGITUDE : 139.766084 | 1 | 1 | 1:00–7:00 | 0.12 | 1 | 1 | 1 |
| | | | | | | 7:00–13:00 | 0.25 | 0 | 1 | 1 |
| | | | | | | 13:00–1:00 | 0.30 | 0 | 0 | 1 |
| | 0 | a98762 | LATITUDE : 35.665498 LONGITUDE : 139.75964 | 1 | 2 | 1:00–7:00 | 0.12 | 1 | 1 | 1 |
| | | | | | | 7:00–13:00 | 0.21 | 0 | 1 | 1 |
| | | | | | | 13:00–1:00 | 0.25 | 0 | 0 | 1 |
| | 0 | a98763 | LATITUDE : 35.675069 LONGITUDE : 139.763328 | 2 | 4 | 1:00–7:00 | 0.12 | 1 | 1 | 1 |
| | | | | | | 7:00–13:00 | 0.18 | 0 | 0 | 1 |
| | | | | | | 13:00–1:00 | 0.20 | 0 | 0 | 1 |
| | ... | ... | ... | ... | ... | ... | ... | ... | ... | ... |
| | 1 | a99999 | LATITUDE : 35.69384 LONGITUDE : 138.703549 | 1 | 1 | 1:00–7:00 | 0.00 | 1 | 1 | 1 |
| | | | | | | 7:00–13:00 | 0.01 | 1 | 1 | 1 |
| | | | | | | 13:00–1:00 | 0.01 | 1 | 1 | 1 |
| ... | ... | ... | ... | ... | ... | ... | ... | ... | ... | ... |

[Fig. 26]
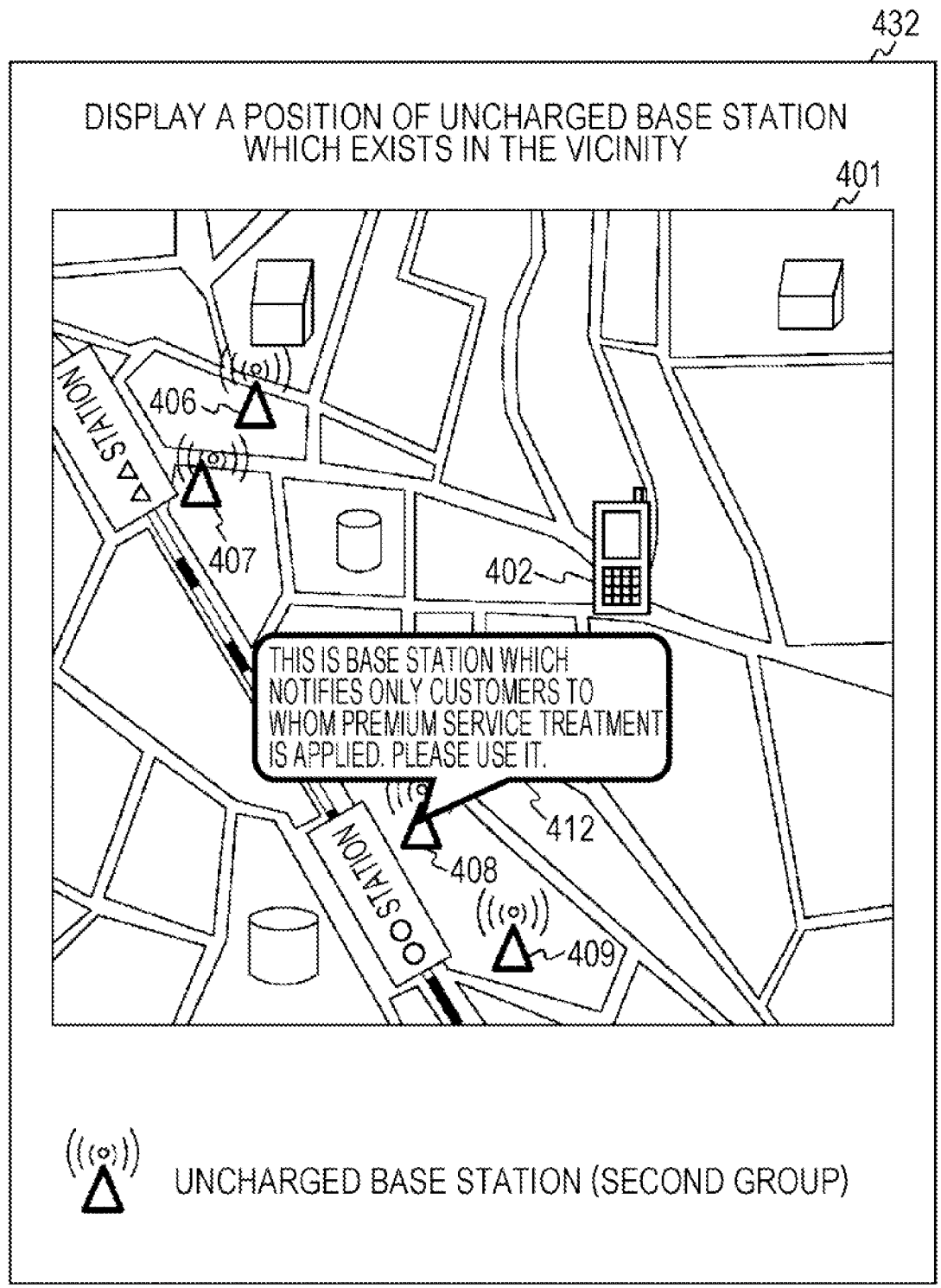

[Fig. 27]
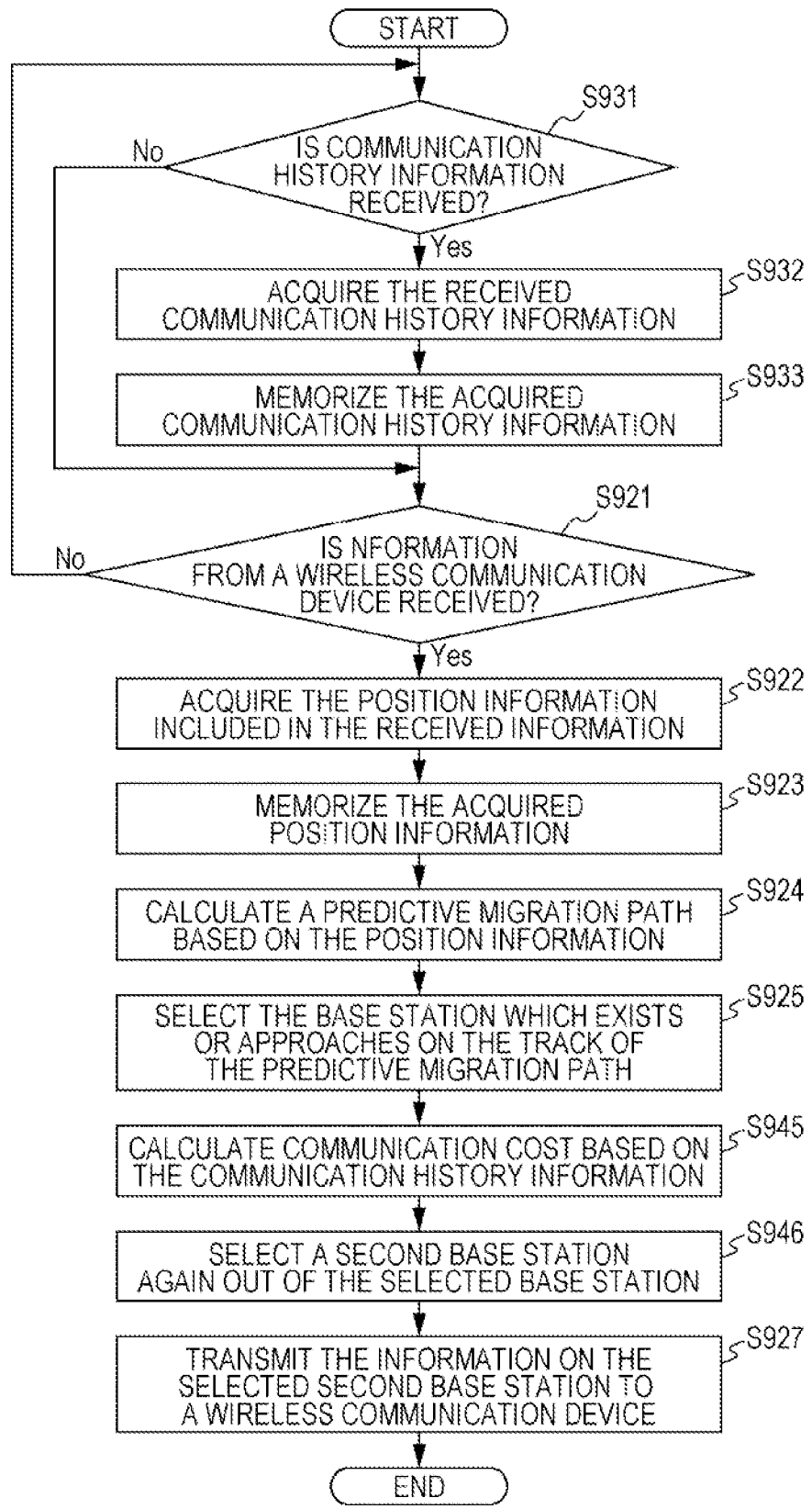

[Fig. 28]

BASE STATION INFORMATION MEMORY UNIT 375

| Group Information (361) | Premium Service Information (376) | | | | Base Station Identification Information (Cell ID) (362) | Position Information (363) |
|---|---|---|---|---|---|---|
| | Communication Cost 1 | Communication Cost 2 | Communication Cost 3 | Communication Cost 4 | | |
| First Group | — | — | — | — | ... | ... |
| | 0 | 0 | 0 | 0 | a98761 | LATITUDE : 35.681382<br>LONGITUDE : 139.766084 |
| | 0 | 0 | 0 | 0 | a98762 | LATITUDE : 35.665498<br>LONGITUDE : 139.75964 |
| | 0 | 0 | 0 | 0 | a98763 | LATITUDE : 35.675069<br>LONGITUDE : 139.763328 |
| Second Group | ... | ... | ... | ... | ... | ... |
| | 1 | 0 | 0 | 0 | a99999 | LATITUDE : 35.69384<br>LONGITUDE : 138.703549 |
| | ... | ... | ... | ... | ... | ... |

[Fig. 29]
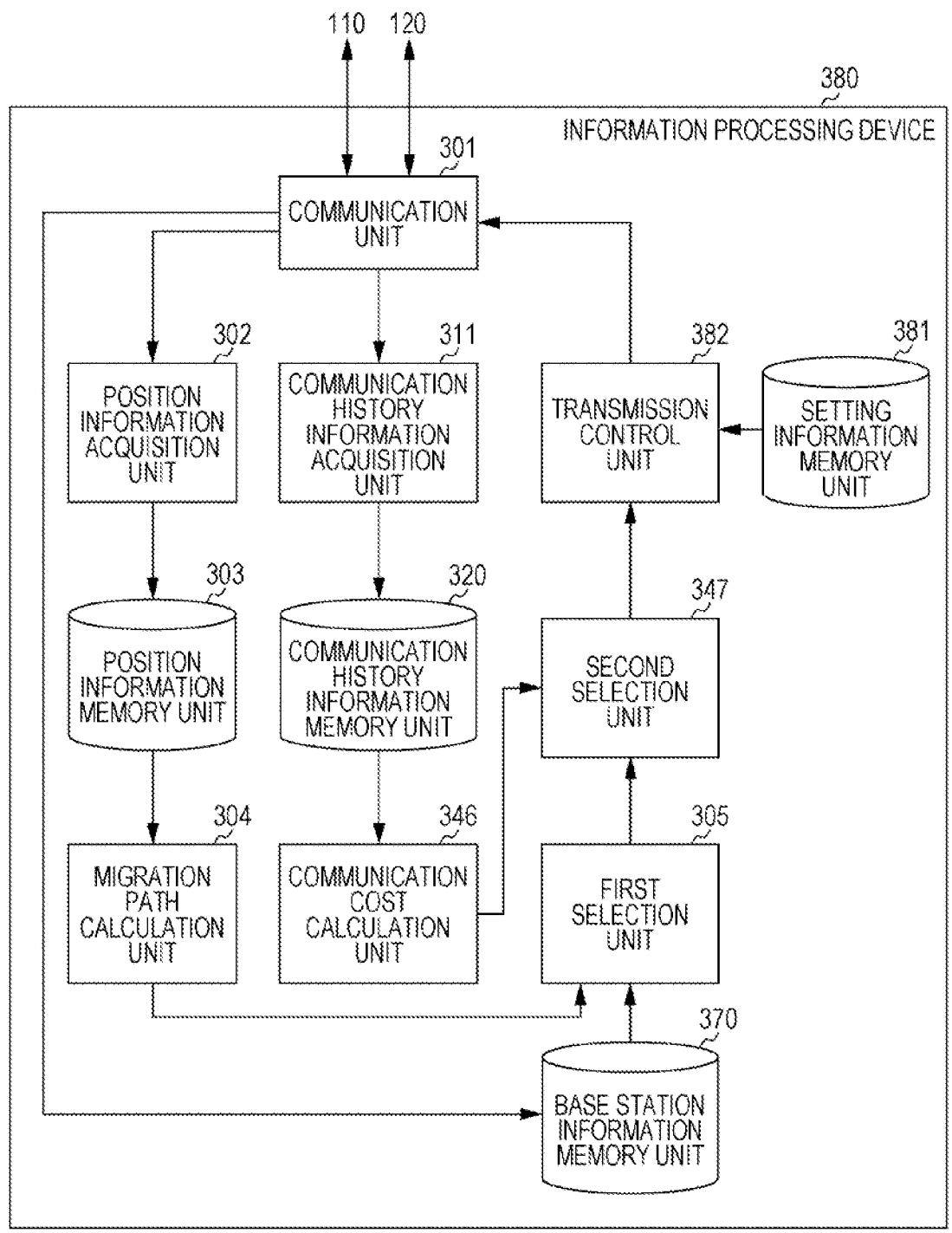

[Fig. 30]
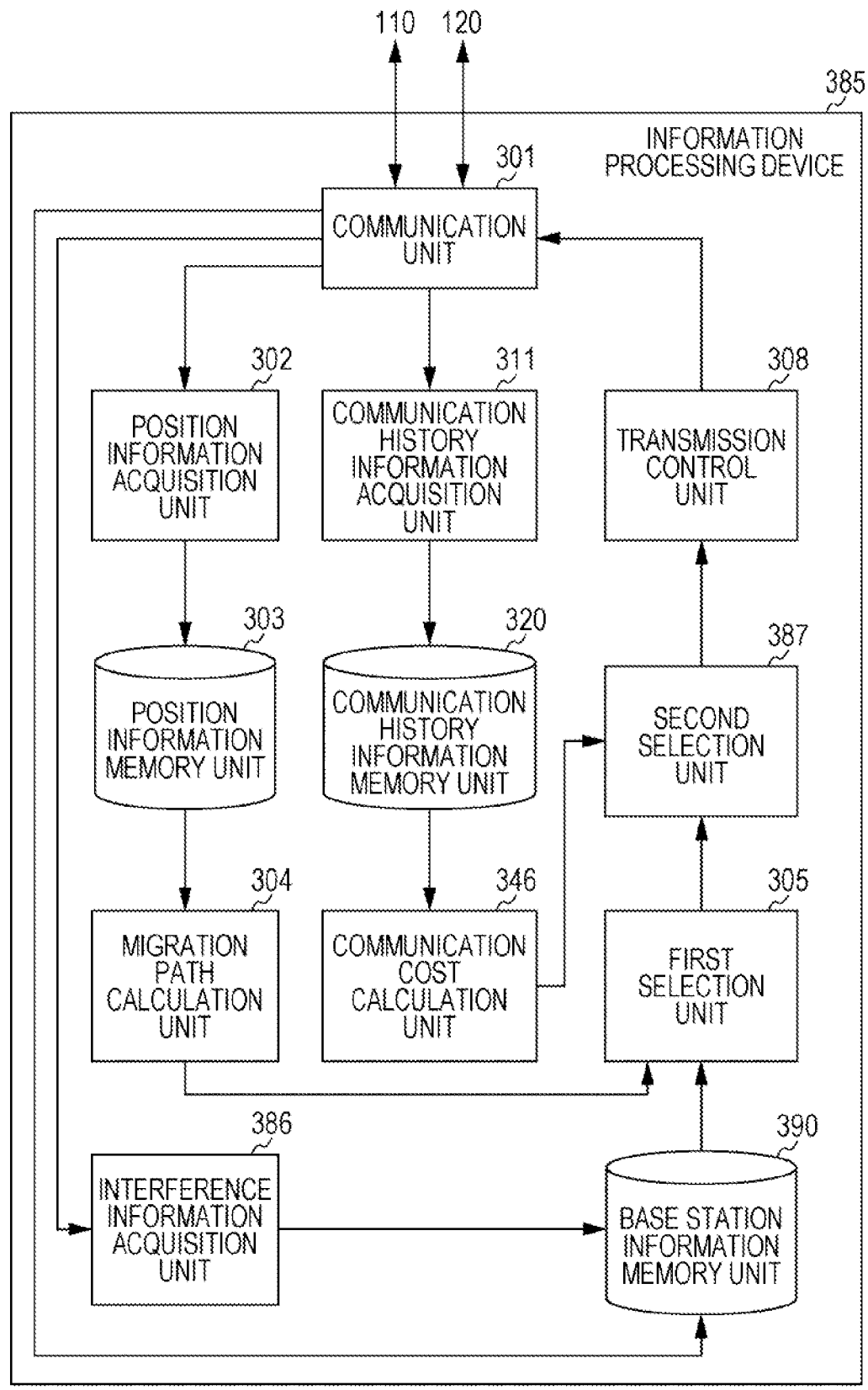

[Fig. 31]

BASE STATION INFORMATION MEMORY UNIT 390

| 361 Group Information | 371 Premium Service Information | 362 Base Station Identification Information (Cell ID) | 363 Position Information | 364 Congestion Degree Information | | 391 Interference Information | | ... |
|---|---|---|---|---|---|---|---|---|
| | | | | Current | After 10 Minutes | Current | After 10 Minutes | |
| First Group | - | ... | ... | ... | ... | ... | ... | ... |
| Second Group | 0 | a98761 | Latitude : 35.681382<br>Longitude : 139.766084 | 1 | 1 | 2 | 3 | ... |
| | 0 | a98762 | Latitude : 35.665498<br>Longitude : 139.75964 | 1 | 2 | 3 | 4 | ... |
| | 0 | a98763 | Latitude : 35.675069<br>Longitude : 139.763328 | 2 | 4 | 5 | 5 | ... |
| | ... | ... | ... | ... | ... | ... | ... | ... |
| | 1 | a99999 | Latitude : 35.69384<br>Longitude : 138.703549 | 1 | 1 | 1 | 1 | ... |
| | ... | ... | ... | ... | ... | ... | ... | ... |

[Fig. 32]
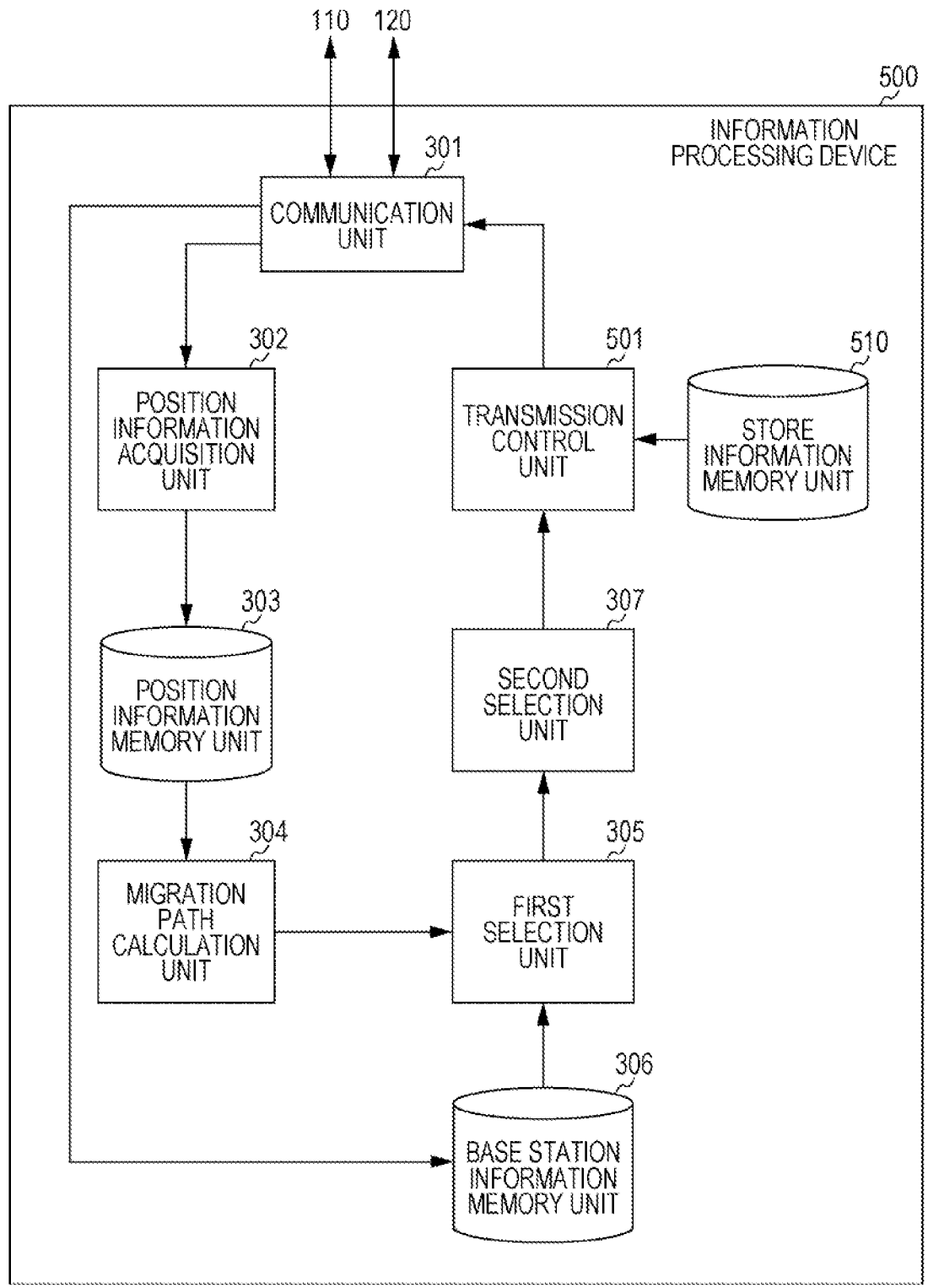

[Fig. 33]

| BASE STATION IDENTIFICATION INFORMATION (CELL ID) 511 | STORE IDENTIFICATION INFORMATION 512 | STORE INFORMATION 513 | ADVERTISING INFORMATION 514 | LINK INFORMATION 515 | COUPON INFORMATION 516 |
|---|---|---|---|---|---|
| a98754 | TP001 | STORE NAME: CAFÉ EVERYDAY TEL: 03-1234-5678 | CAFÉ EVERYDAY COFFEE 180 YEN NOW, WITH PLUS 150 YEN, ADDITIONAL CAKE ON SALE | 03-1234-5678 http://www.O△.co.jp/ | 50 YEN DISCOUNT COUPON |
| a98333 | TP002 | ... | ... | ... | ... |
| ... | ... | ... | ... | ... | ... |
| a98111 | ... | ... | ... | ... | ... |
| ... | ... | ... | ... | ... | ... |

STORE INFORMATION MEMORY UNIT 510

[Fig. 34]
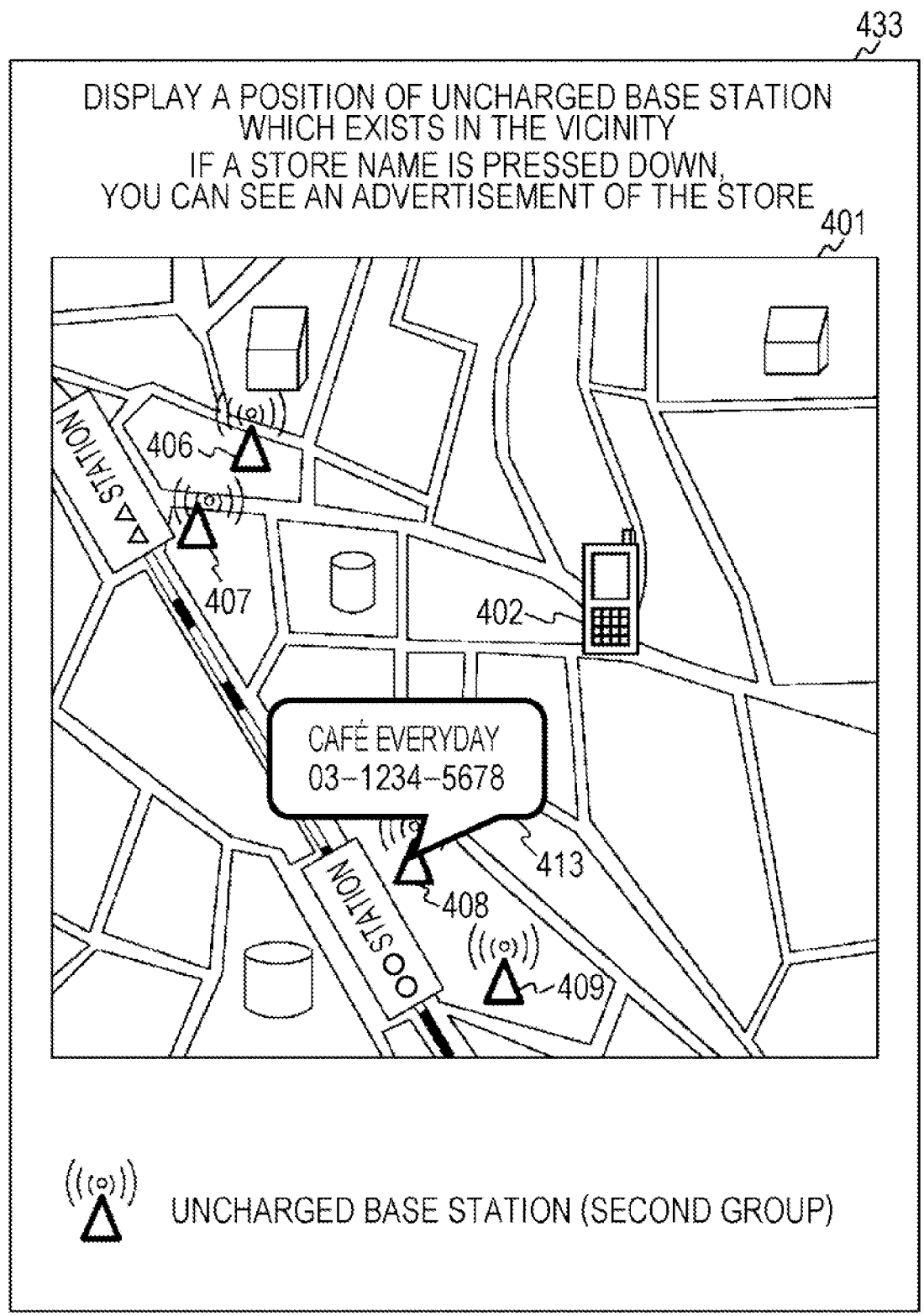

[Fig. 35]
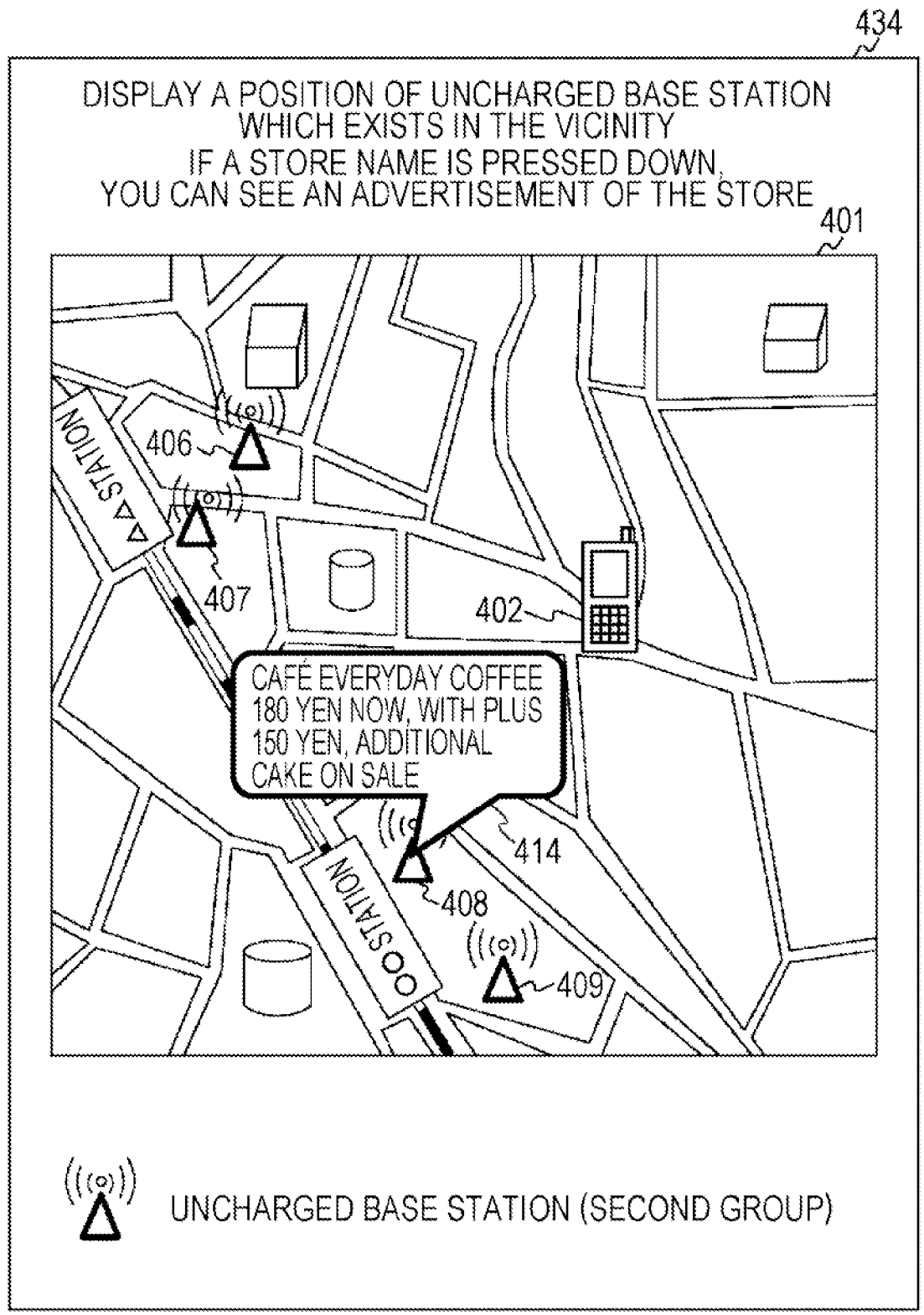

[Fig. 36]
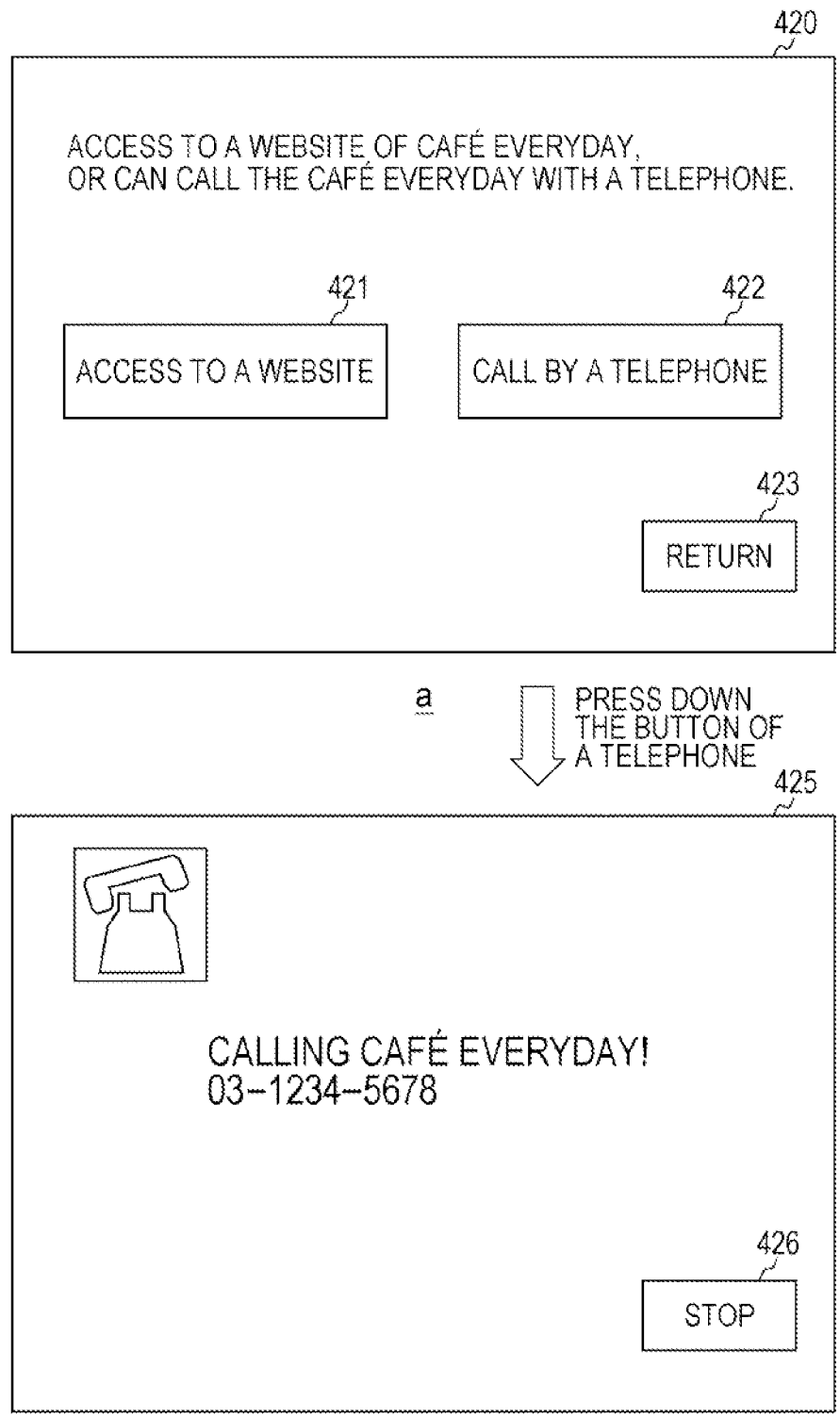

[Fig. 37]
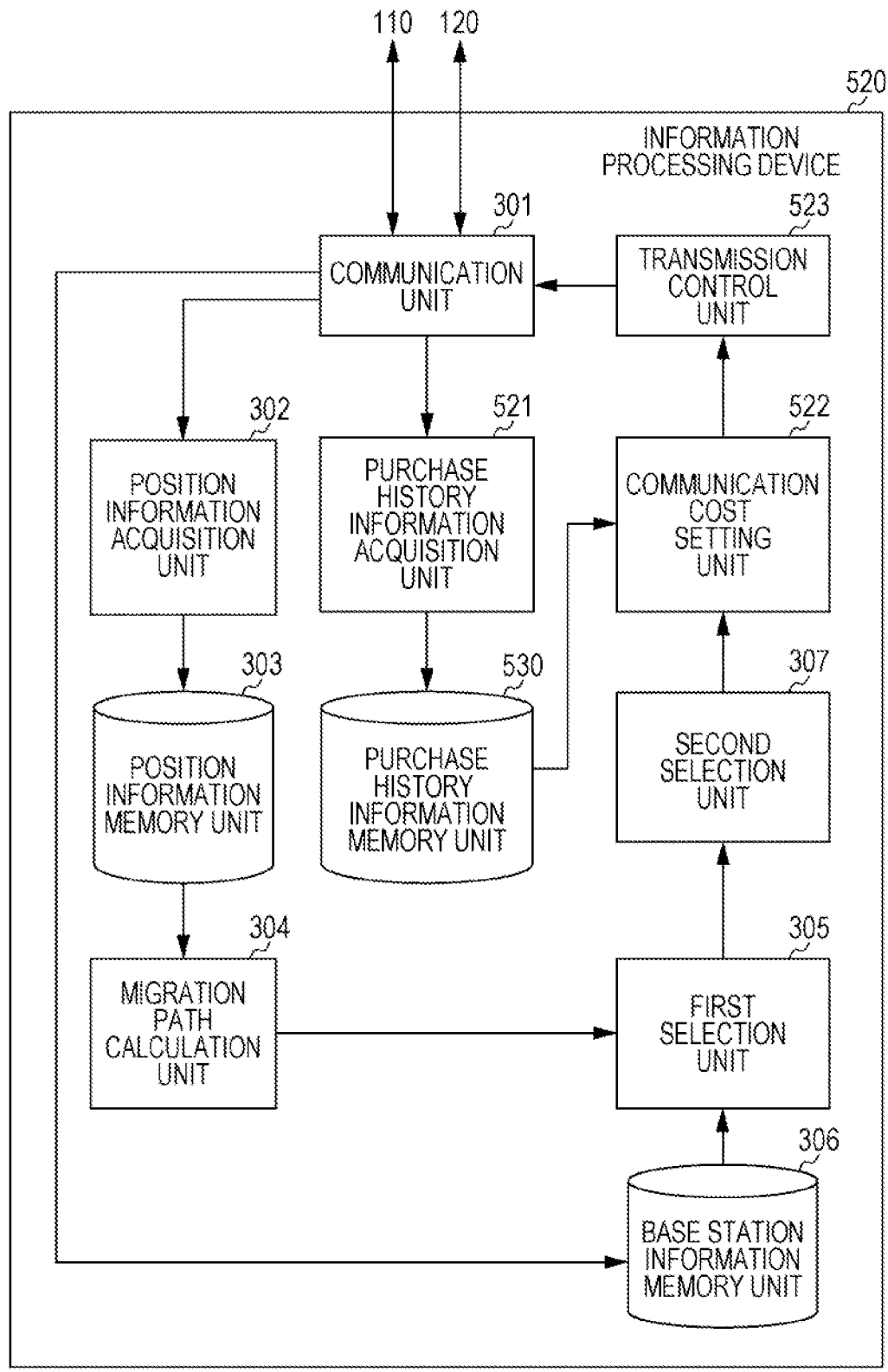

[Fig. 38]
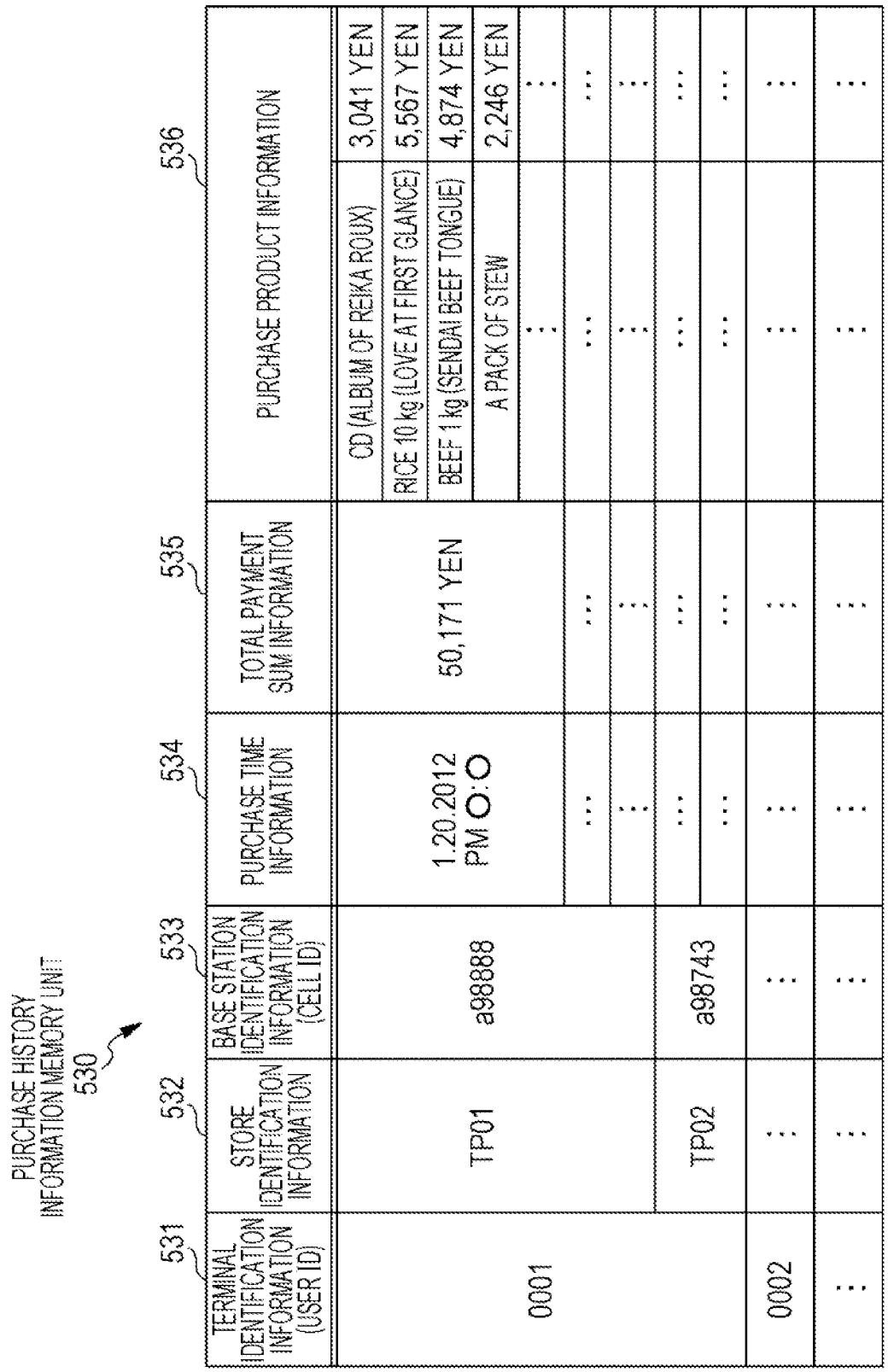

[Fig. 39]
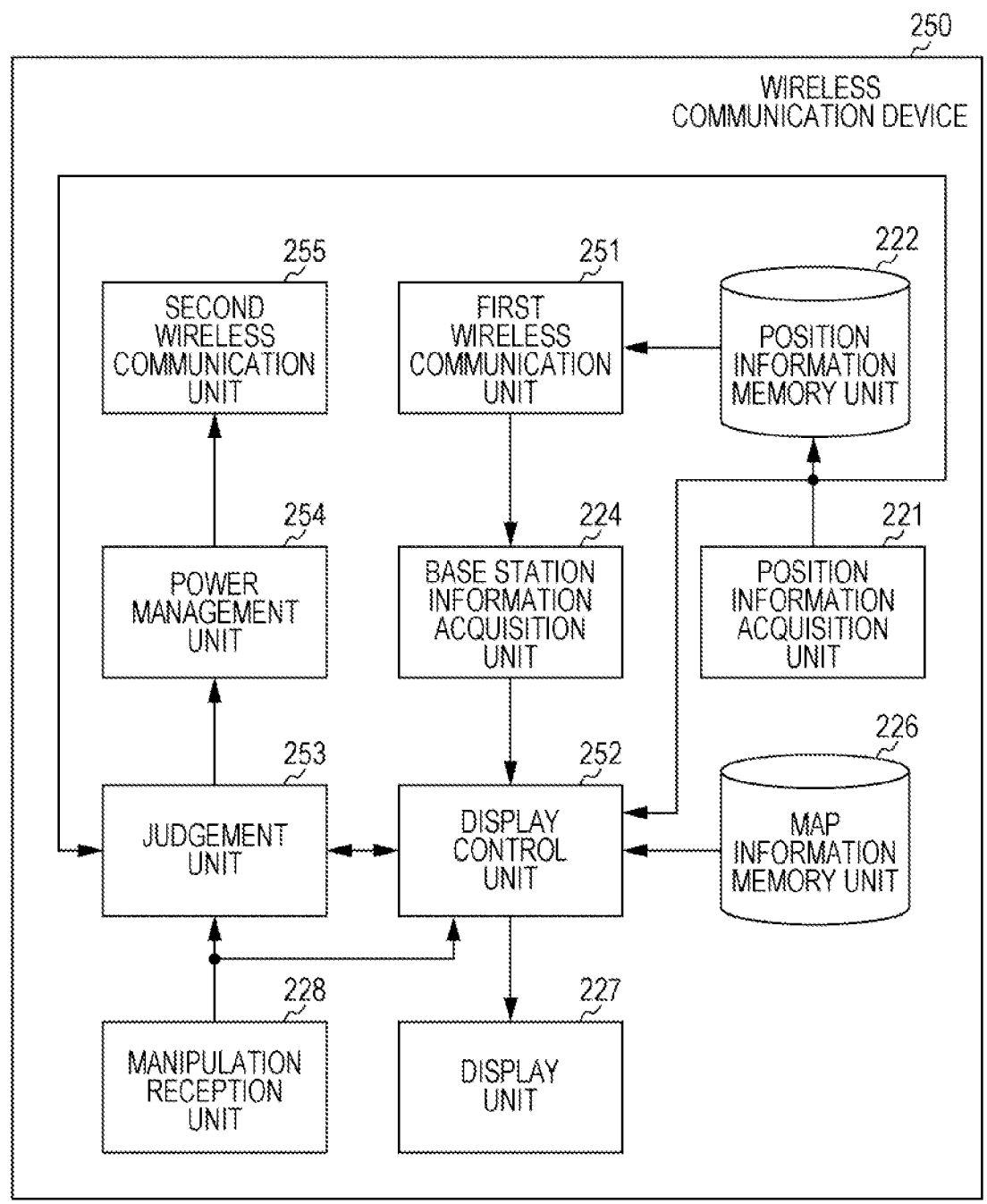

[Fig. 40]
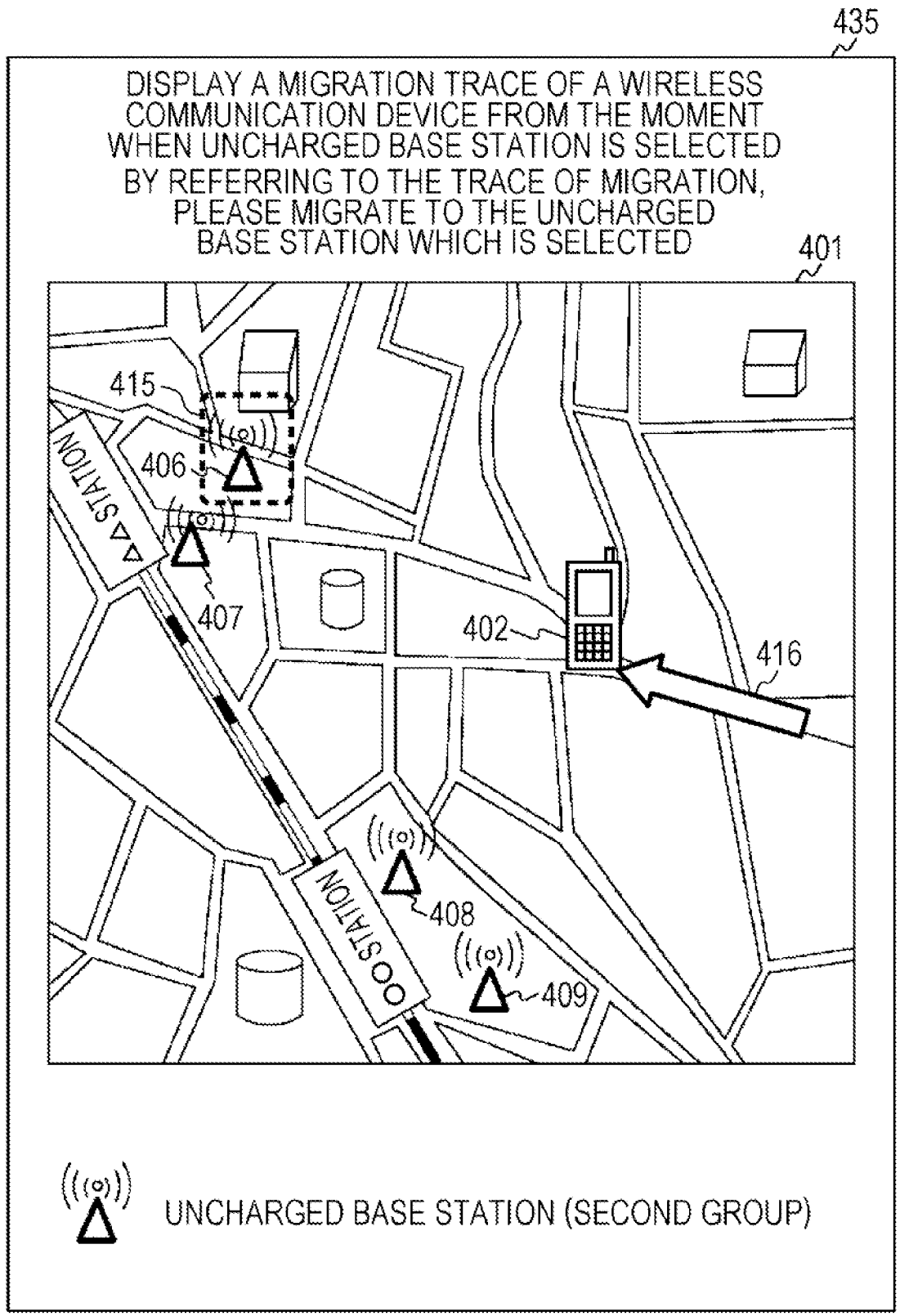

[Fig. 41]
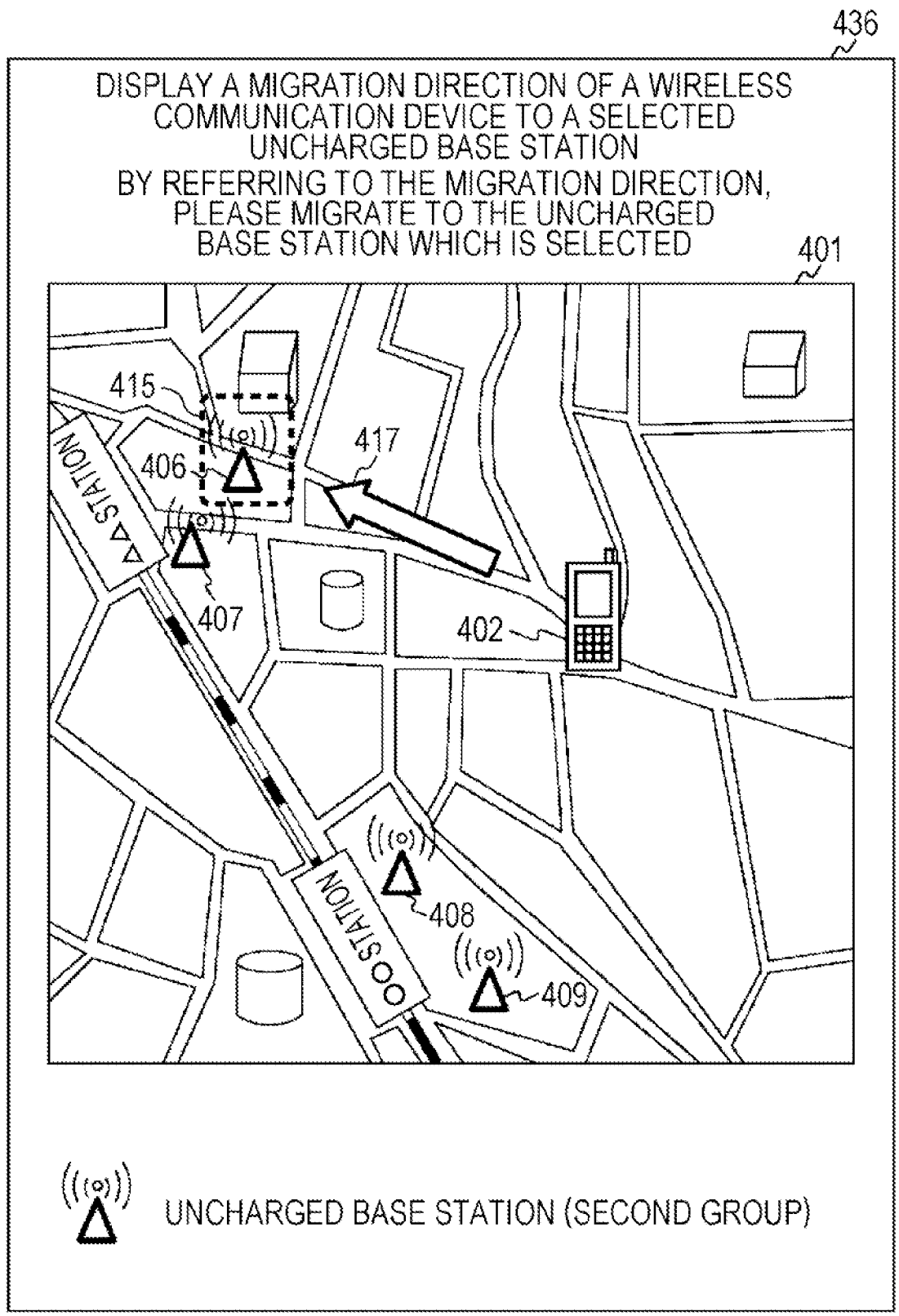

[Fig. 42]
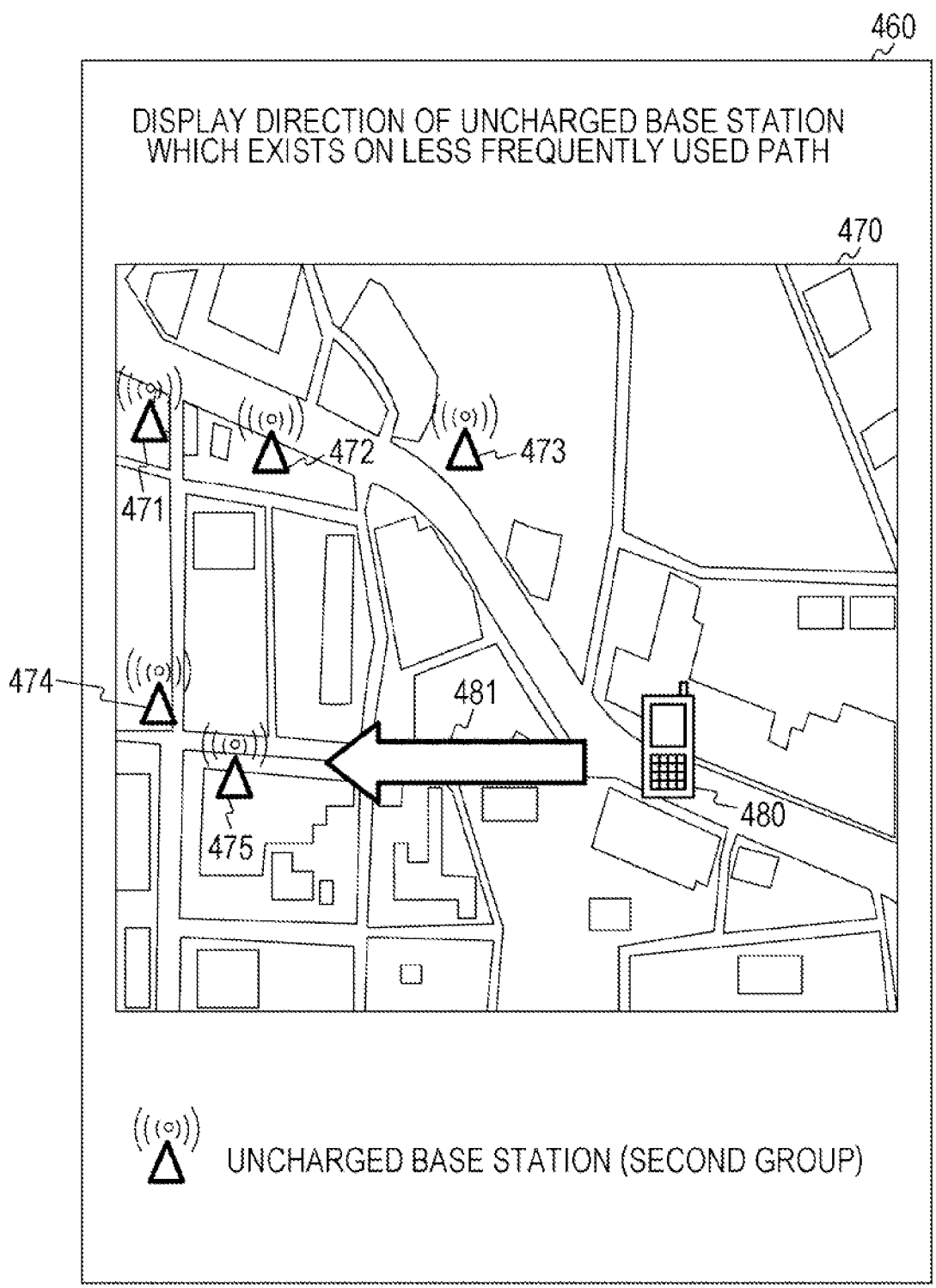

[Fig. 43]
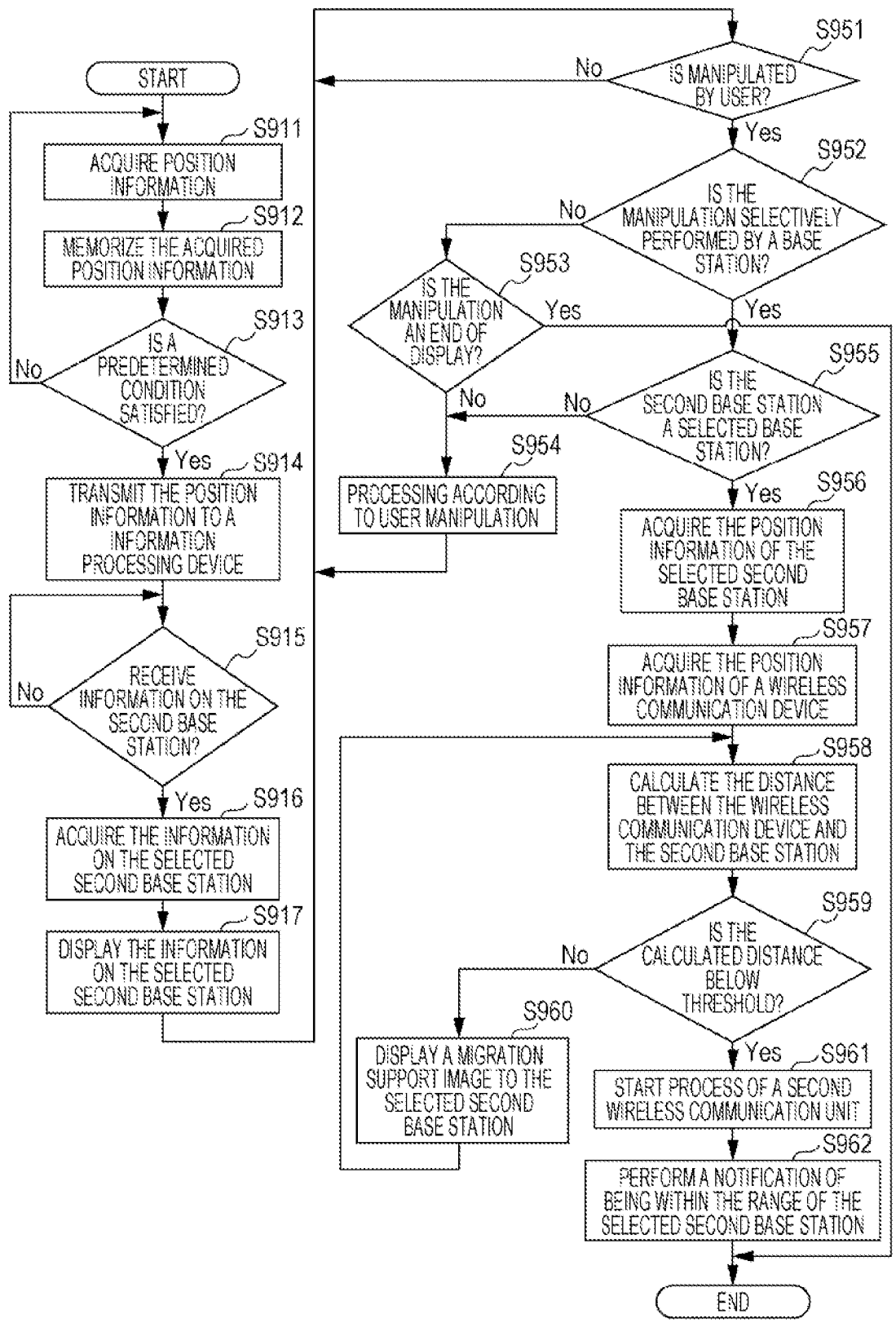

[Fig. 44]
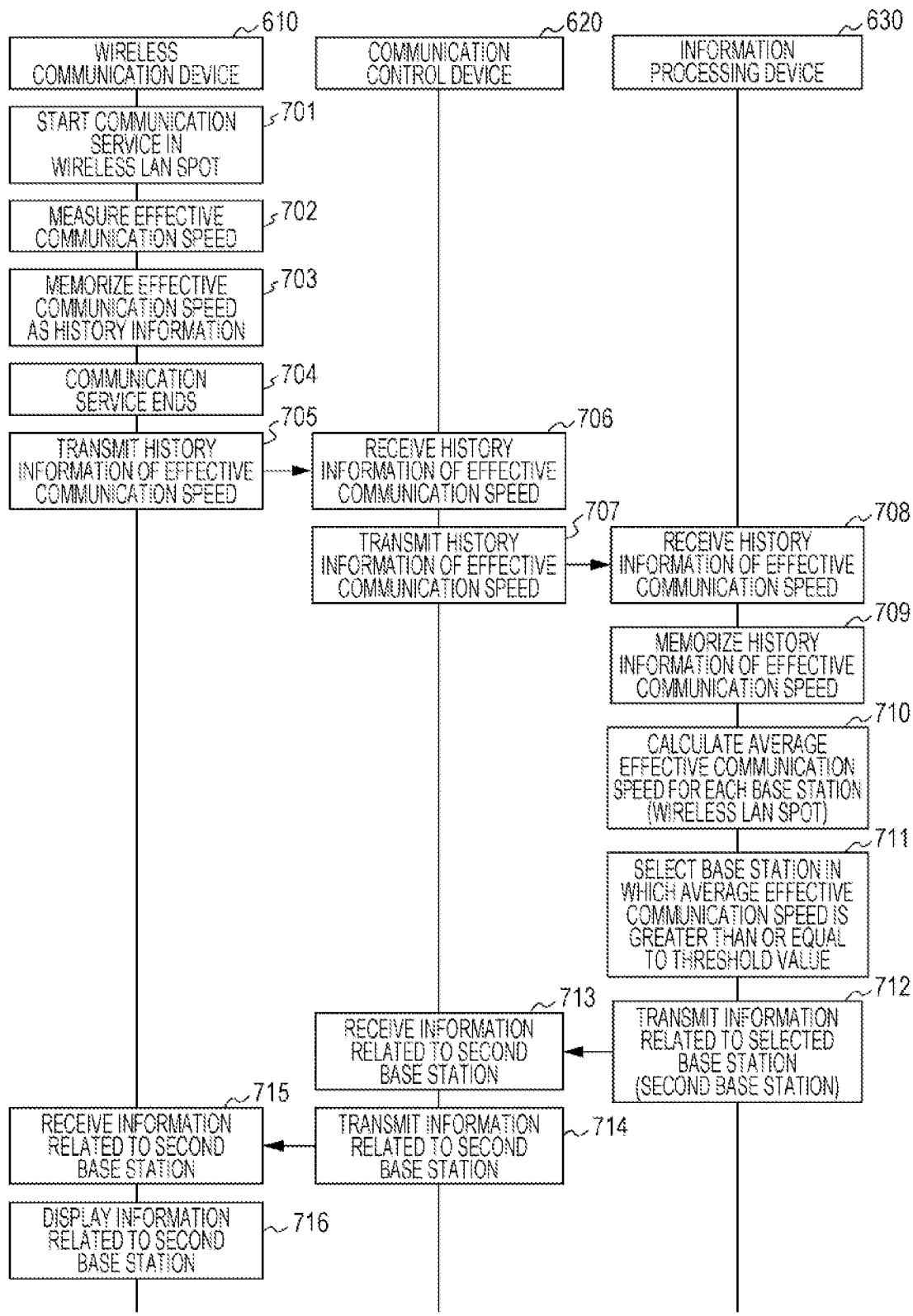

[Fig. 45]
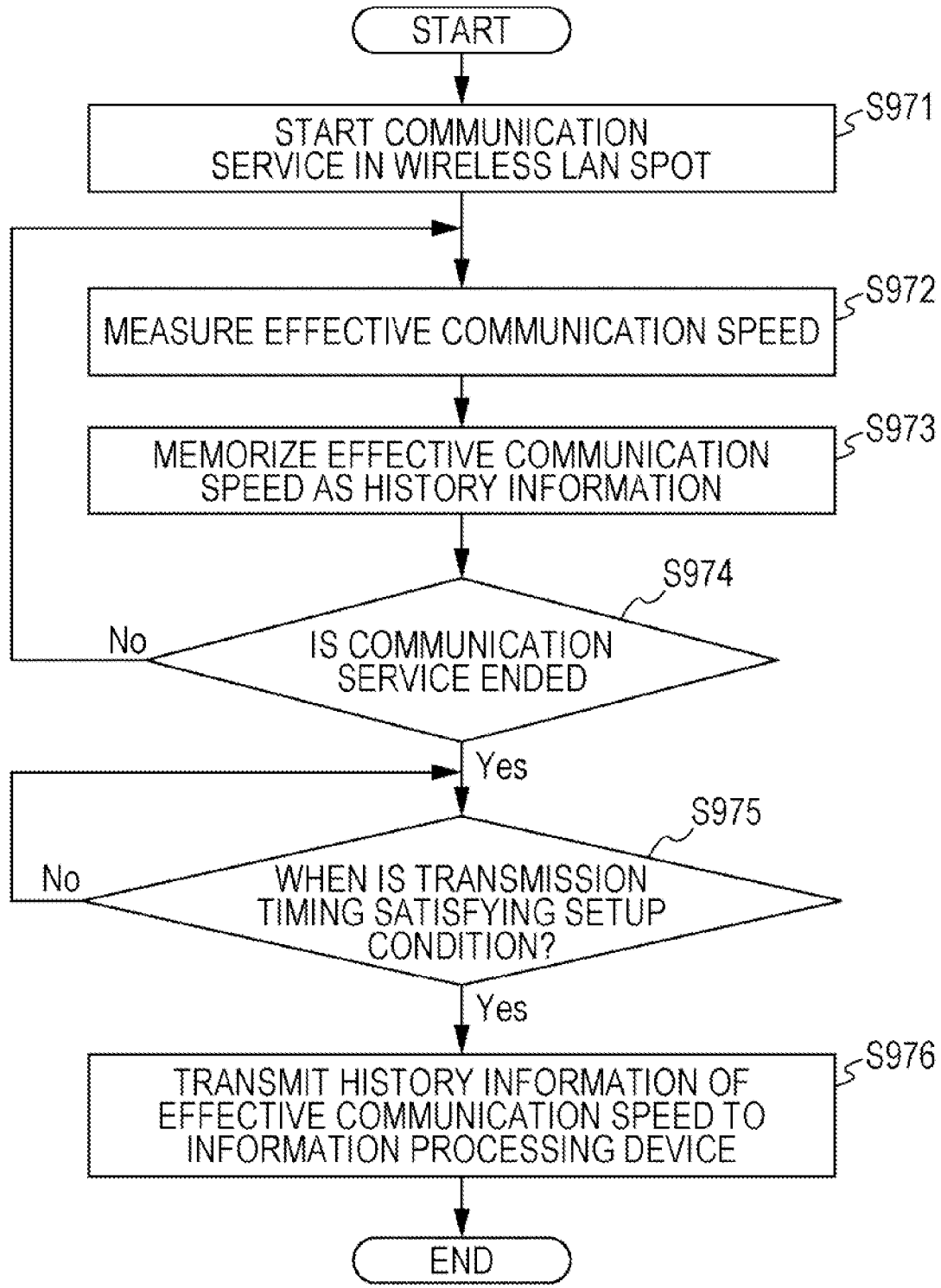

INFORMATION PROCESSING DEVICE FOR DISPLAYING INFORMATION OF BASE STATIONS AROUND PREDICTIVE MIGRATION PATH OF USER

CROSS-REFERENCE TO RELATED APPLICATION

The present application is a national phase entry under 35 U.S.C. § 371 of International Application No. PCT/JP2013/000109 filed Jan. 11, 2013, published on Jul. 25, 2013 as WO 2013/108606 A2, which claims priority from Japanese Patent Application Nos. JP 2012-009646, filed in the Japanese Patent Office on Jan. 20, 2012, and JP 2012-258370, filed in the Japanese Patent Office on Nov. 27, 2012.

TECHNICAL FIELD

The present technology relates to an information processing device, and specifically relates to an information processing device which outputs information which relates to wireless communication, a wireless communication device, a communication system and an information processing method.

BACKGROUND ART

In related art, a wireless communication device which is connected to a network, such as a public wireless network, is becoming widespread. Further, since 2002, a mobile phone service of a 3G system (In Japan, referred to as the third generation) has been started. At the beginning, the main application of mobile phone service was voice, e-mail or the like using small capacity packets. However, with the introduction of HSDPA (High Speed Downlink Packet Access) or the like, the usage behavior of users kept changing towards downloading comparatively large-sized packets, such as downloading music files or watching moving images.

Further, in recent years, in a mobile environment, wireless communication devices, such as smartphones, with which the user is able to enjoy a variety of applications are becoming widespread. In this way, according to the wide use of wireless communication devices such as smartphones, the traffic of packet communication has increased rapidly. In this respect, it may be important to efficiently use wireless communication resources.

For example, there is proposed a communication system in which a server estimates the amount of free space, and notifies the wireless communication device of the estimated amount. (for example, refer to PTL 1).

CITATION LIST

Patent Literature

[PTL 1]
JP 2011-10267A

SUMMARY

Technical Problem

In the related art as mentioned above, since the amount of free space is notified to the wireless communication device, it is possible to figure out the amount of free space of a base station to which the wireless communication device has registered a position of the same.

Here, carriers are installing access points of public wireless LAN (Local Area Network) or small base stations for home usage (referred to as Femtocell) in large numbers, along with introducing a communication system in which the frequency utilization efficiency is comparatively good. Accordingly, it is important to distribute the traffic of wireless communication devices such a smart phones into a wireless link of another communication system and utilize the wireless communication resources thereof efficiently.

The present technology is produced in view of such a circumstance, and an object thereof is to utilize the wireless communication resource efficiently.

Solution to Problem

The present technology is to solve the problem which is mentioned above.

According to an embodiment of the present disclosure, an information processing device may include a control unit to control display of information of a base station of a first wireless communication method existing around a predictive migration path by using position information of the information processing device, the information processing device using a second wireless communication method.

According to an embodiment of the present disclosure, an information processing method may include controlling, by a processor, display of information of a base station of a first wireless communication method existing around a predictive migration path by using position information of the information processing device, the information processing device using a second wireless communication method.

According to an embodiment of the present disclosure, a non-transitory recording medium may be recorded with a program executable by a computer. The program may include controlling display of information of a base station of a first wireless communication method existing around a predictive migration path by using position information of the information processing device, the information processing device using a second wireless communication method.

Advantageous Effects of Invention

According to the present technology, an excellent effect may be exhibited in which it is possible to make efficient use of wireless communication resources.

BRIEF DESCRIPTION OF DRAWINGS

FIG. 1 is a block diagram illustrating an exemplary system configuration of a communication system 100 according to a first embodiment of the present technology.

FIG. 2 is a block diagram illustrating an exemplary function configuration of a wireless communication device 200 according to a first embodiment of the present technology.

FIG. 3 is a diagram schematically illustrating exemplary memory content of a base station information memory unit 210 according to a first embodiment of the present technology.

FIG. 4 is a diagram illustrating an exemplary display screen which is displayed on a display unit 206 according to a first embodiment of the present technology.

FIG. 5 is a diagram illustrating an exemplary display screen which is displayed on a display unit 206 according to a first embodiment of the present technology.

FIG. 6 is a diagram illustrating an exemplary display screen which is displayed in a display unit 206 according to a first embodiment of the present technology.

FIG. 7 is a flowchart showing an exemplary processing procedure of the display control processing by a wireless communication device 200 according to a first embodiment of the present technology.

FIG. 8 is a block diagram illustrating an exemplary function configuration of a wireless communication device 220 according to another embodiment of the present technology.

FIG. 9 is a block diagram showing an exemplary function configuration of an information processing device 300 according to another embodiment of the present technology.

FIG. 10 is a sequence chart showing an exemplary communication processing between each device which configures a communication system 100 according to another embodiment of the present technology.

FIG. 11 a diagram illustrating an exemplary display screen which is displayed on a display unit 227 according to a second embodiment of the present technology.

FIG. 12 is a flowchart showing an exemplary processing procedure of a display control processing by a wireless communication device 220 according to another embodiment of the present technology.

FIG. 13 is a flowchart showing an exemplary processing procedure of a transmission control processing for base station information by an information processing device 300 according to another embodiment of the present technology.

FIG. 14 is a block diagram illustrating an exemplary function configuration of an information processing device 310 according to a third embodiment of the present technology.

FIG. 15 is a diagram schematically illustrating exemplary memory content of a communication history information memory unit 320 according to a third embodiment of the present technology.

FIG. 16 is a flowchart showing an exemplary processing procedure of a transmission control processing for base station information by an information processing device 310 according to a third embodiment of the present technology.

FIG. 17 is a block diagram illustrating an exemplary function configuration of an information processing 315 according to a third embodiment of the present technology.

FIG. 18 is a diagram schematically illustrating exemplary memory content of an information memory unit for base station congestion degree 330 according to a third embodiment of the present technology.

FIG. 19 is a flowchart showing an exemplary processing procedure of a transmission control processing for base station information by an information processing device 315 according to a third embodiment of the present technology.

FIG. 20 is a block diagram showing an exemplary function configuration of an information processing device 340 according to a third of the present technology.

FIG. 21 is a diagram schematically illustrating exemplary memory content of a product type information memory unit 350 according to a third embodiment of the present technology.

FIG. 22 is a diagram schematically illustrating exemplary memory content of an information memory unit for base station 360 according to a third embodiment of the present technology.

FIG. 23 is a flowchart illustrating an exemplary processing procedure of a transmission control processing for base station information by an information processing device 340 according to a third embodiment of the present technology.

FIG. 24 is a block diagram illustrating an exemplary function configuration of an information processing device 345 according to a fourth embodiment of the present technology.

FIG. 25 is a diagram schematically illustrating exemplary memory content of an information memory unit for base station 370 according to an embodiment of the present technology.

FIG. 26 is a diagram illustrating an exemplary display screen which is displayed on a display unit 227 according to a fourth embodiment of the present technology.

FIG. 27 is a flowchart showing an exemplary processing procedure of a transmission control processing for base station information by an information processing device 345 according to a fourth embodiment of the present technology.

FIG. 28 is a diagram schematically illustrating exemplary memory content of an information memory for base station 375 according to a fourth embodiment of the present technology.

FIG. 29 is a block diagram illustrating exemplary function configuration of an information processing device 380 according to a fourth embodiment of the present technology.

FIG. 30 is a block diagram illustrating an exemplary function configuration of an information processing device 385 according to a fourth embodiment of the present technology.

FIG. 31 is a diagram schematically illustrating exemplary memory contents of an information memory unit for base station 390 according to a fourth embodiment of the present technology.

FIG. 32 is a block diagram illustrating an exemplary function configuration of an information processing device 500 according to a fifth embodiment of the present technology.

FIG. 33 is a diagram schematically illustrating exemplary memory contents of an information memory unit for store 510 according to a fifth embodiment of the present technology.

FIG. 34 is a diagram illustrating an exemplary display screen which is displayed on a display unit 227 according to a fifth embodiment of the present technology.

FIG. 35 is a diagram illustrating an exemplary display screen which is displayed on a display unit 227 according to a fifth embodiment of the present technology.

FIG. 36 is a diagram illustrating an exemplary display screen which is displayed on a display unit 227 according to a fifth embodiment of the present technology.

FIG. 37 is a block diagram illustrating an exemplary function configuration of an information processing device 520 according to a sixth embodiment of the present technology.

FIG. 38 is a diagram schematically illustrating exemplary memory contents of an information memory for purchase history 530 according to a sixth embodiment of the present technology.

FIG. 39 is a block diagram illustrating an exemplary function configuration of a wireless communication device 250 according to a seventh embodiment of the present technology.

FIG. 40 is a diagram illustrating an exemplary display screen which is displayed on a display unit 227 according to a seventh embodiment of the present technology.

FIG. 41 is a diagram illustrating an exemplary display screen which is displayed on a display unit 227 according to a seventh embodiment of the present technology.

FIG. 42 is a diagram illustrating an exemplary display screen which is displayed on a display unit 227 according to a seventh embodiment of the present technology.

FIG. 43 is a flowchart showing an exemplary processing procedure of a display control processing by a wireless communication device 250 according to a seventh embodiment of the present technology.

FIG. 44 is a sequence chart showing an example of a communication process example between devices which configure a communication system according to an eighth embodiment of the present technology.

FIG. 45 is a flowchart showing an exemplary processing procedure of an effective communication speed measurement processing by a wireless communication device 610 according to an eighth embodiment of the present technology.

DESCRIPTION OF EMBODIMENTS

Hereinafter, the embodiment of the present technology will be described (hereinafter, referred to as the embodiment). The description will be provided in following order.
1. First embodiment (Display control: Example of displaying information which is related to a second base station based on a wireless communication device)
2. Second embodiment (Display control: Example of displaying information which is related to a second base station based on control of an information processing device)
3. Third embodiment (Display control: Example of selecting a second base station based on a communication history and product type of a wireless communication device, and a congestion degree of a base station)
4. Fourth embodiment (Display control: Example of allowing a premium service to a user who satisfies a certain condition)
5. Fifth embodiment (Display control: Example of displaying information (store information or the like) which is related to a location in which a second base station is installed with information relating to the second base station)
6. Sixth embodiment (Display control: Example of performing a discount on information using the base station in a case where a predetermined consumption is performed at the store in which a second base station is installed)
7. Seventh embodiment (Display control: Example of performing on/off control of wireless communication unit, Example of providing a user interface which supports user's movement)

<1. First Embodiment>
"Exemplary Configuration of Communication System"

FIG. 1 is a block diagram illustrating an exemplary system configuration of communication system 100 according to a first embodiment of the present technology.

A communication system 100 includes a network 101, communication control devices 110 and 120, first base stations 111 and 121, second base stations 131 to 137, a wireless communication device 200, an information processing device 300. In addition, the wireless communication 200, for example, is a mobile phone device (for example, mobile phone device and smart phone provided with call-function and data communication function), a data communication device provided with wireless communication function (for example, personal computer) or the like. Further, the wireless communication device 200 is what an initial setting is performed, and a parameter thereof is necessary for a connection with wireless communication network which at least one telecommunications carrier manages and operates based on a contract with the telecommunications carrier (or, contract with telecommunications carrier which is equivalent to a form of virtual telecommunications industry). A setting of the parameter, for example, is performed in order to renew USIM (Universal Subscriber Identity Model) which is necessary for a connection to a wireless communication network which a telecommunications carrier manages.

Here, a USIM information is an example of contract certification information, the contract certification information is telephone subscriber (subscriber) information, information of certification key (Authentication). That is, a user who owns the wireless communication device 200 is presumed to have a service contract with a wireless connection between the carriers. Further, the contract is what the user who owns the wireless communication device 200 is able to use a base station which the counterparty thereof (telecommunications carrier) operates (for example, first base stations 111 or 121).

A network 101 is a public link network such as a telephone network and the Internet. Further, the network 101 and communication control devices 110 and 120 are connected through a gateway (not illustrated).

The first base station 111 is a base station which a telecommunications carrier operates, and is a mobile telecommunication station (Node B) which connects through a wireless link with a wireless communication device which retains the USIM information of the telecommunications carrier thereof and the communication control device 110. In the same manner, the first base station 121 is a base station which a telecommunications carrier operates, and is a mobile telecommunication station (Node B) which connects through a wireless link with a wireless communication device which retains the USIM information of telecommunications carrier thereof and the communication control device 120. In addition, the telecommunications carrier is a mobile telecommunications carrier. Further, a telecommunications carrier who operates the first base station 111 and a telecommunications carrier who operates the first base station 121 may be same or different. Here, when the telecommunications carrier who operates the first base station 111 and the telecommunications carrier who operates the first base station 121 are different from each other, a case which wireless communication device 200 retains only the USIM information of telecommunications carrier who operates the first base station 111 is presumed. In such a case, the wireless communication device 200 is able to connect only to the first base station 111 based on the USIM information which is retained.

Second base stations 131 to 137 are base stations which cover a comparatively narrow range than the first base stations 111 and 121. For example, while the first base stations 111 and 121 are capable of covering a comparatively wide range of a radius approximately 1 km to several km, the second base stations 131 to 137 are capable of covering comparatively a narrow range of approximately several m to several tens of m.

Further, the wireless communication device 200 is what an initial setting is performed, and a parameter thereof is necessary for a connection with at least one base station out of the second base stations 131 to 137 based on a contract with a carrier who operates the second base stations 131 to 137.

Hereinafter, the first base stations 111 and 121, and the second base stations 131 to 137 are shown to be classified into two groups (first group, second group) in accordance with each communication system. Specifically, the first base stations 111 and 121 are classified into the first group and the second base stations 131 to 137 are classified into the second group.

A base station which is classified into the first group, for example, includes a macrocell, a microcell, picocell or the like, and a relay station (referred to as a repeater). Specifically, the base station which is classified into the first group is a base station which corresponds to a communication system such as CDMA (Code Division Multiple Access), W-CDMA (Wideband CDMA). Further, the base station which is classified into the first group is a base station which corresponds to such as HSPA (High Speed Packet Access), LTE(Long Term Evolution), LTE-Advanced. Furthermore, the base station which is classified into the first group is a base station which corresponds to a communication system such as WiMax(Worldwide Interoperability for Microwave Access).

Further, a base station which is classified into the second group, for example, includes a public wireless LAN (Local Area Network), Femtocell or the like. Further, the public wireless LAN, for example, is referred to as Wi-Fi (Wireless Fidelity).

In this way, the base station which is classified into the second group is able to be figured out as a base station which is lower in terms of communication cost than the base station which is classified into the first group when a wireless communication is used. Further, the base station which is classified into the second group is able to be figured out as the base station which is lower in terms of a communication cost than the base station which is classified into the first group when a wireless communication is used.

In addition, hereinafter, it will be mainly described by referring to the base station which is classified into the first group as the first base station, and the base station which is classified into the second group as the second group.

Further, FIG. 1 schematically illustrates a range where a radio wave of the first base station 111 arrives as a cell 112, and a range where a radio wave of the first base station 121 arrives as a cell 122. In addition, with respect to a radio wave of the second base stations 131 to 137, the drawing thereof is omitted because it is comparatively in a narrow range.

In addition, according to an embodiment of the present technology a base station includes both the meaning of the base station itself and a specified cell by the base station. For example, with respect to an embodiment of the present technology, a contract to use the base station also includes the meaning of contract to use the specified cell by the base station.

A communication control device 110 is a communication control device which is managed by a telecommunications carrier who provides a wireless connection service, and performs a certification control of a wireless communication device which is connected through a first base station 111. In addition, the wireless control device 110 connects the wireless communication device 110 to a network 101 through a gateway (not illustrated).

A communication control device 120 is a communication control device which is managed by a telecommunication carrier who provides a wireless connection service, and performs a certification control of a wireless communication device which is connected through a first base station 121. In addition, the wireless control device 120 connects the wireless communication device 120 to a network 101 through a gateway (not illustrated).

Further, the communication control device 110 outputs various types of information which is transmitted from each wireless communication device to an information processing device 300 through the first base station 111, and transmits various types of information which is output from the information processing device 300 to each wireless communication device through the first base station 111. In the same manner, the communication control device 120 outputs various types of information which is transmitted from each wireless communication device through the first base station 121 to the information processing device 300, and transmits various types of information which is output from the information processing device 300 to each wireless communication device through the first base station 121.

An information processing device 300 is an information processing device which is managed by a telecommunications carrier who performs various types of communication services. Further, the information processing device 300 acquires various types of information from a wireless communication device 200 through communication control devices 110 and 120. In addition, the information processing device 300 provides the wireless communication device 200 with various types of information through wireless control devices 110 and 120. Here, a carrier who performs various types of communication service is presumed to be a telecommunications carrier which provides a wireless connection service such as MVNO (Mobile Virtual Network Operator) (so-called a carrier of carrying type referred to as a virtual network carrier). In addition, with respect to the information processing device 300, the details thereof will be described in second embodiment of the present technology.

Here, when the number of other wireless communication device 200 which is connected to the first base station 111 to which the wireless communication device 200 is able to be connected is large, a case in which a user of the wireless communication device 200 utilizes faster communication service using the wireless communication device 200 is presumed. Further, a second base station 134 is a base station to which a small number of the wireless communication device is connected, and a base station which is able to be connected by slightly moving the wireless communication device 200. In such a case, it is presumed to be possible to utilize a faster communication service by moving the wireless communication device 200 and connecting the wireless communication device 200 to the second base station 134. However, for example, it is difficult for the user of a wireless communication device to figure out whether the connection to the second base station 134 is feasible by moving the wireless communication device 200. Accordingly, in the first embodiment of the present technology, an example which notifies a user of a position of second base station where the wireless communication device 200 is utilizable is shown. In this way, it is possible for the user to easily figure out the existence of the second base station which the wireless communication device 200 is able to utilize.

Further, for ease of description, although only the communication control devices 110 and 120 are illustrated in FIG. 1, it is also applicable in the same way to a case in which three or more communication control devices exist. With respect to each communication control device thereof, it may also be operated by the same telecommunications carrier, while it may also be operated by a different telecommunications carrier. Further, for ease of description, as the first base station which each telecommunications carrier utilize, although only the communication control devices 111 and 121 are illustrated in FIG. 1, it is also applicable in the same way to a case in which three or more communication control devices exist. Further, for ease of description, as the first base station which each telecommunications carrier utilize, although only one communication control device 200 is illustrated in FIG. 1, it is also applicable in the same way to a case in which a plurality of communication control devices exist.

"Example of Wireless Communication Device Configuration"

FIG. 2 is a diagram illustrating an exemplary function configuration of a wireless communication device 200 according to a first embodiment of the present technology.

A communication system 200 includes a wireless communication unit 201, a position information acquisition unit 202, a base station selection unit 203, a base station information memory unit 210, a display control unit 204, a map information memory unit 205, a display unit 206, and a manipulation reception unit 207. A wireless communication device 200, for example, is realized by a mobile phone device which is capable of calls and data communication. In addition, with respect to a microphone, speaker or the like, the illustration and description thereof will be omitted. In addition, the wireless communication device 200 is an example of the information processing device and the wireless communication device according to the claims.

The wireless communication unit 201 is a wireless communication unit which corresponds to a plurality of the wire communication service, which includes the wireless communication unit 201, includes a reception unit which receives a wireless signal which is transmitted from each base station, and a transmission unit which transmits the wireless signal into each base station. For example, the wireless communication unit 201 is capable of communication in accordance with CDMA (Code Division Multiple Access) and OFDMA (Orthogonal Frequency Division Multiple Access). In addition, CDMA means code division multiple accesses, and OFDMA means orthogonal frequency division multiple accesses. That is, the wireless communication 201 is capable of connection with the first base station. Further, the wireless communication 201 is capable of the communication with the second base communication. In addition, a connection changeover with the first base station and the second base station can be performed through a user manipulation or performed automatically (if predetermined conditions are satisfied).

The position information acquisition unit 202 is to acquire information (position information) which is related to a position (current position) where the wireless communication position 200 exists (resides). In addition, the position information acquisition 202 outputs the acquired position information thereof to a base station selection unit 203 and a display control unit 204. Here, the position information acquisition 202 may acquire the position information which is related to the position in which each base station as a connection subject of the wireless communication unit 201 exists as the position information. In addition, the position in which each base station exists as the connection subject of the wireless communication unit 201 is a position of the first base station in which the wireless communication unit 201 is set as a serving cell by the cell selection or the cell reselection processing. More specifically, the position in which each base station exists as the connection subject of the wireless communication unit 201 is the position of one or a plurality of base stations (first base station, second base station) which exists on a predictive migration path (or in a vicinity of the predictive migration path). In addition, a method for calculating the predictive migration path will be described in detail by referring to FIG. 9.

For example, the position information acquisition unit 202 is capable of acquiring a position (current position) where the wireless communication device 200 exists based on the position information calculated by a GPS (Global Positioning System) unit. The calculated position information includes each data relating to the position such as the latitude, the longitude and the altitude at the time of a GPS signal reception. Also, a position information acquisition device for acquiring the position information by a method of acquiring other position information may be used. For example, the position information acquisition device for acquiring the position information by deriving the position information using access point information coming from a wireless LAN which exists in the vicinity may be used.

Further, for example, the position information acquisition unit 202 is capable of acquiring the information (position information) relating to the position in which the base station as the connection subject of the wireless communication unit 201 exists, through the wireless communication unit 201 from the base station.

In addition, the position information acquisition unit 202 may acquire the position information, and may acquire each piece of information relating to the base station (base station identification information (such as cell IDs to identify the base station), congestion degree information of the base station, communication cost information when used).

The base station information memory unit 210 is a memory unit which associates the position and the group relating to each base station to memorize. In addition, memory content of the base station information memory unit 210 will be described in detail by referring to FIG. 3.

In addition, the base station information memory unit 210 is capable of storing the base station information relating to all of base stations. Further, the current position of the wireless communication device 200 or base station information which is related to the base station which exists on the predictive migration path (or base station approaching the predictive migration path) may be memorized in the base station information memory unit 210. Here, it is assumed a case which only the current position of the wireless communication device 200, or the base station information which is related to the base station (or base station approaching the predictive migration path) which exists on the predictive migration path is memorized in the base station information memory unit 210. In such a case, using the base station information (each piece of information which is related to the base station) which is included in the information acquired by the wireless communication unit 201 and responding to the movement of the wireless communication device 200, the memory content of the base station information memory unit 210 is sequentially updated.

The base station selection unit 203 is to select a base station (second base station) which is classified into a group (second group) which is different from the first group being a serving cell, based on the position information obtained by the position information acquisition unit 202. In addition, the base station selection unit 203 outputs an information which is related to the selected second base station (base station information (for example, each information illustrated in FIG. 3)) to the display control unit 204.

Specifically, the base station selection unit 203 selects the second base station which exists within a predetermined range from a position (for example, the current position of the wireless communication device 200) specified by position information acquired by the position information acquisition unit 202. In such a case, using the base station information which is memorized in the base station information memory unit 210, the base station selection unit 203 selects the second base station which exists within the predetermined range from the position (reference position) specified by the position information acquired by the position information acquisition unit 202. Here, the predetermined range, for example is the range which includes a map (for example, illustrated in FIG. 4) which is displayed on the display unit 206 (for example, 5 km radius). In addition, the base station selection unit 203 is an example of selection unit which described in the claim.

Here, as illustrated in FIG. 5, a case which displays a first base station and a second base station at the same time is presumed. In such a case, along with information which is related to the selected second base station (base station information), information (base station information) which is related to the first base station which exists within a predetermined range from a reference position is output to the display control unit 204.

The display control unit 204 is to perform control for displaying the information on the second base station information (base station information) selected by the base station selection unit 203 on the display unit 206. For example, based on the position information which is output from the position information unit 202, the display control unit 204 acquires map information on the position specified by the position information from the map information memory unit 205. In addition, the display control unit 204 displays the acquired map information, and the base station information output from the base station selection unit 203 on the display unit 206. That is, the display control unit 204 displays the map which includes the position in which the wireless communication device 200 exists or the vicinity thereof on the display unit 206, and performs control for disposing the base station information in the position of second base station which is related to the base station information on the map and displaying the base station information. The display example is illustrated in FIGS. 4 and 6.

In this way, based on the position information on the wireless communication device 200, the display control unit 204 performs control for causing a base station information to be output from the wireless communication device 200, where the base station information relates to the position of second base station which is different in a communication method from the first base station as the connection subject of the wireless communication device 200. In addition, the display control unit 204 is an example of a control unit, an output control unit and a display control unit described in the claims.

The map information memory unit 205 is to store a map data on the map which is displayed on the display unit 206, and supplies the map data which is memorized to the display control unit 204. For example, the map data which is memorized in the map information memory unit 205 is data which is specified by the longitude and the latitude, and is divided into a plurality of regions of a constant latitude width and a constant longitude width as a unit. Further, in each region which is divided, for example, information on a place name and a planimetric feature (for example, information on buildings and landmarks corresponding to each region) is associated with and recorded. Using such information, it is possible to denote building names, landmarks and the like on the map.

The display unit 206 is a display panel which displays each image based on a control of the display control unit 204. For example, as the display unit 206, the display panel such as a LCD (Liquid Crystal Display) and an organic EL (Electro Luminescence) panel can be used.

The manipulation reception unit 207 is a manipulation reception unit which receives a manipulation performed by the user, and outputs a control signal (manipulation signal) according to the manipulation content received to the display control unit 204. In addition, as the manipulation reception unit 207, for example, a touch panel receiving a manipulation input from the user by detecting a contact manipulation on a display screen of the display unit 206 can be used.

"Example of Memory Content of Base Station Information Memory Unit"

FIG. 3 is a diagram schematically illustrating an example of memory content of the base station information memory unit 210 according to the first embodiment of the present technology.

The base station information memory unit 210 is a memory unit which associates a position and a group which are related to each base station to memorize. Specifically, in the base station information memory unit 210, group information 211, base station identification information 212, position information 213, congestion degree information 214, and communication cost information 215 which are associated with each base station and memorized. Here, information which is related to the base station maintained in the base station information memory unit 210 may be automatically downloaded from a server and updated regularly, for example, on a daily or weekly basis. Further, the time slot for downloading may be performed at night with less communication traffic. Further, the information which is downloaded may also be the information which are related to the base station of all area, when the information which is only related to a residing area, or a base station in the vicinity is downloaded, and the area is changed, information which is related to a new area, or a base station in the vicinity thereof may be downloaded. Further, the download may be performed synchronized by being connected with the second base station which is being serviced at a cost below a specific communication cost. Furthermore, the download of information which is related to the base station may be performed using a communication method format called NFC (Near Field Communication). Here, it is needless to say that the NFC includes such things as an automatic ticket gate system of a railway station, or an electronic money payment system of a store.

The group information 211 is information on the group to which each base station is classified. Here, in a first embodiment of the present technology, as mentioned in the above, since each base station is classified into two groups (first group, second group), either one of the first group and the second group is memorized as the group information 211.

The base station identification information 212 is identification information for identifying a base station which telecommunication carrier operates. As base station recognition information, for example, it is possible to use cell IDs.

The position information 213 is information (base station information) which is related to a position in which a base station exists. For example, the latitude and longitude of the position in which the base station exists are memorized.

The congestion degree information 214 is information (congestion degree information) which is related to congestion degree of a base station. For example, the congestion degree is classified into five stages, values which correspond to the five classified stages (1 to 5) are memorized in the congestion degree information 214. For example, a base station having a congestion degree of 1 means a base station with a low congestion degree (comparatively free base station), a base station having a congestion degree of 5 means a base station with a high congestion degree (comparatively crowded base station).

The communication cost information 215 is information which is related to a communication cost (communication cost information) which is applied when the communication cost information 215 is connected to the base station. In addition, with respect to the congestion degree information 214 and the communication cost information 215, the memory contents are sequentially updated based on the information acquired by the wireless communication unit 201 (information transmitted from communication control devices 110 and 120).

"Display Example of a Base Station Guide screen"

FIGS. 4 to 6 are diagrams illustrating an example of a display screen which is displayed on the display unit 206 according to a first embodiment of the present technology.

FIG. 4 illustrates a location in which a wireless communication device 200 exists, and a base station guide screen 400 which displays by superimposing a second base station to which the wireless communication device 200 is able to be connected on a map. Further, FIG. 5 illustrates a base station guide screen 430 by interposing a location in which the wireless communication device 200 exists and base stations (first base station and second base station) to which the wireless communication device 200 is able to connect on a map. Here, the base station guide screen 430, as a base station to which the wireless communication device 200 is able to connect is different from the base station guide screen 400 in that the first base station is displayed. However, in other respects, the base station guide screen 400 is the same as the base station guide screen 430. In this respect, hereinafter, it will be mainly described with respect to the base station guide screen 400. In addition, for convenience of description, the map will be simplified in the display screen as illustrated in FIGS. 4 to 6.

In addition, the base station guide image 400, for example, is capable of being displayed after a specific manipulation by the user (for example, pressing manipulation of a specific button). Further, in a case where a predetermined condition is satisfied, the base station guide screen 400 may be automatically displayed. Here, the case where the predetermined condition is satisfied, for example, is the base station which becomes a serving cell is a first base station, and also the congestion degree of the base station is equal to or greater than a threshold value (for example, equal to or greater than 4). In addition, this automatic display, for example, is capable of being displayed for only a constant time (for example, five minutes).

Further, map information for displaying a map which is included in the base station guiding map 400 is memorized in the map information memory unit 205. In addition, in a case where a manipulation input for displaying the base station guide screen 400 is performed, a display control unit 204 acquires the map as a display subject (the map including a position in which the wireless communication device 200 exists) from a map information memory unit 205. In addition, the position in which the wireless communication device 200 exists is able to be acquired based on the position information acquired by a position information acquisition unit 202. Further, by memorizing map information in the devices other than the wireless communication device 200 (for example, map information memory device), the wireless communication device 200 may acquire the map information from the other map information memory devices through a network such as internet.

A map display region 401 is provided in the base station guide screen 400. In the map display region 401, the map in the vicinity of the location in which the wireless communication device 200 exists is displayed. Further, on the map which is displayed in the map display region 401, a current position indicator 402, and second base station indicators 406 to 409 are displayed.

Further, on the map which is displayed on the map display region 401 in a base station guide screen 430 as illustrated in FIG. 5, first base station indicators 403 to 405 are displayed.

The current position indicator 402 is an indicator which represents the position whether the wireless communication device 200 exists.

The first base station indictors 403 to 405 are the indicators which represent the position of the first base station to which the wireless communication device 200 is able to connect.

The second base station indicators 406 to 409 are indicators which represent the position of the second base station to which the wireless communication device 200 is able to connect. In addition, in FIG. 5, for the convenience of description, the first base station indicators 403 to 405 are represented by a triangle with a longer vertical direction. Further, in FIGS. 4 and 5, the second base station indicators 406 to 409 are represented by a triangle with a shorter vertical direction. However, other indicators which the user is able to identify may be used.

Here, the first base station indicators 403 to 405 and the second base station indicators 406 to 409 are disposed on the map based on the position information (position information 213 illustrated in FIG. 3) which is associated with the corresponding base station.

As illustrated in FIG. 4, only the second base station indicator may be displayed on the base station guide screen 400, and as illustrated in FIG. 5, the indicators of the first base station and the second base station may also be displayed on the base station guide screen 430 at the same time. Further, such a display changeover may be performed based on the user's manipulation.

Further, in the map display region 401, along with a map, other information which is related to geography or a planimetric feature (position information, address information, building name information, store name information) may be displayed. For example, on the map, each piece of information thereof can be overlapped and displayed. In addition, as the building name information, information (for example, railway station, bus stops of shuttle buses, historical sites, scenic spot, parks, rivers, and harbors) mentioned in a general map can be used.

Further, a scale of the map which is displayed in the map display region 401 may be changed based on the user's manipulation, and the map may also be sequentially changed based on the movement of the wireless communication device 200 or the user's manipulation. For example, the map which is displayed on the base station guide screen 400 by contact manipulation of a touch panel or manipulation of an external manipulation member can be moved in a direction as the user wishes.

FIG. 6 illustrates an example of display transition in a case where the pressing manipulation of the second base station indicator 406 is performed with respect to the base station guide screen 400 illustrated in FIG. 4. As illustrated in FIG. 6, in a case where the pressing manipulation of the second base station indicator 406 is performed, each piece of information which is related to the second base station corresponding to the second base station indicator 406 is displayed in an information notification indicator 411. For example, the congestion degree of the base station or the information (communication information) which is related to the communication such as communication cost information when used is displayed in the information communication notification indicator 411. The information is displayed based on memory contents of the base station information memory unit 210.

For example, as each piece of information which is related to the second base station, it may be possible to display congestion degree information 214 of the base station information memory unit 210, and content of communication cost information 215 (congestion degree of five stages, communication cost value when used). In addition, communication speed predicted in such a case may be displayed at the same time. In this way, the each piece of information which is related to the congestion degree and the communication cost may be displayed as a numerical value, and may also be displayed using an icon or the like which reminds the magnitude of the numerical value. Further, along with such each piece of information, name, address, classification of the store and information of product or the like in which the base station is installed may be displayed. Further, in a case where information which is related to a store or the like is displayed, the information is associated with each piece of information which is a display subject, is memorized in the base station information memory unit 210.

Further, also each piece of information which is related to the first base station corresponding to the first base station indicators 403 to 405 can be displayed in the same way as the each piece of information which is related to the second base station information corresponding to the second base stations indicators 406 to 409.

"Example of Operation of Wireless Communication Device"

FIG. 7 is a flowchart showing an example of a processing procedure of display control processing by the wireless communication device 200 according to a first embodiment of the present technology.

First, the position information acquisition unit 202 acquires position information (step S901). In addition, it is determined whether or not a predetermined condition for displaying information (base station information) which is related to the second base station is satisfied (step S902). A case where the predetermined condition is satisfied, for example, is the case when the user has performed a specific manipulation to display the base station information. Further, when the predetermined condition is satisfied, for example, the base station which becomes a serving cell by a selection which is performed by the wireless communication unit 201 and a cell reselection processing is the first base station. Also, there is a case which the congestion degree of the first base station is equal to or greater than the threshold value (for example, equal to or greater than four). When the specific condition is not satisfied (step S902), the processing returns to step S901.

When the predetermined condition is satisfied (step S902), the base station selection unit 203 selects the second base station (step S903) based on the position information acquired by the position information acquisition unit 202.

Subsequently, the display control unit 204 displays information (base station information) which is related to the selected second base station by the base station selection unit 203 on the display unit 206 (step S904). For example, as illustrated in FIG. 4, the second base station indicators 406 to 409 are displayed on the base station guide screen 400.

In addition, as illustrated in FIG. 5, in a case where the first base station is displayed at the same time, along with the second base station, the first base station is selected (step S903). In addition, information (base station information) which is related to the selected base station is displayed on the display unit 206 (step S904). In addition, the step 901 is an example of a position information acquisition procedure according to a claim. In addition, the steps S903 and S904 are examples of the control processing described in claims.

In this way, according to the first embodiment of the present technology, it is possible for the user who uses the first base station to easily figure out the position of the second base station which is available (communication cost of the second base station is lower than that of the first base station). In this case, in order to dispose and display the second base station on the map, it is possible to figure out the geographical position of the second base station with ease. By doing so, it is possible to realize traffic offload which is good in efficiency. Further, it is possible to provide communication system which offloads traffic of the communication service through the base station.

<2. Second Embodiment>

In the first embodiment of the present technology, the example which displays information (base station information) which is related to the second base station based on the control of the wireless communication device has been shown. Here, for example, based on the control from devices (for example, information processing device such as a server) other than the wireless communication device. Displaying the information (base station information) which is related to the second base station is also considered.

Here, in the second embodiment of the present technology, an example which displays information (base station information) which is related to the second base station based on the control from devices (for example, information processing device such as server) other than the wireless communication device. In addition, the configuration of a communication system according to the second embodiment of the present technology is almost the same as the example illustrated in FIG. 1. In this respect, the same references are attached to common parts with the first embodiment of the present technology, and a part of the description thereof is omitted.

"Example of the Configuration of the Wireless Communication Device"

FIG. 8 is a block diagram illustrating an example of the function configuration of the wireless communication device 220 according to the second embodiment of the present technology.

The wireless communication device 220 includes a position information acquisition unit 221, a position information memory unit 222, a wireless communication unit 223, a base station information acquisition unit 224, a display control unit 225, a map information memory unit 226, a display unit 227 and a manipulation reception unit 228. In addition, since the wireless communication unit 223, the map information memory unit 226, a display unit 227 and the manipulation reception unit 228 correspond to the wireless communication unit 201, the map information memory unit 205, the display unit 206 and the manipulation reception unit 207 which are illustrated in FIG. 2, a detailed description will be omitted here.

The position information acquisition unit 221 is to acquire information (position information) which is related to a position (current position) at which the wireless communication device 220 exists in constant or variable periods, and the acquired position information thereof is sequentially memorized in the position information memory unit 222 as history information.

Here, the position information acquisition unit 221 is able to acquire the position information (latitude, longitude, and altitude) using the GPS unit. Further, for example, it maybe allowed to acquire the position information (latitude and longitude which is associated with cell ID of base station) of the base station which is transmitted from a plurality of base stations, or the latitude and longitude which are calculated using received power from the plurality of base stations as the position information.

The position information memory unit 222 is to memorize the acquired position information by the position information acquisition unit 221 as the history information. In addition, the history information (position information) which is memorized in the position information memory unit 222 is transmitted at constant or variable periods to the information processing device 300 through the wireless communication unit 223.

The base station information acquisition unit 224 is to acquire base station information (information which is related to the second base station) which is provided from the information processing device 300 through the wireless communication unit 223, and the acquired base station information is output to the display control unit 225.

Here, along with information (base station information) which is related to the second base station, a case where information (base station information) which is related to the first base station which exists within a predetermined range from the current position of the wireless communication position 220 is provided from the information processing device 300 is presumed. In this case, the base station information acquisition unit 224 acquires respective base station information provided from the information processing device 300 and outputs the acquired base station information to the display control unit 225. In this way, as illustrated in FIG. 5, it is possible to display the first base station and the second base station at the same time.

The display control unit 225 is to display the acquired base station information by the base station information acquisition unit 224 on the display unit 227. For example, the display control unit 225 acquires map information which is related to a specific position by the position information from the map information memory unit 226 based on the position information (position information of the latest) which is memorized in the position information memory unit 222. In addition, the display control unit 225 displays the acquired map information, and the base station information which is output from the base station information acquisition unit 224 on the display unit 227. In addition, the display example is the same as the first embodiment (FIGS. 4 to 6) of the present technology.

"Example of the Configuration of the Information Processing Device"

FIG. 9 is a block diagram illustrating an exemplary function configuration of the information processing device 300 according to the second embodiment of the present technology.

The information processing device 300 includes a communication unit 301, a position information acquisition unit 302, a position information memory unit 303, a migration path calculation unit 304, a first selection unit 305, a base station information memory unit 306, a second selection unit 307, and transmission control unit 308. The information processing device 300, for example, may be realized by a server which acquires log information or the like from one or a plurality of wireless communication devices using wireless communication.

The communication unit 301 is to perform various communications between the communication control devices 110 and 120. For example, the communication unit 301 receives each piece of information (for example, position information) which is transmitted from the wireless communication device 220 through the communication control device 110, outputs the received each piece of information to the position information acquisition unit 302. Further, the communication unit 301 transmits information (base station information (for example, each piece of information which is illustrated in FIG. 3)) which is related to the selected second base station by the second selection unit 307 to the wireless communication device 220 through the communication control device 110 based on the control of the transmission control unit 308.

The positional information acquisition unit 302 is to acquire regularly or irregularly position information which is transmitted from the wireless communication device 220, and sequentially memorize the acquired position information in the position information memory unit 303. That is, the position information which is related to the wireless communication device 220 is memorized in the position information memory unit 303 as history information. The history information is information which is associated with, for example, terminal identification information (identification information for identifying a wireless communication device), time, and position information. Further, the position information, for example, is transmitted from the wireless communication device 220 as one element of the log information.

The position information memory unit 303 is a memory unit which memorizes the acquired position information by the position information acquisition unit 302 as the history information, and provides the history information which is memorized to the migration path calculation unit 304.

The migration path calculation unit 304 is to perform a prediction of future migration path of the wireless communication device 220 by learning the history information (position information which is related to the wireless communication device 220) which is memorized in the position information memory unit 303 from a current position of the wireless communication device 220. In addition, the migration path calculation unit 304 outputs information (including terminal identification information of the wireless communication device 220) which is related to the calculated migration path (predictive migration path) to the first selection unit 305. That is, the migration path calculation unit 304 calculates migration path which is predicted as the predictive migration path if the wireless communication device 220 migrates based on a plural pieces of position information which is acquired regularly or irregularly by the position information acquisition unit 302.

Here, the method of calculating the predictive migration path will be described. For example, the current position (the most recent position) of the wireless communication device 200 and the current time is acquired. In addition, using past migration history (or, migration history of another user) of the wireless communication device 200, it is possible to predict how the user who owns the wireless communication device 200 to migrate based on the current position of the wireless communication device 200 and the current time.

For example, using the past migration history on the current time and current day of the week, for each of plurality of migration routes where the user migrates, the probability thereof is calculated where a user migrates, and the most efficient migration route extracted. For example, in a case where current time is commuting hours on weekdays, the path commonly used for commuting is extracted as the most probable migration route. Or, by using a learning algorithm in which a Hidden Markov Model is used, it may be allowed to predict a migration route from migration route candidates which are acquired from the migration history of the past, depending on a current state (or, a certain period of time up to the present). In a plurality of migration routes where a user's migration probability is determined, a plurality of migration routes may also be notified to the user, which have a large probability compared to a threshold value (for example, 10%) which is set to be a reference. The notification example is shown in FIG. 11.

Further, using only the past migration history, other than the predictive method which predicts a migration route, destination, by analyzing personal contents such as schedule, e-mail, memo pad, determine the schedule from this, such that it is possible to use a method of predicting the destination. For example, in a case where current time is 12:00 and "meet at A station at 12:30" is recorded in the personal contents (for example, schedule), it is presumed that the user heads to "A station" from a current position. In this respect, the path heading from current position to "A station" is calculated as the predictive migration path. By doing this, with respect to the user's current location, current time, it can be predicted how the user will continue to move from now.

The base station information memory unit 306 is a memory unit which associates a position and a group which are related to each base station to memorize. In addition, in terms of memory contents, since the base station information memory unit 306 and the base station information memory unit 210 illustrated in FIG. 3 are almost the same, here, a detailed description will be omitted. Further, using each piece of information which is acquired by the communication unit 301, the memory contents of the base station information memory unit 306 are sequentially updated.

The first selection unit 305 is to select a base station (first base station or second base station) which exists (or in the vicinity of the predictive migration path) on the predictive migration path based on the calculated predictive migration path by the migration path calculation unit 304. That is, the first selection unit 305 is to select a base station, among a plurality of base stations corresponding to be memorized in the base station information memory unit 306, which exists (or in the vicinity of the predictive migration path) on the predictive migration path which is calculated by the migration path calculation unit 304. In addition, the first selection unit 305 outputs information (base station information) which is related to the selected base station, and information (predictive migration path information) which is related to the calculated predictive migration path along with terminal identification information of the wireless communication device 220 to the second selection unit 307. In the predictive migration path information, for example, the predictive migration path and the probability thereof are included.

The second selection unit 307 is to select the second base station based on the information (base station information) which is related to the selected base station by the first selection unit 305. That is, the second selection unit 307 selects the second base station from the selected base station by the first selection unit 305. In addition, the second selection unit 307 outputs information (base station information (for example, respective base station which is illustrated in FIG. 3)) which is related to the selected second base station, and the predictive migration path information along with terminal identification information of the wireless communication device 220 to the transmission control unit 308. That is, the second selection unit 307 selects the second base station which exists in a predetermined range which includes the predictive migration path along with the second base station which exists in the predetermined range which includes a position of the wireless communication device 220 from a plurality of the second base station.

Here, as illustrated in FIG. 5, a case which displays the first base station and the second base station at the same time is presumed. In this case, along with the selected second base station which is related to the information (base station information), the information (base station information) which is related to the first base station is output to the transmission control unit 308.

In this example, an example which performs a different processing between a selection processing with respect to the first selection unit 305 and a selection processing with respect to the second selection unit 307 is illustrated, however the selection processing thereof may be performed in a lump. In addition, the first selection unit 305 and the second selection unit 307 are an example of the selection unit according to the claims.

The transmission control unit 308 is to perform the transmission control of various types of data carried out between the communication control devices 110 and 120. For example, the communication control unit 308 performs control for transmitting information (base station (for example, each piece of information illustrated in FIG. 3)) which is related to the selected second base station by the second selection unit 307, and the predictive migration path information to the wireless communication device 220 through the wireless communication device 110. In this case, a destination wireless communication device (wireless communication device 220) is specified based on the terminal identification information of the wireless communication device 220 which is output from the second selection unit 307 along with the base station information.

That is, the transmission control unit 308 performs control for causing base station information to be output from the wireless communication device 220 based on position information of the wireless communication device 220, where the base station information is related to the position of the second base station which is different from the first base station in a communication method which becomes a connection subject of the wireless communication device 220. For example, the transmission control unit 308 performs control to cause the base station information to be displayed on a display unit 227 of the wireless communication device 220 by transmitting the base station information to the wireless communication device 220. In addition, the transmission control signal 308 displays the position where the wireless communication device 220 exists or the map including vicinity thereof to the display unit 227, and performs control for disposing the base station information on the position of the second base station relating to the base station information on the map to display the information. Further, the transmission control unit 308 is an example of a control unit and the transmission control unit according to the claims.

"Example of Communication Processing in Communication Systems"

FIG. 10 is a sequence chart showing an example of communication processing between each device configuring a communication system 100 according to the second embodiment of the present technology. FIG. 10 shows an example in which the wireless communication device 220 automatically acquires base station information for being displayed on the display unit 227.

First, the position information acquisition unit 221 of the wireless communication device 220 acquires position information (501), and cause the acquired position information to be memorized in a position information memory unit 222 (502). Subsequently, the wireless communication unit 223 transmits the position information which is memorized in the position information memory unit 222 to the information processing device 300 through the communication control device 110 (503 to 506). In this case, the position information may be transmitted to the information processing device 300 on condition that a predetermined condition is satisfied. The predetermined condition is the same as the first embodiment of the present technology.

If the communication unit 301 of the information processing device 300 receives the position information (506), the position information acquisition unit 302 of the information processing device 300 causes the received position information to be memorized in the position information memory unit 303 (507). Subsequently, the migration path calculation unit 304 calculates the migration path (predictive migration path) of the wireless communication device 220 based on the position information which is memorized in the position information memory unit 303 (508).

Subsequently, the first selection unit 305 selects a base station (or, base station in the vicinity of the predictive migration path) which exists on the predictive migration path based on the predictive migration path which is calculated by the migration path calculation unit 304, and the base station information which is memorized in the base station information memory unit 306 (509).

Subsequently, the second selection unit 307 selects the second base station from the selected base station by the first selection unit 305 (510).

Subsequently, the communication unit 301 transmits information (base station information) which is related to the selected second base station by the second selection unit 307, and the predictive migration path information to the wireless communication device 220 through the communication control device 110 based on the control of the transmission control unit 308 (511 to 514).

If the wireless communication unit 223 of the wireless communication device 220 receives the base station information and the predictive migration path information (514), the base station information acquisition unit 224 of the wireless communication device 220 acquires the base station information and outputs the acquired base station information and the predictive migration path information to the display control unit 225 (515). Subsequently, the display control unit 225 causes the base station information to be displayed on the display unit 227 (516). Further, the display control unit 225 causes the predictive migration path (for example, migration assist indicators 451 and 452 shown in FIG. 11) based on the predictive migration path information to be displayed on the display unit 227 (516).

"Example of Base Station Guide Screen"

FIG. 11 is a diagram illustrating an exemplary display screen which is displayed in a display unit 227 according to a second embodiment of the present technology.

FIG. 11 shows the base station guide screen 450 displaying the migration assist indicators 451 and 452. In the base station guide screen 400 in FIG. 4, the base station guide screen 450 is the display screen in which the migration indicators 451 and 452 are added to the display. The migration indicators 451 and 452 are indicators which represent the direction of the predictive migration path in which the position of the wireless communication device 220 is set as a reference. Further, in addition to the point of adding the migration assist indicators 451 and 452 to the display, since the base station guide screen 400 shown in FIG. 4 is the same as that of FIG. 11, the same references are attached to parts common with the base station guide screen 400, and a part of the description thereof is omitted.

For example, there are two paths in which one is to move from the position of wireless communication device 220 to "station which is near second base station indicators 407" (first path), and the other is move from the position of wireless communication device 220 to "station which is near second base station indicators 408" (second path). Accordingly, a case in which the two paths are calculated as the predictive migration path by the migration path calculation unit 304 is presumed. In this case, as a migration probability to the first path is calculated to be 85%, and a migration probability to the second path is calculated to be 15%. In this case, the display control unit 225 displays the migration assist indicators 451 and 452 which represent the predictive migration path. For example, the display control unit 225 acquires the current position of wireless communication device 220 from the position information acquisition unit 221. The display control unit 225 displays the migration assist indicators 451 and 452 based on the current position of wireless communication device 220, and the predictive migration path information (include each path of predictive probability) included in the base station information.

Here, in a case where a plurality of paths are calculated as the predictive migration path, each path can be displayed in a different display mode. For example, based on a predictive probability of each path, it is possible to change a size of the migration assist indicator. For example, in the example shown in FIG. 11, the probability of the migration to the first path is 85%, and that of the second is 15%, so that it is possible to display the migration assist indicator 451 corresponding to the first path larger than the migration assist indicator 452 corresponding to the second path. For example, a numerical value or character which represents the probability corresponding to each path may be denoted inside the migration assist indicator (inside the arrow) or in the vicinity thereof. FIG. 11 shows an example in which the numerical values (85% and 15%) which represent the probability corresponding to each path are denoted inside the arrow.

Further, FIG. 11 shows an example in which straight white void arrows are displayed as the migration assist indicators 451 and 452. However, the migration assist indicator may also be displayed in accordance with other display modes. For example, the predictive migration path (for example, change size depending on probability corresponding to each path) of wireless communication device 220 may be displayed on the map.

In this way, it is possible to display the predictive migration path of the user on the base station guide screen 450. By doing so, the user is able to easily figure out predicted migration path on the display screen, which makes it possible to give a kind of navigation effect.

"Example of Operation of the Wireless Communication Device"

FIG. 12 is a flowchart showing an exemplary processing procedure of display control processing by the wireless communication device 220 according to the second embodiment of the present technology.

First, the position information acquisition unit 221 acquires position information (step S911), and the acquired position information is memorized in the position information memory unit 222 (step S912). In addition, it is judged whether or not a predetermined condition is satisfied to display the base station information (step S913). The predetermined condition is the same as the first embodiment of the present technology. If the predetermined condition is not satisfied (step S913), a process may return to step S911.

If the predetermined condition is satisfied (step S913), the wireless communication unit 223 transmits the position information (history information) which is memorized in the position information memory unit 222 through the communication control device 110 to an information processing device 300 (step S914).

Subsequently, it is judged whether or not the information processing device 300 receives information which is related to the second base station (step S915), and in a case where the information which is related to the second base station is not received, continuous monitoring is performed. In a case where the information which is related to the second base station is received (step S915), the base station information acquisition unit 224 acquires the base station information (step S916), and the display control unit 225 causes the base station information to be displayed on the display unit 227 (step S917). For example, as illustrated in FIG. 4, on a base station guide screen 400, second base station indicators 406 to 409 are displayed. In addition, step S911 is an exemplary position information acquisition procedure according to claims. Further, steps S916 and S917 are an exemplary control procedure according to claims.

"Example of Operation of Information Processing Device"

FIG. 13 is a flowchart showing an exemplary processing procedure of a base station information transmission control processing by the information processing device 300 according to the second embodiment of the technology.

First, it is judged whether or not the communication unit 301 receives information from the wireless communication device (step S921), and in a case where the information from the wireless communication device is not received, continuous monitoring is performed. In a case where information from the wireless communication device is received (step S921), position information (history information) which is included in the information received by the position information acquisition unit 302 is acquired (step S922), and the acquired position information is memorized in the position information memory unit 303 (step S923).

Subsequently, the migration path calculation unit 304 calculates a migration path (predictive migration path) of the wireless communication device 220 based on the position information which is memorized in the position information memory unit 303 (step S924).

Subsequently, the first selection unit 305 selects a base station (or, base station in the vicinity of the predictive migration path) which exists on the predictive migration path, based on the predictive migration path which is calculated and the base station information which is memorized in the base station information memory unit 306 (step S925). Subsequently, the second selection unit 307 further selects the second base station from the selected base stations by the first selection unit 305 (step S926).

Subsequently, the communication unit 301 transmits information (base station information) which is related to the selected second base station by the second selection unit 307 to the wireless communication device 220 through the communication control device 110 based on the control of transmission control unit 308 (step S927). In addition, step S922 is an exemplary position information acquisition procedure according to claims. Further, steps S924 to S927 are an exemplary control procedure according to claims.

In this way, according to the second embodiment of the present technology, the position information of the wireless communication device is collected as a history and the predictive migration path is calculated, so that it is possible for a user to be notified of a position of the base station for traffic offload which is on the predictive migration path. That is, the user who utilizes the first base station is able to easily figure out the position of the second available base station (communication cost of the second base station is lower than that of the first base station) which exists on the predictive migration path (or which is closer to the predictive migration path). In this way, it is possible to build an efficient traffic offload and make the efficient use of wireless communication resources. In addition, in the present embodiment, an example of calculating the predictive migration path in the information processing device 300 which is a server is shown. However, without being limited thereto, the wireless communication device 220 itself may calculate the predictive migration path.

<3. Third Embodiment>

In the first and second embodiment of the present technology, the examples which select the second base station are shown based on the position of the wireless communication device, the predictive migration path and the like. Here, for example, it is thought to be possible to select the appropriate base station corresponding to the wireless communication device by considering such as a communication history, or a product type of the wireless communication device and a congestion degree of the base station, and by selecting the second base station.

Therefore, in the third embodiment of the present technology, based on such as a communication history, or a product type of the wireless communication device and a congestion degree of the base station, an example of selecting the second base station is shown. In addition, the configuration of a communication system according to the third embodiment of the present technology is almost the same as the example shown in FIG. 1. In this respect, the same marks are attached with respect to common parts with the first embodiment of the present technology, and a part of the description thereof is omitted. Further, hereinafter, information processing device 310 performs a selective processing on the second base station based on the communication history information, information processing device 315 performs a selective processing on the second base station based on the congestion degree information, however, such examples are shown, without being limited thereto, the wireless communication device 220 itself may perform a selective processing on the second base station based on the communication history information or the congestion degree information.

"Example of a Base Station Selection Based on the Communication History of the Wireless Communication Device"

First, an example of selecting the second base station based on the communication history of the wireless communication device is shown.

"Example of Configuration of Information Processing Device"

FIG. 14 is a block diagram illustrating an example of function configuration of an information processing device 310 according to the third embodiment of the present technology. In addition, the information processing device 310 is to transform a part of the information processing device 300 as illustrated in FIG. 9. In this respect, the same marks are attached with respect to common parts with the information processing device 300, and a part of the description thereof is omitted.

The information processing device 310 includes a communication history information acquisition unit 311, a second selection unit 312, and a communication history information memory unit 320.

The communication history information acquisition unit 311 is to acquire information (communication history information) which is related to a communication carried out between the communication control device 110, 120 and the wireless communication device 220, the acquired communication history information is sequentially memorized in the communication history information unit 320. For example, the communication history information acquisition unit 311 is possible to acquire the communication history information based on the information which is transmitted from the wireless communication device 220 when the wireless communication is performed by the wireless communication device 220. Further, the communication history information may be acquired based on information (including information which is related to the wireless communication which is performed by the wireless communication device 220) which is transmitted from the communication control devices 110 and 120.

The second selection unit 312 is to select the second base station from a selected base station by the first selection unit 305 based on the communication history information which is memorized in the communication history information memory unit 320. In addition, the second selection unit 312 outputs information (base station information (for example, each piece of information which is illustrated in FIG. 3)) which is related to the selected second base station together with the terminal identification information to the transmission control unit 308.

The communication history information memory unit 320 is to memorize, for each wireless communication device, the acquired communication history information by the communication history information acquisition unit 311, and then provides the communication history information which is memorized to the second selection unit 312. In addition, the memory content of the communication history information memory unit 320 will be described in detail with reference to FIG. 15.

"Example of Memory Contents of the Communication History Information Memory Unit"

FIG. 15 is a diagram showing an example of the memory contents of the communication history information memory unit 320 according to the third embodiment of the present technology.

The communication history information memory unit 320 is a memory unit which memorizes, for each wireless communication device, information (communication history information) which is related to communication probability or communication traffic. Specifically, in the communication history information memory unit 320, terminal identification information 321, position information 322, communication date and time information 323, communication traffic information 324, and communication cost information 325 are associated and memorized for each wireless communication device.

The terminal identification information 321 is identification information for identifying each wireless communication device.

The position information 322 is information (position information) which is related to a position in which the wireless communication device exists when the wireless communication is performed by the wireless communication device. For example, the latitude and longitude of the position in which the wireless communication device exists are memorized during the wireless communication.

The communication date and time information 323 is information (date and time information) which is related to date and time when the wireless communication is performed by the wireless communication device. For example, start time and end time of the wireless communication is memorized.

The communication traffic information 324 is information (communication traffic information) which is related to the communication traffic when the wireless communication is performed by the wireless communication device.

The communication cost information 325 is information (communication cost information) which is related to the communication cost which is applied when the wireless communication is performed by the wireless communication device.

Here, a method of selecting the second base station by the second selection unit 312 will be described.

For example, the second selection unit 312 calculates communication traffic for each timeslot (for example, every two hour) of the wireless communication device which becomes a transmission subject of the base station information based on the memory contents of the communication history information memory unit 320. In addition, if the communication traffic (communication traffic of timeslot which is calculated with respect to the wireless communication device) of the timeslot in which current time is included is large compared to the threshold which is set to a reference, the second selection unit 312 selects a base station which a communication capability is comparatively large, from among the second base station. Here, as the threshold value, for example, a fixed value (for example, 5 M) may be used, a variable value may be used. As the variable value, for example, the average value of the communication traffic for each timeslot is multiplied by a predetermined value (for example, 5) can be obtained. In this manner, in the timeslot of the communication traffic of the wireless communication device which becomes a transmission subject of the base station information, the base station in which the communication capability becomes comparatively large base station can be selected.

Here, the base station having a large communication capability, for example, is the base station having a broad range of use frequency band and the base station corresponding to a plurality of frequency band (for example, 802.11a/b/g). Further, a base station (for example, 802.11n) corresponding to MIMO (Multiple Input Multiple Output). Further, abase station with a large communication capability, for example, is a base station with less interference, a base station with few users and a base station with low congestion degree. In addition, the communication traffic of the base station is memorized in association with a base station information memory unit 306.

In this way, the second selection unit 312 further selects a specified second base station (for example, second base station in which communication capability is comparatively large) from the selected base station by the first selection unit 305 based on the communication history information which is memorized by the communication history information memory unit 320.

"Example of Operating Information Processing Device"

FIG. 16 is a flowchart showing an exemplary processing procedure of the base station information transmission control processing by the information processing device 310 according to the third embodiment of the present technology. In addition, since FIG. 16 is a modified example of FIG. 13, the same marks are attached with respect to common parts with FIG. 13, and a part of the description thereof is omitted.

First, it is judged whether or not the communication history information is received (step S931), and in a case where the communication history information is not received, the process proceeds to step S921. On the other hand, in a case where the communication history information is received (step S931), the communication history information acquisition unit 311 acquires the received communication history information (step S932), and the acquired communication history information is memorized in the communication history information memory unit 320 (step S933).

Further, the second selection unit 312 further selects a specific second base station from the selected base station by the first selection unit 305 based on the memory contents of the communication history information memory unit 320 (step S934). For example, based on the wireless communication device in a timeslot where communication traffic is comparatively large, a base station with large communication capability is selected.

In this way, based on the communication history of the wireless communication device, it is possible to select the specific second base station. Accordingly, it is possible to offload a traffic caused by a heavy user of the wireless communication device. Further, as an incentive to be connected to the second base station for traffic offload, based on the communication history of the user, it is possible to recommend the second base station which is a low cost with high capacity.

"Example of Base Station Selection Based on a Congestion Degree of Base Station"

Subsequently, an example of selecting the second base station based on the congestion degree of the base station.

"Example of Configuring Information Processing Device"

FIG. 17 is a block diagram showing an exemplary function configuration of an information processing device 315 according to the third embodiment of the present technology. In addition, the information processing device 315 is to modify a part of the information processing device 300 shown in FIG. 9. In this respect, the same marks are attached with respect to common parts with the information processing device 300, and a part of the description thereof is omitted.

The information processing device 315 includes a base station congestion degree information acquisition unit 316, a second selection unit 317, and a base station congestion degree information memory unit 330.

The base station congestion degree information acquisition unit 316 is to acquire information (congestion degree information) which is related to the congestion degree of the first base station, and sequentially causes the acquired congestion degree information to be memorized in the base station congestion degree information memory unit 330. For example, the base station congestion degree information acquisition unit 316 can obtain the congestion degree information based on the information transmitted from the wireless communication device 220 when the wireless communication is performed by the wireless communication device 220. Also, the base station congestion degree information acquisition unit 316 may acquire the congestion degree information based on information (including information which is relate to the wireless communication which is performed by the wireless communication device 220) which is transmitted from the communication control devices 110 and 120. In addition, the base station congestion degree information acquisition unit 316 is an exemplary congestion degree acquisition unit according to claims.

Here, a method of acquiring a congestion degree will be described. In this acquisition method, an example of acquiring the ratio of a dynamic occupation quantity to the total amount of the wireless channel as the congestion degree is shown.

In a case of the code division multiple access scheme, for example, based on the ratio of the actual number of codes allocated for the total number of codes available for each frame or each sub-frame, is able to calculate a congestion degree. Further, based on the ratio of the actual number of power allocated for the total number of codes available for each frame, or each sub-frame, is able to calculate a congestion degree. Further, a congestion degree may be calculated by other method (for example, a method equivalent to Japanese Unexamined Patent Application Publication No. 2011-10267)

In case of an orthogonal frequency division multiple access scheme, for example, based on the ratio of the number of subcarriers actually allocated for the number of all the subcarriers usable, a congestion degree may be calculated. Further, for each frame, or sub-frame, based on the power of subcarriers actually allocated for the power of all the subcarriers, a congestion degree can be calculated. Further, from information relating to resource, or block which is included in control information, all of subcarriers actually allocated for the number of all the subcarriers which is usable may be calculated.

The second selection unit 317 is to select the second base station from the selected base station by the first selection unit 305 based on the congestion degree information which is memorized in the base station congestion degree information memory unit 330. In addition, the second selection unit 317 is to output information (base station information (for example, each piece of information shown in FIG. 3)) which is related to the selected second base station information to the transmission control unit 308 along with the terminal identification information.

The base station congestion degree information memory unit 330 is to memorize the acquired congestion degree information by the base station congestion degree information acquisition unit 316 for each base station, and provides the congestion degree information which is memorized to the second selection unit 317. In addition, the memory content of the base station congestion degree information memory unit 330 will be described in detail by referring to FIG. 17.

"Example of Memory Contents of a Base Station Congestion Degree Information Memory Unit"

FIG. 18 is a diagram schematically showing exemplary memory content of the base station congestion degree information memory unit 330 according to the third embodiment of the present technology.

The base station congestion degree information memory unit 330 is a memory unit which memorizes information (congestion degree information) which is related to the congestion degree of the base station for each base station. Specifically, the base station congestion degree information memory unit 330 includes base station identification information 331, date and time information 332 and congestion degree information 333 which are associated and memorized for each base station.

The base station identification information 331 is identification information for identifying each first base station.

The date and time information 332 is information (date and time information) which is related to the date and time in which congestion degree information is acquired by the base station congestion degree information acquisition unit 316. For example, the congestion degree information is memorized when the congestion degree information is acquired.

The congestion degree information 333 is acquired congestion degree information by the base station congestion degree information acquisition unit 316. For example, in the same manner as the congestion degree information 214 shown in FIG. 3, a congestion degree of the base station is classified into five stages, a corresponding value (1 to 5) to the classified five stages is memorized in the congestion information 333. For example, a base station having a congestion degree 1 is a comparatively empty base station, and a base station having a congestion degree 5 is comparatively crowded.

Here, a method of selecting the second base station by the second selection unit 317 will be explained.

For example, the second selection unit 317 acquires the congestion degree information of the selected first base station by the first selection unit 305 based on the memory contents of the base station congestion degree information memory unit 330. In addition, out of the selected first base station by the first selection unit 305, only when the acquired congestion degree is large compared to a threshold value which is set to be a reference, the second selection unit 317 selects the second base station. In this case, for example, when the base station which has large congestion degree compared to a threshold value exists in a predetermined number (for example, 1), a condition to select the second base station can be accepted.

Further, for example, the second selection unit 317 is able to select the second base station based on the large congestion degree of the selected first base station by the first selection unit 305. In this case, for example, the congestion degree of the selected first base station by the first selection unit 305 gets large, accordingly, it is possible to select the second base station which has a large communication capability.

In this way, the base station congestion degree information acquisition unit 316 acquires the congestion degree of the first base station which exists in a predetermined range including at least a predictive migration path. In addition, the second selection unit 317 performs the selection of the second base station only when the acquired congestion degree is large compared to the threshold value which is set to be a reference.

"Example of Operating an Information Processing Device"

FIG. 19 a flowchart showing an exemplary processing procedure of base station information transmission control processing by an information processing device 315 according to the third embodiment of the present technology. In addition, since FIG. 19 is a modified example of FIG. 13, the same marks are attached with respect to common parts with FIG. 13, and a part of the description thereof is omitted.

First, it is judged whether or not congestion degree information is received (step S935), in a case congestion degree information is not received, the process proceeds to step 921. On the other hand, in a case where the congestion degree information is received (step S935), the base station congestion degree information acquisition unit 316 acquires the received congestion degree information (step S936), and causes the acquired congestion degree information to be memorized in the base station congestion degree information memory unit 330 (step S937)

Further, the second selection unit 317 further selects the second base station from the selected base station by the first selection unit 305 based on memory contents of a base station congestion degree information memory unit 330 (step S938). For example, out of the selected first base station by the first selection unit 305, only when the congestion degree is large compared to a threshold value which is set to be a reference the second base station is selected.

In this way, it is possible to select the second base station based on the congestion degree of the base station. In this way, it is possible to offload traffic of a user who is expected to move toward an area where the traffic is tight.

"Example of Selecting a Base Station Based on the Product Type or the Like of the Wireless Communication Device"

Subsequently, an example of selecting a second base station based on the product type or the like of the wireless communication device is shown.

"Exemplary Configuration of an Information Processing Device"

FIG. 20 is a block diagram showing an exemplary function configuration of an information processing device 340 according to the third embodiment of the present technology. In addition, the information processing device 340 is a device in which a part of modification is applied to the information processing device 300 as shown in FIG. 9. In this respect, the same marks are attached with respect to common parts with the information processing device 300, and a part of the description thereof is omitted.

The information processing device 340 includes a product type information acquisition unit 341, a second selection unit 342, a product type information memory unit 350, and a base station information memory unit 360.

The product type information acquisition unit 341 serves to acquire information which is related to a product type (product type information) of the wireless communication device, and causes the acquired product type to be memorized in the memory unit 350. The product type information acquisition unit 341, for example, is able to acquire the product type information from information which is transmitted from the wireless communication device.

The second selection unit 342 serves to select a specific second base station from selected base stations by the first selection unit 305 based on the product type information which is memorized in the product type information unit 350. In addition, the second selection unit 342 serves to output information which is related to the selected second base station (base station information (for example, each piece of information shown in FIG. 3)) along with the terminal identification information to the transmission control unit 308.

The product type information memory unit 350 serves to memorize product type information which is acquired by the product type information acquisition unit 341 for each wireless communication device, and provides the memorized product type information to the second selection unit 342. In addition, memory content of the product type information memory unit 350 will be described in detail by referring to FIG. 21.

The base station information memory unit 360 is a memory unit which memorizes each piece of information which is related to a base station. Further, memory content of the base station information unit 360 will be described in detail by referring to FIG. 22.

"Example of Memory Content of Product Type Information Memory Unit"

FIG. 21 is a diagram illustrating exemplary memory content of the product type information memory unit 350 according to the third embodiment of the present technology.

The product type information memory unit 350 is a memory unit which memorizes information (product type information) which is related to a product type of the wireless communication device for each wireless communication device. Specifically, in the product type information memory unit 350, terminal identification information 351, a product type name 352, a model name 353, a type name 354, a model number 355 and an OS version 356 are memorized in association with each wireless communication device.

The terminal identification information 351 is identification information for identifying each wireless communication device.

The terminal name 352, the model name 353, the type name 354, the model number 355 and the OS version 356 are respectively a terminal name, a model name, a type name, a model number of the wireless communication device, an OS version which is mounted in wireless communication device. In addition, at least one of these may be memorized. Further, other information (information which is related to the product type) which is related to the wireless communication device may be memorized.

"Example of Memory Content of Base Station Information Memory Unit"

FIG. 22 is a diagram schematically showing an example of the memory content of the base station information memory unit 360 according to the third embodiment of the present technology.

The base station information memory unit 360 is the memory unit which memorizes each piece of information which is related to the base station for each base station. Specifically, in the base station information memory unit 360, group information 361, base station identification information 362, position information 363, congestion degree information 364, timeslot information 365 and communication unit price information 365 are associated for each base station and memorized therein. Further, in the base station information memory unit 360, a tablet 367, a smartphone 368, and a mobile phone 369 are memorized in association with each base station.

In addition, the group information 361, the base station identification information 362 and the position information 363 correspond to the group information 211, the base station identification information 212 and the position information 213 as shown in FIG. 3.

The congestion degree information 364, in the same manner as congestion degree information 214 shown in FIG. 3, is information (congestion degree information) which is related to a congestion degree of the base station. However, in this example, along with current congestion degree, the congestion degree information (predictive information) in the future (for example, after 10 minutes) is memorized. The predictive information, for example, is calculated based on the congestion degree in the past. As prediction information, for example, an average value of the congestion degree of the corresponding time in the past few days can be used.

The timeslot information 365 is information showing a predetermined timeslot. This example shows a case where a day is divided into three timeslots (from 1:00 am to 7:00 am, from 7:00 am to 13:00 pm, from 13:00 pm to 1:00 am on the following day).

The communication unit price information 366, in the same manner as the communication unit price information 215 shown in FIG. 3, is information (communication unit price information) which is related to a communication unit price which is applied when a base station is connected. However, in this example, the communication unit price information is memorized for each timeslot of the timeslot information 365.

The tablet 367, smartphone 368 and mobile phone 369 are information showing whether or not a tablet type wireless communication device, smartphone and mobile phone respectively correspond thereto. In a corresponding case, as the information, "1" is memorized, while in a case which is not corresponding, "0" is memorized.

Here, information ("0" for non-coping and "1" for coping) memorized in each of the tablet 367, the smartphone 368, and the mobile phone 369 is determined from time to time for each timeslot on the basis of a history (history for each timeslot) of the congestion degree of the base station. For example, the base station in the timeslot in which the congestion degree "1" is expected can cope with up to the tablet (that is, "1" for the tablet 367, "1" for the smartphone 368, and "1" for the mobile phone 369 are set). For example, the base station in the timeslot in which the congestion degree "3" is expected can cope with up to the smart phone (that is, "0" for the tablet 367, "1" for the smartphone 368, and "1" for the mobile phone 369 are set). For example, the base station in the timeslot in which the congestion degree "4" is expected can support only the mobile phone (that is, "0" for the tablet 367, "0" for the smartphone 368, and "1" for the mobile phone 369 are set). A specific base station (for example, a public wireless LAN (for example, with base station identification information 362 "a99999")) may be made to cope with up to the tablet regardless of the congestion degree.

In addition, in the congestion degree information 364 and the communication unit price information 366, the memory content thereof are sequentially updated based on acquired information by the wireless communication unit 201. In addition, in response to the update, the information which is respectively memorized in the tablet 367, smartphone 368 and mobile phone 369 is sequentially updated.

Here, a method of selecting a second base station by the second selection unit 342 will be described.

For example, the second selection unit 342, based on the memory content (product name 352, model name 353, type name 354, model number 355) of the product type information memory unit 350, specifies a type (tablet, smartphone, mobile phone) of the wireless communication device which becomes a transmission subject of the base station. In addition, the second selection unit 342 selects the second base station corresponding to the specified type, based on the base station information of the base station selected by the first selection unit 305.

For example, if it is specified to be the wireless communication of the tablet type, the second base station where "1" is memorized in the tablet 367 is selected. In the same manner, if it is specified to be the smartphone, the second base station is selected where "1" is memorized in the smartphone 368, and if it is selected to be the mobile phone, the second base station is selected where "1" is memorized in the mobile phone 369.

In this way, the second selection unit 342, based on the memory content of the product type information memory unit 350, further selects the second base station (second base station corresponding to the wireless communication) which is specified from second base stations.

"Example of Operating Information Processing Device"

FIG. 23 is a flowchart showing an exemplary processing procedure of a base station information transmission control device by the information processing device 340 according to the third embodiment of the present technology. In addition, since FIG. 23 is a modified example of FIG. 13, the same marks are attached with respect to common parts with FIG. 13, and a part of the description thereof is omitted.

First, it is judged whether or not the communication unit 301 receives information from the wireless communication device (step S921), if the information from the wireless communication device is received, product type information included in the information which is received by the product type information acquisition unit 341 is acquired (step S941). In addition, the acquired product type information is memorized in the product type information memory unit 350 by the product type information acquisition unit 341 (step S942).

Further, the second selection unit 342, based on the memory content of the product type information memory unit 350, further selects a specific second base station from the selected base stations by the first selection unit 305 (step S943). For example, if it is selected to be the wireless communication device of the table type, the second base station is selected where "1" is memorized in the tablet 367.

In this way, it is possible to select the second base station based on the product type of the wireless communication device. In this way, it is possible to offload traffic of the product type which consumes relatively a lot of packets.

<4. Fourth Embodiment>

In the third embodiment of the present technology, the example of selecting the second base station is shown in consideration of the communication history and product type of the wireless communication device, and the congestion degree of the base station. Here, for example, as for the user who pays a large amount of communication costs, it is considered to give preferential treatment with respect to the payments.

Accordingly, in the fourth embodiment of the present technology, an example is shown with respect to the user who pays a large amount of communication costs. In addition, the configuration of a communication system according to the fourth embodiment of the present technology is almost same as the example shown in FIG. 1. In this respect, the same marks are attached with respect to common parts with the first embodiment of the present technology, and a part of the description thereof is omitted.

"Example of the Configuration of the Information Processing Device"

FIG. 24 is a block diagram showing an example of function configuration of an information processing device 345 according to the fourth embodiment of the present technology. In addition, the information processing device 345 is a device in which a part of modification is applied to the information processing device 310 as shown in FIG. 14. In this respect, the same marks are attached with respect to common parts with the information processing device 310, and a part of the description thereof is omitted.

A wireless communication device 345 includes a communication cost calculation unit 346, a second selection unit 347, and a base station information memory unit 370.

The communication cost calculation unit 346, is a unit to calculate a communication cost (total cost of the latest communication) of a wireless communication device based on communication history information which is memorized in a communication history information memory unit 320, and outputs the calculated communication cost to the second selection unit 347.

Here, the total cost of the latest communication is described. For example, if a contract of the wireless communication device is a contract which a communication cost thereof is claimed on a monthly basis, the total cost of the latest communication cost represents latest expenses which is related to the communication cost on a monthly basis. For example, by the communication date and time information 323 of the communication history information memory unit 320 shown in FIG. 15, it is specified whether or not the communication is in a monthly basis. In addition, in respective communication in a monthly basis, each value of communication traffic information 324 of the communication history information memory unit 320 and communication unit price information 325 is multiplied, and an additional value for a multiplication value of each communication becomes a total cost of the latest communication cost. In addition, a contract from which the communication cost is claimed is not limited to a monthly basis, even also in a contract in which the communication cost is claimed on a daily and a weekly basis, the contract form is able to be applied in the same manner.

The second selection unit 347 serves to select the second base station from selected base stations by a first selection 305 based on the communication cost which is calculated by the communication cost calculation unit 346. For example, when the communication cost which is calculated by the communication cost calculation unit 346 is large compared to a threshold value which is set to be a reference, a specified second base station (base station with large communication capacity) as a premium service for the user is selected. In addition, the second selection unit 347 outputs information (base station information (for example, each piece of information shown in FIG. 3)) which is related to the selected second base station along with a terminal identification information to a communication control unit 308.

A base station information memory unit 360 is a memory unit which memorizes each piece of information which is related to a base station. In addition, memory content of the base station information memory unit 360 will be described in detail by referring to FIG. 25.

"Example of Memory Content of Base Station Information Memory Unit"

FIG. 25 is a diagram schematically showing exemplary memory content of the base station information memory unit 370 according to the fourth embodiment of the present technology.

In addition, the base station information memory unit 370 is a unit in a part of modification is applied to the base station information memory unit 360 shown in FIG. 22. In this respect, the same marks are attached with respect to common parts with the base station information memory unit 360, and a part of the description thereof is omitted.

In the base station information memory unit 370, premium service information 371 is memorized in association with each base station.

The premium service information 371 is information showing whether or not the second base station (premium service base station) becomes a subject of premium service. For example, the second base station where "0" is memorized in the premium information 371, a communication cost which is selected without regard to the communication cost calculated by the communication cost calculation unit 346. On the other hand, the second base station (premium service base station) where "1" is memorized in the premium information 371 is selected only when the communication cost which is calculated by the communication cost calculation unit 346 is large compared to the threshold value (for example, 50,000 yen).

That is, as for the case when user's communication cost is small compared to threshold value which is set to be a reference, a recommendation of the premium service base station is not performed for the user, as for the case when user's communication cost is large compared to threshold value which is set to be a reference, a recommendation of the premium service base station is performed for the user. The premium service base station, for example, is the second base station in which a communication capability thereof is large. The second base station with the large communication capability can be set to be the same as the reference shown in the third embodiment of the present technology.

Here, a method of selecting the second base station by the second selection unit 347 will be described.

The second selection unit 347 selects the second base station from the selected base stations by the first selection unit 305 based on the communication cost which is calculated by the communication cost calculation unit 346. For example, in a case where the communication cost which is calculated by the communication cost calculation unit 346 is large compared to the threshold (for example, 50,000 Yen) which is set to be a reference, the second base station is selected where "0" or "1" is memorized in the premium service information 371. On the other hand in a case where the communication cost which is calculated by the communication cost calculation unit 346 is small compared to the threshold (for example, 50,000 Yen) which is set to be a reference, only the second base station is selected where "0" is memorized in the premium service information 371.

That is, the communication cost calculation unit 346 calculates a communication cost of the wireless communication device based on communication history information. In addition, the second selection unit 347 selects a specific second communication (premium service base station) only when the calculated communication cost is large compared to the threshold value which is set to be a reference.

Here, in the base station information which is related to the second base station where "1" is memorized in the premium service information 371, an effect thereof is included. In addition, the wireless communication device which receives the base station information is able to display the effect. For example, it is possible to cause the second base station (premium base station) where "1" is memorized in the premium information 371 and the other second base station to be displayed in different display modes to each other.

For example, visually different effects is given by causing the premium base station and the other second base station on the map to be displayed in such a different color from each other, and it is possible to notify a premium base station. Further, the existence of the premium base station may be notified by a message or the like. In addition, FIG. 26 shows a display example of the premium base station.

Further, from the second base stations which are selected by a selection method shown in the first to third embodiments of the present technology, the selection may be performed based on the communication cost which is calculated by the communication cost calculation unit 346.

"Example of Displaying Base Station Guide Screen"

FIG. 26 is a diagram showing an exemplary display screen which is displayed on the display unit 227 according to the fourth embodiment of the present technology.

In addition, the display screen in FIG. 26 is a drawing in which a premium service information notification indicator 412 is added and displayed in the base station guide screen 400 shown in FIG. 4. Further, since the point that the premium service information notification indicator 412 is added and displayed is the same as a base station guide screen 400 shown in FIG. 4, the same marks are attached with respect to common parts with the base station guide screen 400, and a part of the description thereof is omitted.

That is, FIG. 26 shows a display example with respect to a case in which the second base station indicator 408 is a premium base station in the base station guide screen 400 shown in FIG. 4. In addition, in the wireless communication device of a user when user's communication cost is small compared to threshold value which is set to be a reference, the second base station indicator 408 and the premium service notification indicator 412 are not displayed.

"Example of Operating Information Processing Device"

FIG. 27 is a flowchart showing an exemplary processing procedure of a base station information transmission control processing by an information processing device 345 according to the fourth embodiment of the present technology. Further, since FIG. 27 is the modified example of FIG. 16, the same marks are attached with respect to common parts with FIG. 16, and a part of the description thereof is omitted.

The communication cost calculation unit 346 calculates the communication cost (total cost of the latest communication) of the wireless communication device (step S945) based on the communication history information which is memorized in the communication history information memory unit 320. Subsequently, the second selection unit 347 selects the second base station from the selected base stations by the first selection unit 305 based on the communication cost which is calculated by the communication cost calculation unit 346 (step S946). For example, in a case where the communication cost is large compared to the threshold which is set to be a reference, the second base station is selected where "0" or "1" is memorized in the premium service information 371, in a case where the communication cost is small compared to the threshold which is set to be a reference, only the second base station is selected where "0" is memorized in the premium service information 371.

In this way, in the fourth embodiment of the present technology, it is possible to offload the traffic of a heavy user who use a packet communication service, along with this, also, it is possible to reduce the risk which the communication cost is skyrocketing with respect to the heavy user in a contract form of pay-as-you-go. Further, by reducing the risk which the communication cost is skyrocketing, it is also possible to increase the ARPU (Average Revenue Per User) for the heavy user.

"Example of Using a Plurality of Conditions as a Premium Service Condition"

In the above, the example of selecting a base station using a single threshold value as the premium service condition. However, a plurality of conditions (for example, a plurality of threshold values) may be used to select the base station as a premium service. Accordingly, in this example, the example of selecting the base station using a plurality of conditions (for example, a plurality of threshold values) as a premium service.

"Example of Memory Content of Base Station Information Memory Unit"

FIG. 28 is a diagram schematically illustrating an exemplary memory content of a base station information memory unit 375 according to the fourth embodiment of the present technology.

In addition, the base station information memory unit 375 is a unit in a part of modification is applied to the base station information memory unit 370 shown in FIG. 25. In this respect, the same marks are attached with respect to common parts with the base station information memory unit 370, and a part of the description thereof is omitted. Further, in FIG. 28, an illustration such as congestion degree information 364 and timeslot information 365 are omitted shown in FIG. 25.

In the base station information memory unit 375, premium service information 376 is memorized in association with each base station. Here, as the premium service information 376, a plurality conditions are memorized. As the plurality of conditions, it is possible for the plurality of conditions to become conditions according to a communication cost.

For example, a case where a communication cost per day (communication cost/day) is used as a reference is presumed. For example, communication cost 1 is applied when a communication cost per day (communication cost/day) is more than or equal to 1000 (yen/day), and communication cost 2 is applied when the communication cost per day (communication cost/day) is less than 1000 (yen/day) and more than or equal to 500 (yen/day). For example, communication cost 3 is applied when the communication cost per day (communication cost/day) is less than 500 (yen/day) and more than or equal to 300 (yen/day) and communication cost 4 is applied when the communication cost per day (communication cost/day) is less than 300 (yen/day).

For example, for the user whose a communication cost per day (communication cost/1 day) is less than 1000 (yen/day), the second base station with base station identification information 362 "a99999" is not recommended. On the other hand, the user whose the communication cost per day (communication cost/1 day) is equal to or greater than 1000 (yen/day), the second base station of base station identification information 362 "a99999" is recommended.

"Example of Transmitting Setting Information of Premium Service"

In the above, an example of notifying a user who is able to receive the premium service based on the communication cost of the existence of a premium service base station is shown. Here, with respect to the premium service base station, by allowing only the user who is able to receive the premium service based on the communication cost to use, it is considered to be possible to cause contents of the premium service for the user to be enhanced further. Accordingly, in this example, an example of allowing only the user who receives the premium service based on the communication cost to use the premium service base station.

"Example of Configuring Information Processing Device"

FIG. 29 is a block diagram showing exemplary function configuration of an information processing device 380 according to the fourth embodiment of the present technology. In addition, the information processing device 380 is a device in which a part of modification is applied to the information processing device 345 as shown in FIG. 24. In this respect, the same marks are attached with respect to common parts with the information processing device 345, and a part of the description thereof is omitted.

The information processing device 380 includes a setting information memory unit 381 and a transmission control unit 382.

The setting information memory unit 381 is a memory unit which the wireless communication device connects to the premium service base station and memorizes necessary setting information in order to receive communication service, and provides the setting information which is memorized to the transmission control unit 382. Here, the setting information is information for connecting to the premium service base station, for example, a SSID (Service Set Identifier) or a password.

Transmission control unit 382 performs control for transmitting information (base station information (for example, information shown in FIG. 3)) which is related to the selected second base station by the second selection unit 347 through a communication control device 110. Further, in a case where the premium service base station is selected by the second selection unit 347, the transmission control unit 382 performs control for transmitting information (base station information) which is related to the premium service base station, and the setting information which is related to the premium service base station. That is, the transmission control unit 382 performs control for causing the setting information which is used to connect to the specific second base station (premium service base station) to be set up in the wireless communication device.

Here, for example, when the wireless communication device 220 receives the setting information which is related to the base station and the premium service base station thereof, the wireless communication device 220 maintains the setting information. In addition, when the wireless communication device 220 is connected to the premium service base station, a connection processing is performed based on the setting information.

In this way, since the premium service base station is allowed to use on the limited wireless communication device, it is possible to further enhance the premium service content for the user.

"Example of Selecting Base Station Based on the Interference Information"

Here, it is very likely for the second base station to receive interference from the other base station according to the installation situation, therefore, it is important to figure out the interference situation of the base station. Accordingly, this example shows an example of selecting the second base station based on the interference information.

"Example of Configuring Information Processing Device"

FIG. 30 is a block diagram showing an exemplary function configuration of the information processing device 385 according to the fourth embodiment of the present technology. In this respect, since the information processing device 385 is the modified example of the information processing device 345 shown in FIG. 24, the same marks are attached with respect to common parts with the information processing device 345, and a part of the description thereof is omitted.

The information processing device 385 includes an interference information acquisition unit 386, a second selection unit 387, and a base station information memory unit 390.

The interference information acquisition unit 386, through the communication unit 301, serves to acquire information (interference information) which is related to the interference of the second base station, and causes the acquired interference information to be sequentially memorized in the base station memory unit 390.

Here, a method of acquiring interference information will be described. For example, the wireless communication device which receives a communication service through the second base station, based on information (pilot signal, reference signal, quality of beacon signal) received when the communication service is received, generates information (interference signal) which is related to a interference. In addition, the wireless communication device which generates the interference information regularly or irregularly transmits the generated interference information to a information processing device 385. It is possible for the interference information acquisition unit 386 to acquire the transmitted interference information. That is, the interference information acquisition unit 386 acquires information which is related to the interference which the second base station receives from other base station from the wireless communication device using the second base station.

For example, the second selection unit 387 selects a base station with less interference, out of the second base stations, for a wireless communication device in which a communication traffic at a certain timeslot is larger than those of other wireless communication devices. The second selection unit 387 selects a base station with less interference, out of the second base stations, for a product type such as a smartphone in which a packet communication traffic is relatively large. The second selection unit 387 selects a base station with less interference as a premium service for a wireless communication device in which a communication cost (the total of the latest communication costs) is larger than a threshold value. That is, the second selection unit 387 can select a specific second base station (for example, a base station with less interference) out of the second base stations on the basis of the information on interference.

"Example of Memory Content of Base Station Information Memory Unit"

FIG. 31 is a diagram schematically showing an exemplary memory content of the base station information memory unit 390 according to the fourth embodiment of the present technology.

In addition, the base station information memory unit 390 is a unit in which a part of modification is applied to the base station information memory unit 370 as shown in FIG. 25. In this respect, the same marks are attached with respect to common parts with the base station information memory unit 370, and a part of the description thereof is omitted. Further, in the FIG. 31, an illustration of the time slot information 365, and the communication unit cost information 366 shown in FIG. 25 is omitted.

In the base station information memory unit 390, the interference information 391 is memorized in association with each base station. The interference information is acquired and memorized by the interference information acquisition unit 386. For example, in the same way as the congestion degree information 214 shown in FIG. 3, an interference of the base station is classified into five stages, and the value (1 to 5) corresponding to the classified five stages is memorized in the interference information 391. For example, the station 1 is a base station having comparatively small interference, the base station 5 is a base station having a large interference.

Here, for example, since a public wireless LAN (second base station) requires no license when installed, depending on the installation situation, it is very likely to receive the interference from the other base stations. Further, since the most widely used 2.4 GHz band overlaps with ISM (Industry Science Medical) band, it is also susceptible to inference from electrical appliances such as a microwave oven.

Accordingly, in this example, it is possible to properly figure out the interference situation of the second base station for which degradation of communication speed caused by the interference is a concern. Further, based on the interference information, it is possible to properly select the second base station.

<5. Fifth Embodiment>

In the first to fourth embodiments of the present technology, examples which display the base station have been shown. Here, for example, a information (for example, store information) which is related to a location in which a second base station is installed is displayed along with a base station information, by doing so, it is possible to provide a user with the information which is related to the location.

Accordingly, in the fifth embodiment of the present technology, an example which displays information (for example, store information) which is related to the location in which the second base station is installed along with the base station information is shown. In addition, the configuration of a communication system according to the fifth embodiment of the present technology is almost same as the example shown in FIG. 1. In this respect, the same marks are attached with respect to common parts with the first embodiment of the present technology, and a part of the description thereof is omitted.

"Example of Configuring Information Processing Device"

FIG. 32 is a block diagram showing an example of function configuration of an information processing device 500 according to the fifth embodiment of the present technology. In addition, the information processing device 500 is a device in which a part of modification is applied to the information processing device 300 shown in FIG. 9. In this respect, the same marks are attached with respect to common parts with the information processing device 300, and a part of the description thereof is omitted.

The information processing device 500 includes a transmission control unit 501 and a store information memory unit 510.

The store information memory unit 510 is a memory unit which memorizes each piece of information (store information) which is related to a store in which the second base station is installed, and provides the store information which is memorized to the transmission control unit 501. In addition, a memory content of the store information memory unit 510 will be described in detail by referring to FIG. 33.

The transmission control unit 501 performs control for transmitting information (base station information (for example, each piece of information shown in FIG. 3)) which is related to the selected second base station by a second selection unit 307 to a wireless communication device 220 through a communication control device 110. In this case, if the store information is associated and memorized in the second base station according to the base station information which becomes a transmission subject, the transmission control unit 501 acquires the store information from the store information memory unit 510, and transmits the acquired store information along with base station information to the wireless communication device 220.

"Example of Memory Content of Store Information Memory Unit"

FIG. 33 is a diagram schematically illustrating an exemplary memory content of a store information memory unit 510 according to the fifth embodiment of the present technology.

The store information memory unit 510 is a memory unit which memorizes information (store information) which is related to the location in which the second base station is installed for each base station. Specifically, in the store information memory unit 510, base station identification information 511, store identification information 512, store information 513, advertising information 514, link information 515, and coupon information 516 are memorized in association with each base station.

The base station identification information 511 is a identification information for identifying the second base station.

The store identification information 512 is identification information for identifying the store in which the second base station is installed.

The store information 513 is information which is related to the store in which the second base station is installed. For example, a store name, a contact address of the store and an electric field number are memorized.

The advertising information 514 is various types of information which is related to the store such as introduction information of and an advertisement of the store in which the second base station is installed. As the introduction information of the store, for example, information which is related to products handled by the store, the contact address of the store, store hours, vacancy information (for example, in case of the store such as a restaurant), availability (for example, in case of the store of a medical institute) are memorized in the advertising information 514. That is, the information which is memorized in the advertising information 514 can be, for example, a newspaper flyers and information having equivalent function. Further, it may be possible to store dynamic information such as a time sale. Further, each piece of information such as these can be appropriately updated by a manipulation from each store.

The link information 515 is link information for accessing the store in which the second base station is installed. For example, a telephone number for calling, and a URL (Uniform Resource Locator) for accessing a homepage which is operated by the store.

The coupon information 516 is information which is related to a coupon provided by a user. For example, in the wireless communication device which receives store information, a predetermined manipulation for issuing the coupon which can be used at a predetermined store is performed, by doing so, the user is able to use in the store by acquiring the coupon.

"Example of Displaying Base Station Guide screen"

FIGS. 34 to 36 are diagrams showing exemplary display screen which is displayed on a display unit 227 according to the fifth embodiment of the present technology.

In addition, a base station guide screen 433 shown in FIG. 34 is a display screen which adds and displays a store information notification indicator 413 in the base station guide screen 400 shown in FIG. 4. Further, a base station guide screen 434 shown in FIG. 35 is the display screen which adds and displays an advertising information notification indicator 414 in the base station guide screen 400 shown in FIG. 4. In addition, when it comes to the point of adding and displaying, since it is the same as the base station guide screen 400 shown in FIG. 4, the same marks are attached with respect to common parts with the base station guide screen 400, and a part of the description thereof is omitted.

Further, in the display example shown in FIGS. 34 to 36, although an example of displaying such as a store information notification indicator with respect to one base station is shown, it may be allowed to display such as the store information notification indicator with respect to a plurality of base stations. Further, it may be allowed to select a base station based on the user's manipulation.

FIG. 34 shows the base station guide screen 433 in which the store information notification indicator 413 is displayed which is related to the store in which the second base station indicator 408 is installed. For example, content (store name, contact address) of store information 513 shown in FIG. 33 is displayed in the store information notification indicator 413.

Here, in a case where a link is attached to the store information notification indicator 413 (for example, in case where advertising information 514 is associated with), a visual effect which is different from other text information may be expressed on the link part (for example, contact address part). In addition, when the attached part of the link is pressed down, a notification indicator is displayed to display information which is related to the part.

For example, the display example of the case where the store name part (Café, Every day) is pressed down is shown in FIG. 35. Further, the display example of the case where the contact address part (03-1234-5678) is pressed down is shown in FIG. 36.

FIG. 35 shows the base station guide screen 434 in which the advertising information notification indicator 414 is displayed which is related to the store in which the second base station indicator 408 is installed. For example, contents of the advertising information 514 shown in FIG. 33 is displayed in the advertising information notification indicator 414. In this way, in the advertising information notification indicator 414, information which is related to the products handled by the store, and an advertisement such as information which is related to a cell are displayed.

In this way, a transmission control unit 501 performs control to cause the base station information, and information which is related to a store in which the second base station is installed according to the base station information to be displayed on a display unit 227 of a wireless communication device 220.

FIG. 36 shows an exemplary display migration of a manipulation screen for accessing a store in which the second base station is installed corresponding to the second base station indicator 408.

In FIG. 36, "a" shows a manipulation screen 420 when the contact address part (03-1234-5678) is pressed down in the store information notification indicator 413 shown in FIG. 34. The manipulation screen 420 is displayed based on link information 515 shown in FIG. 33.

The manipulation screen 420 causes an instruction button 421 for accessing the home page in which the store operates, an instruction button 422 for calling the store, and return button 423 to be displayed. The return button 423 is a button which is pressed own in case of returning to the previous screen.

For example, when the instruction button 421 is pressed down, using a packet communication, a Web screen corresponding to the URL which is included in the link information 515 shown in FIG. 33 causes the display unit 227 to be displayed.

Further, for example, when the instruction button 422 is pressed down, a call screen 425 shown in "b" of FIG. 36 is displayed. In this way, when a call screen 425 is switched by pressing down the instruction button 422, a call processing in the wireless communication device is started. In addition, in a case where the call processing is performed with the call processing 425 being displaying, it is possible to stop the call processing by pressing down the stop button 426.

In this way, in the fifth embodiment of the present technology, it is possible to provide such as the store information and advertising information along with base station information. The interest of the user which is related to the location is increased by providing the user with such information, by doing so, it is possible to increase the opportunities for making use of the second base station at a low cost. Further, by providing the user with the store information and store advertising information in which the second base station is installed, it is possible to make.

<6. Sixth Embodiment>

In the first to fifth embodiments of the present technology, an example of displaying the base station information and store information is shown. Here, for example, a discount for communication of using the second base station is performed for a user who performs a predetermined consumption at the store in which a second base station is installed, by performing, by doing so, it is considered to be able to increase opportunities of using the second base station.

Accordingly, the sixth embodiment of the present technology shows an example of performing a discount for communication of using the second base station in a case where a predetermined consumption is performed at the store in which the second base station is installed. In addition, a configuration of the communication system according to the sixth embodiment of the present technology is almost same as the example shown in FIG. 1. In this respect, the same marks are attached with respect to common parts with the first embodiment of the present technology, and a part of the description thereof is omitted.

"Example of Configuration of Information Processing Device"

FIG. 37 is a block diagram showing an exemplary function configuration of an information processing device 520 according to the sixth embodiment of the present technology. In addition, the information processing device 520 is a device in which a part of modification is applied to the information processing device 300 shown in FIG. 9. In this respect, the same marks are attached with respect to common parts with the information processing device 300, and a part of the description thereof is omitted.

The information processing device 520 includes a purchase history information acquisition unit 521, a communication cost setting unit 522, a transmission control unit 523 and a purchase history information memory unit 530.

The purchase history information acquisition unit 521 serves for the user who owns a wireless communication device to acquire information (purchase history information) which is related to a purchase history at the store (or associated store) in which the second base station is installed. In addition, the purchasing history information acquisition unit 521 causes purchase history information to be memorized in the purchase history information memory unit 530. For example, the purchase history information memory unit 521 acquires the purchase history information based on information from the store (or associated with store) in which the second base station is installed.

The purchase history information memory unit 530 is a memory unit which memorizes the acquired purchase history information by the purchase history information acquisition unit 521, and provides the memorized purchase history information to the communication cost setting unit 522. In addition, memory content of the purchase history information memory unit 530 will be described in detail by referring to FIG. 38.

The communication cost setting unit 522 is a unit to set up a communication cost of the wireless communication device which performs the wireless communication by being connected to the second base station based on the purchase history information which is memorized in the purchase history information memory unit 530. In addition, the communication setting unit 522 transmits information (communication cost setting information) for setting up the communication cost which is set up to communication control devices 110 or 120.

The transmission control unit 523 performs control for transmitting information (base station information (for example, each piece of information shown in FIG. 3)) which is related to the selected second base station by the second selection unit 307 through the communication control device 110 to the wireless communication device 220. In this case, in order to cause the communication cost which is set up by the communication cost unit 522 to be applied, the communication control unit 501 transmits the communication cost control setting information to a carrier who manages and operates the selected second base station by the second selection unit 307.

"Example of Memory Content in Purchase History Information Memory Unit"

FIG. 38 is a diagram schematically showing the memory content of the purchase history information memory unit 530 according to the sixth embodiment of the present technology.

The purchase history information memory unit 530 is a memory unit which memorizes each piece of information (purchase history information) which is related to the purchase of products or service in the store (or associated with store) in which the second base station is installed for each wireless communication unit (for each user). Specifically, in the purchase history information memory unit 530, terminal identification information 531, store identification information 532, base station identification information 533, purchase time information 534, total payment sum information 535, and purchase product information 536 are memorized in association with each wireless communication device.

The terminal identification information 531 is identification information for identifying each wireless communication device.

The store identification information 532 is identification information for identifying the store in which the second base station is installed.

The base station identification information 533 is identification information for identifying the second base station.

The purchase time information 534 is information showing a time when a purchase of products or service is made at the store in which the second base station is installed.

The total payment sum information 535 is information showing a total payment sum with regard to the purchase of products or service which is made at the store in which the second base station is installed.

The purchase product information 536 is information showing the products or service which is purchased at the store in which the second base station is installed.

Further, in this example, the purchase history information memory unit 530 shows an example of memorizing the purchase history information for each store. However, in a case of store as a franchise store format or a chain store format, the purchase history information for each franchise store, or for each chain store may be memorized.

Further, as the purchase history information, it may memorize information such as a settlement amount for each time, payment methods as whether it is paid in cash or in credit card, gender, and age.

Here, a method of setting up the communication cost is described. For example, the communication cost setting unit 522 acquires the purchase history information (for example, total payment sum information 535) which is associated with the store in which the selected second base station by the second selection unit 307 is installed from the purchase history information memory unit 530.

In addition, the purchase cost setting unit 522 sets up a communication unit price which occurs when using a base station in which the store is installed which is associated with the purchase history information base on the acquired purchase history information. For example, in as case where the value (for example, the total value of total payment sum information 535) which is specified by the purchase history information is large compared to the threshold value (for example, 100,000 Yen) which is set to be a reference, a discount communication unit price (for example, 10% discount) is set up. On the other hand, in a case where the value which is specified by the purchase history information is small compared to the threshold value which is set to be a reference, a normal communication unit price is set up.

Here, the wireless communication device which receives a notification of the communication which is related to the communication unit price set by the communication cost setting unit 522 may use the base station to which the unit price is applied, in such a case, a communication cost is calculated based on the communication price. That is, a communication service can be performed at the variable communication cost based on the purchase history at the store.

For example, it is possible for a user who purchases expensive products at a store to get such as discounts on the communication charges with respect to the communication service through the base station in which the store is installed. In this way, since it is possible to receive communication service in better environment with the discounted communication charges applied, therefore, the desire for the purchase can be further promoted at the store.

<7. Seventh Embodiment>

In the first to sixth embodiments of the present technology, examples which display the base station information and the store information have been shown. Here, for example, depending on whether or not the wireless communication device exists in the range of the second base station desired by the user, it is possible to take on/off control of a wireless communication unit which performs a wireless communication with the base station. Further, for example, when the user moves to the second base station desired by the user, it is considered to provide a user interface which supports the move thereof.

Accordingly, the seventh embodiment of the present technology shows examples of taking on/off control of the wireless communication unit, and providing a user interface which supports the user's move. In addition, the configuration of a communication system according to the seventh embodiment of the present technology is almost the same as the example shown in FIG. 1. In this respect, the same marks are attached with respect to common parts with the first embodiment of the present technology, and a part of the description thereof is omitted.

"Example of the Configuration of the Information Processing Device"

FIG. 39 is a block diagram showing an example of function configuration of a wireless communication device 250 according to the seventh embodiment of the present technology. In addition, a wireless communication device 250 is a device in which a part of modification is applied to wireless communication device 220 as shown in FIG. 8. In this respect, the same marks are attached with respect to common parts with the information processing device 220, and a part of the description thereof is omitted.

The wireless communication device 250 includes a first wireless communication unit 251, a display control unit 251, a display control unit 252, a judgment unit 253, a power management unit 254, and a second wireless communication unit 255.

The first wireless communication unit 251 and the second wireless communication unit 255 are wireless communication unit which corresponds to a plurality of wireless communication service, wherein the wireless communication unit includes a reception unit which receives a wireless signal which is transmitted from each base station, and a transmission unit which transmits a wireless communication signal to each base station. That is, the first wireless communication 251 and the second wireless communication 255 correspond to the wireless communication unit 223 shown in FIG. 8. However, the first wireless communication unit 251 is able to connect to only the first base station, the second wireless communication unit 255 is able to connect only the second base station. Further, the second wireless communication unit 255 takes power on/off control by the power management unit 254.

The display control unit 252 is a unit to cause the acquired base station by the base station information acquisition unit 224 to be displayed on the display unit 227.

Here, in a case where the base station guide screen 400 shown in FIG. 4 is displayed on the display unit 227, a case which the user presses down the second base station indicator 408 is presumed. In this case, the display control unit 252 is able to notify the user of the selected second base station by representing the second base station indicator 408 in different display modes from the other second base station indicators 406, 407, and 409. Further, the display control unit 252 outputs information which is related to the second base station correspond to the second base station indicator 408 which is selected by the user's press-down manipulation to the judgment unit 253. In addition, the press-down of the second base station indicator 408. Further, in addition to the press-down manipulation on a touch panel, the other manipulation members (for example, keyboard) may be used.

Further, the position information acquisition unit 221 acquires information (position information) which is related to a position in which the wireless communication device 250 exists, and outputs the acquired position information to the judgment unit 253 and the display control unit 252 with a fixed or variable period.

The judgment unit 253 compares the information which is related to the position of the second base station which is selected by the user's manipulation, and the position information which is acquired by the positional acquisition unit 221. In addition, the judgment unit 253 judges whether or not the wireless communication device 250 exists within the area of the second base station which is selected by the user's manipulation based on the result of the comparison.

For example, the judgment unit 253 holds each type of threshold value for the second base station. In this case, the judgment unit 253 calculates the distance between the position of the second base station which is selected by the user's manipulation and the position in which the wireless communication device 250 exists, and judges whether or not the calculated distance is less than the threshold value which is associated with the second base station. In addition, if the calculated distance is less than the threshold value which is associated with the second base station, the judgment unit 253 judges that the wireless communication device 250 exists in the area of the second base station. On the other hand, if the calculated distance is greater than or equal to the threshold value associated with the second base station, the judgment unit 253 judges that the wireless communication device 250 does not exist in the area of the second base station.

Further, the judgment unit 253 outputs a judgment result to the display unit 252 and the power management unit 254. For example, if the judgment unit 253 judges that the wireless communication device 250 exists in the area of the second base station, judgment information to the effect of that is output to the display control unit 252 and the power management unit 254. On the other hand, if the judgment unit 253 judges that the wireless communication device 250 does not exist in the area of the second base station, judgment information to the effect of that is output to the display control unit 252 and the power management unit 254.

The power management unit 254 is a unit to manage a power of the second wireless communication unit 255, and take a power on/off control of the second wireless communication 255 based on the judgment information which is output from the judgment unit 253. Specifically, when the judgment information to the effect that judging the wireless communication device 250 exists in the area of the second base station is received, the power management unit 254 performs a start processing of the second wireless communication unit 255, and takes control from off-state to on-state. On the other hand, when the judgment information to the effect that judging the wireless communication device 250 does not exist in the area of the second base station is received, the power management unit 254 maintains a power off state of the second wireless communication unit 255.

Further, when the judgment information to the effect that judging the wireless communication device 250 exists in the area of the second base station which is selected by the user is received, the display control unit 252 causes the point to be displayed on the display unit 227. For example, it is possible to cause the point such as a letter and icon to be displayed.

In this way, depending on whether or not the wireless communication device 250 exists in the area of the second base station which is selected by the user's manipulation, it is possible to take a power on/off control of the second wireless communication unit 255. In this way, only when it is necessary, the power of the second wireless communication unit 255 can be turned on, therefore, in addition to the effect of traffic offload, it is possible to reduce the power consumption.

Here, power management unit 254 may be allowed to perform power on/off switching control of the second wireless communication unit 255 automatically, and it may be performed on the condition that the control thereof is permitted according to the user's manipulation. For example, in a case where a power of the second wireless communication unit 255 is controlled from on-state to off-state, or in a case where the state is controlled from OFF to ON, it is possible for the display control unit 252 to perform the display to ask the user for permission, and the purpose may be notified to the user through sound, tone, or vibration caused by the vibrator along with display to ask the user for permission. Further, the power management unit 254 may preset whether the on/off switching control for the power of the second wireless communication unit 255 is performed automatically or manually through the user manipulation.

In this way, the manipulation reception unit 228 receives a selection manipulation which selects the second base station which is desired from the second base station which is displayed on the display unit 227. Further, the judgment unit 253 judges whether or not the wireless communication device 250 is present in the communication area of the selected second base station by the selection manipulation based on a position of the selected second base station by the selection manipulation, and a position of the wireless communication device 250. Further, the power management unit 254 controls a power of the second wireless communication unit 255 to be connected to the second base station which is selected by the selection manipulation based on a result of the judgment by the judgment unit 253.

"Example of Controlling Power According to the Presence or Absence of the Wireless Communication in the Second Wireless Communication Unit"

Further, the power management unit 254 may judge whether or not a wireless communication is not performed through the second wireless communication unit 255. In this case, in a case where the wireless communication is performed through the second wireless communication unit 255, when a power of the second wireless communication unit 255 is controlled from on-state to off-state, or when the state is controlled from OFF to ON, the display control unit 252 may perform a display for asking the user for permission. However, a certain period of time, in a case where a permission manipulation is not performed by the user to perform a state-switching control from OFF to ON, the power management unit 254 continues to maintain the ON state of power of the second wireless communication unit 255. In this case, the display unit 252 asks the user for permission to perform a state-switching control of the power of the second wireless communication unit 255 from on to off so as to clear the display.

"Example of Correcting a Threshold Value Corresponding to the Reception Level of Signal"

Further, it is possible to correct the threshold value according to the reception level of the signal from the second base station selected by the user manipulation. For example, the power management unit 254 can judge whether or not it is possible for the second wireless communication unit 255 to receive at a predetermined level a pilot signal, a reference signal, beacon signal or the like from the selected second base station by the user manipulation. In this case, in a case where it is impossible for the second wireless communication unit 255 to receive at the predetermined level to receive the pilot signal from the selected second base station by the user manipulation, the power management unit 254 notifies the judgment unit 253 of that effect. In addition, after the notification, it may be allowed for the power management unit 254 to perform switching control of the second wireless communication unit 255 from on-state to off-state.

Here, based on whether or not it is possible for the second wireless communication unit 255 at the predetermined level to receive the pilot signal from the selected second base station by the user manipulation, it is possible for the judgment unit 253 to correct a threshold value which is associated with the second base station which is maintained. For example, the distance between the position of the second base station which is selected by the user's manipulation and the position in which the wireless communication device 250 is present, which is in the case of being less than the threshold value associated with the second base station is presumed. In this case, from the power management unit 254, when the judgment unit 253 receives a notification to the effect that it is impossible for the second wireless communication unit 255 at the predetermined level to receive the pilot signal or the like from the second base station, correction is performed to reduce the threshold which is associated with the second base station. Specifically, for example, a case where the threshold value which is associated with the second base station is 10 m is presumed. In this case, even when the distance between the second base station and the wireless communication device 250 was within 10 m, it was impossible to communicate. However, in a case where the communication is possible when the distance was 5 m, the threshold value is corrected to be approximately 5 m. In this way, it is possible for the threshold value used in power on/off of the second wireless communication unit 255 to be corrected depending on the real communication situation.'

Further, a case which is judged it is impossible at the predetermined level to receive the pilot signal or the like from the second base station is presumed. In this case, the power management unit 254 may also be controlled to cause the second wireless communication unit 255 to be operated in the intermittent operation mode until it is possible to receive a predetermined level of signal. Further, even after the intermittent operation is performed during a certain period time, in a case which is judged it is impossible to receive the predetermined level of signal, the power management unit 254 may control a power of the second wireless communication unit 255 from the intermittent mode to off-state.

"Example of Displaying Base Station Guide Screen"

FIGS. 40 and 41 are diagrams showing an exemplary display screen which is displayed on the display unit 227 according to the seventh embodiment of the present technology.

FIG. 40 shows a base station guide screen 435 displaying a selection state indicator 415 and a migration assist indicator 416. The base station guide screen 435 is a display screen displaying the selection state indicator 415 and the migration assist indicator 416 in addition to the base station guide screen 400 shown in FIG. 4. Since the base station guide screen is the same as the base station guide screen 400 shown in FIG. 4 except that these indicators are additionally displayed, the same elements as in the base station guide screen 400 are referenced by the same reference numerals and some thereof will not be described.

For example, it is assumed that a second base station indicator 406 is selected in the base station guide screen 400 shown in FIG. 4 through the user's manipulation (for example, a manipulation of pressing a display screen). In this case, the display control unit 252 displays the selection state indicator 415, which indicates that the second base station indicator 406 is selected, around the second base station indicator 406. The display control unit 252 displays the selected second base station indicator 406 in a display format different from that of the other second base station indicators 407 to 409. For example, a color different from that of the other second base station indicators 407 to 409 is given to the selected second base station indicator 406.

In this way, when the user of the wireless communication device 250 migrates after the second base station indicator 406 is selected, a migration assist indicator 416 indicating the trace of the migration is displayed. For example, the display control unit 252 acquires position information of the position (the position of the wireless communication device 250) at the time of selecting the second base station indicator 406 and the present position of the wireless communication device 250 from the position information acquiring unit 221. The display control unit 252 displays the migration assist indicator 416 connecting the position at the time of selecting the second base station indicator 406 to the present position on the basis of the acquired position information.

Further, FIG. 40 shows an exemplary a line of the white arrow as a migration assist indicator 416, however, the movement trajectory of the wireless communication device 250 may be sequentially displayed on the map.

In this way, it is possible for a history of the migration path according to the user's own migration to be displayed on the base station guide screen 435. In this way, the user can easily figure out a position relationship relative to the selected second base station in the display screen, from which it is possible to provide a kind of navigation effect. For example, even when the user resides in an area with which the user is unfamiliar, the user can use the navigation effect to the desired second base station.

FIG. 41 shows a base station guide screen 436 displaying a migration assist indicator 417 instead of the migration assist indicator 416 in the base station guide screen 435 shown in FIG. 40. Since the base station guide screen 436 is the same as the base station guide screen 435 shown in FIG. 40 except for this point, the same elements as in the base station guide screen 435 are referenced by the same reference numerals and some thereof will not be described.

Here, when the second base station indicator 406 is selected, the display control unit 252 displays the migration assist indicator 417 indicating the shortest path from the position of the wireless communication device 250 to the position of the second base station corresponding to the second base station indicator 406. That is, the traveling direction at the present position of the wireless communication device 250 is displayed as the migration assist indicator 417 on the basis of the shortest distance from the present position of the wireless communication device 250 to the second base station selected through the user's manipulation.

For example, the display control unit 252 acquires position information of the position (the position of the wireless communication device 250) at the time of selection of the second base station indicator 406 from the position information acquiring unit 221. The display control unit 252, based on the position information which is acquired and position information of the second base station corresponding to the second base station indicator 406 causes a migration assist indicator 417 to be displayed. Further, depending on the migration of the wireless communication device 250, the display control unit 252, based on the position information after the migration, and the position information of the second base station corresponding to the second base station indicator 406, causes the migration assist indicator 417 to be sequentially displayed.

In addition, although FIG. 41 shows an example of displaying a white arrow as a migration assist indicator 417, for example, the migration assist indicator may be displayed along the road on the map.

Further, the migration assist indicator 416 shown in FIG. 40 and the migration assist indicator 417 in FIG. 41 may be displayed at the same time. Further, these display changeovers may be performed by the user manipulation.

In this way, if the selection manipulation which selects the second base station which is desired from the second base station which is displayed on the display unit 227 is selected by the manipulation reception unit 228, the display control unit 252 causes the migration assist indicator to be displayed on the display unit 227. That is, the display control unit 252, based on the position of the second base station which is selected by the selection manipulation, and the position of the wireless communication device 250, causes the migration support image (migration assist indicator) for supporting the migration to the second base station which is selected by the selection manipulation to be displayed on the display unit 227.

In addition, in the example shown in FIGS. 40 and 41, based on the current position of the wireless communication device 250, characters such as "please just go straight on" "make sure to turn left at the next intersection" may be displayed on the base station guide screens 435 and 436. Further, by performing audio output of these characters, a migration access guiding may be performed.

Further, in the example shown in FIGS. 40 and 41, in a case where the wireless communication device 250 enters within the area of the second base station which is selected by the user manipulation, a color effect may be added. For example, what the wireless communication device 250 enters within the area can be notified to the use through sound, tone, or vibration caused by the vibrator. Further, for example, in the base station guide screens 435 and 436, a visual effect may be further added and displayed to the second base station indicator 406 corresponding to the second base station which is selected by the user manipulation. In addition, the notification the sound and vibration and the notification may be performed at the same time or at any time.

In the above, an example which displays the migration assist indicator corresponding to the selected second base station is shown. For example, in a case where the selected second base station exists on the path frequently used by the user, although the migration assist indicator is not displayed, it is presumed that the user is able to migrate easily to the selected second base station. For example, without displaying the migration assist indicator corresponding to the second base station which exists on the path frequently used by the user, only migration assist indicator may be displayed, which corresponds to the second base station which exists on the path which is less frequently used by the user. In this way, it is possible to notify the user that the second base station exists also in the path (path less frequently used by the user) other than the path frequently used by the user. In this way, the user can be promoted to use the second base station which exists in each place.

"Example of Display of Base Station Guide Screen"

FIG. 42 is a diagram illustrating an exemplary display screen which is displayed on the display unit 227 in the seventh embodiment of the present technology.

FIG. 42 shows the base station guide screen 460 to display the migration assist indicator 481. A map display area 470 is displayed on the base station guide screen 460. Further, the map display area 470 shows second base station indicators 471 to 475, a current position indicator 480, and a migration assist indicator 481.

The migration assist indicator 481 is the indicator which represents the direction of the predictive migration path in which the position of the wireless communication device 250 is set as a reference. Here, in a plurality of migration routes calculating the probability which the user migrates, FIG. 42 shows an example which notifies the user that only migration route that has a small probability compared to a threshold value (for example, 20%) which is set to be a reference. That is, the migration assist indicator 481 is the indicator which represents the direction of the migration route (predictive migration path) to have a small probability compared to a threshold value (for example, 20%) which is set to be a reference.

For example, it is assumed that two paths (a first path and a second path) are calculated by the migration path calculation unit 304 based on the migration history in the past as a predictive migration path. The first path is a path (that is, main street) proceeding to the second base station indicators 471 to 473 from the position of the wireless communication device 250. Further, the second path is a path (that is, an alley) proceeding to the second base station indicators 474 and 475 from the position of the wireless communication device 250. In this case, 90% of probability for the migration to the first path is calculated, and 10% of probability for the migration to the second path is calculated. In this case, the display control unit 252 displays only migration assist indicator 481 which represents the second path (predictive migration path) to be small probability compared to the threshold value (for example, 20%) which is set as a reference.

Further, in a case where there are a plurality of the predictive migration paths which display the migration assist indicator, each path can be displayed in a different display mode.

"Example of Operating a Wireless Communication Device"

FIG. 43 is a flowchart showing an exemplary display control processing by a wireless communication device 250 according to the seventh embodiment of the present technology. In addition, since FIG. 43 is a modification example of FIG. 12, the same marks are attached with respect to common parts with the FIG. 12, and a part of the description thereof is omitted.

In the state where the base station information is displayed on the display unit 227, it is judged whether or not a user manipulation is performed (step S951). For example, as shown in FIG. 4, in the state where the second base station indicators 406 to 409 are displayed in the base station guide screen 400, it is judged whether or not the user manipulation is performed (step S951). In addition, in a case where the user manipulation is not performed (step S951), a continuous monitoring is performed. On the other hand, in a case where the user manipulation is performed (step S951), it is judged whether or not the user manipulation is selection manipulation of the base station (step S952).

In a case where the user manipulation is not a selection manipulation of the base station (step S952), it is judged whether or not the user manipulation is a display termination manipulation (step S953), in a case where the user manipulation is the display termination manipulation, the operation of the display control process ends. On the other hand, in a case where the user manipulation is not the display termination manipulation (step S953), a processing responding to the user manipulation is performed (step S954), a process returns to step S951.

In a case where the user manipulation is the selection manipulation of the base station (step S952), it is judged whether or not a base station which is selected by the selection manipulation is the second base station (step S955). In addition, in a case where the base station which is selected by the selection manipulation is not the second base station (step S955), a process returns to step S954.

In a case where the base station which is selected by the selection manipulation is the second base station (step S955), the judgment unit 253 acquires a position information of the selected second base station (step S956), position information of the wireless communication device 250 is acquired (step S957).

Subsequently, the judgment unit 253 calculates a distance between the selected second base station and the wireless communication device 250 (step S958) based on the position information of the selected second base station, and the position information of the wireless communication device 250 (step S958). Subsequently, the judgment unit 253 judges whether or not the calculated distance is less than the threshold value (step S959). In addition, in a case where the calculated distance is equal to or greater than the threshold value (step S959), the display control unit 252 displays a migration support image up to the selected second base station (step S959), the display control unit 252 displays the migration support image up to the selected second base station (step S960), a process returns to step S958. For example, a migration assist indicator 416 shown in FIG. 40, or a migration assist indicator 417 shown in FIG. 41 is displayed.

Further, in a case where the distance which is calculated is less than the threshold value (step S959), the power management unit 254 performs a start processing of the second wireless communication unit 255 (step S961). Subsequently, the display control unit 252 performs a notification to the effect that the wireless communication device 250 enters within the area of the selected second base station (step S962). Along with this notification, a notification by a sound or vibration may be performed.

In this way, in the seventh embodiment of the present technology, until migrated within the area of the second base station which is selected by the user manipulation, the power of the second wireless communication unit 255 is in off-state. Further, in a case where the user is migrated within the area of the second base station which is selected by the user manipulation, the power of the second wireless communication unit 255 is in off-state. In this respect, it is possible to reduce the power consumption of the second wireless communication unit 255 which uses a communication service through the second base station.

Further, in the seventh embodiment of the present technology, until migrated in the second base station area which is selected by the user manipulation, the migration assist indicators 416 and 417 are displayed. By referring to the migration assist indicators 416 and 417, the user is able to migrate into the area of the second base station which is desired. In this respect, the user is able to quickly migrate into the area of the second base station which is desired. In this way, the user is able to comfortably perform the wireless communication in the second base station which is desired by the user, along with this, it possible to make effective use of wireless communication resources.

<8. Eighth Embodiment>

In the first to seventh embodiments of the present technology, examples which display the base station information and the store information have been shown in the wireless communication device. Here, for example, it is also presumed that sufficient communication speed cannot be secured by the base station (access point). In this way, when it is notified to a user that a base station (second base station) cannot secure sufficient communication speed, it is also presumed that the user is not able to use the wireless communication properly.

In the eighth embodiment of the present technology, an example is shown, which notifies the user of only second base station in which a predetermined condition is satisfied by an effective communication speed.

For example, according to a backhaul line of the base station (access point) in the wireless LAN spot (place capable of using public wireless LAN), the wireless LAN spot exists from which sufficient communication speed is not secured. Further, the backhaul line is a line for connecting the base station with a backbone network such as an internet. When the access point (AP) of wireless LAN is installed, usually, the backhaul line is necessary in each base station.

For example, it is widely known that the communication speed of ADSL (Asymmetric Digital Subscriber Line) varies significantly depending on the distance from a switching center. In this respect, in a case where the access point is installed through the ADSL at a point which is separate from the switching center, despite less interference from other wireless LAN spot and few users who use the access point, the communication speed mostly ends up becoming a slow wireless LAN spot. That is, the wireless LAN spot using ADSL corresponds to the wireless LAN spot incapable of providing sufficient communication speed.

"Example of Communication Processing in Communication System"

FIG. 44 is a sequence chart showing an exemplary communication processing between each device which configures a communication system in the eighth embodiment of the present technology. Further, in the configuration of the communication system in the eighth embodiment of the present technology is almost the same as the example shown in FIG. 1. For example, FIG. 44 will be described by taking the communication system as an example, which is configured by a wireless communication system 610, a communication control device 620 and an information processing device 630.

Here, the wireless communication device 610 corresponds to the wireless communication device 200 or the like shown in FIG. 1, the communication control device 620 corresponds to the wireless control devices 110 and 120 shown in FIG. 1, and the information processing device 630 corresponds to the information processing device 300 or the like shown in FIG. 1. Further, FIG. 44 shows an example in which the effective communication speed information is transmitted through the communication control device 620 (that is, through first base station) from the wireless communication device 610 to the information processing device 630 by a communication method other than a wireless LAN after the end of the communication service in the wireless LAN spot. A communication method other than the wireless LAN, for example, is W-CDMA.

First, the wireless communication device 610 starts the communication service in the wireless LAN spot. That is, the wireless communication device 610 is connected to the base station (second base station) to perform a wireless communication in the wireless LAN spot (701).

Subsequently, the wireless communication device 610 measures the effective communication speed (702), and memorizes the effective communication speed which is calculated by the measurement as the history information (703). Further, the wireless communication device 610 repeatedly performs the measurement of effective communication speed (702), and the memory of effective communication speed (703) while being connected to the same base station (second base station). For example, regularly or irregularly, the effective communication speed is measured, and information which is associated with the effective communication speed obtained by the measurement, time, and base station identification information (cell ID) are sequentially memorized as history information of the effective communication speed (effective communication speed of time series).

Further, in a case where the communication service is ended in the wireless LAN spot (704), the wireless communication device 610 transmits the history information of the memorized effective communication speed to the information processing device 630 through the communication control device 620 (705 to 708).

In a case where the history information of the effective communication speed is received (708), the information processing device 630 memorizes the history information of the effective communication speed received (709). In this case, for example, based on the base station identification information included in the history information, the history information of the effective communication speed is memorized in each base station (709). Further, the history information of the effective communication speed received from other wireless communication device is also sequentially memorized in each base station.

Subsequently, the information processing device 630 calculates average value of the effective communication speed (average effective communication speed) in each base station based on the history information of the effective communication speed memorized (710). In this case, for example, the average value of the effective communication speed in each base station may be calculated every predetermined time slot (for example, every two hours).

Subsequently, the information processing device 630 selects the second base station satisfying a predetermined condition based on the calculated average effective communication speed (711). For example, the second base station which is large compared to a threshold value which is set to be a reference by the calculated average effective communication speed, is selected as the second base station satisfying the predetermined condition (711).

Subsequently, information processing device 630 transmits the information related to the selected second base station (base station information) to the wireless communication device 610 through the communication control device 620 (712 to 715).

Subsequently, when the base station information is received (715), the wireless communication device 610 displays the received base station information on the display unit (716).

In FIG. 44, an example is shown in which the history information of the effective communication speed is transmitted by the communication method other than the wireless LAN after communication service ends in the wireless LAN spot. However, for example, the history information of the effective communication speed may be transmitted using the communication service in the wireless LAN spot. For example, right before the communication service ends in the wireless LAN spot, it is possible to transmit the history information of the effective communication speed using the communication service.

Further, In FIG. 44, the example is shown in which the history information of the effective communication speed is transmitted at the time the communication service ends in the wireless LAN spot. However, the history information of the effective communication speed may be transmitted at the other timing (for example, timing satisfying predetermined condition).

Here, for example, the transmission timing satisfying a predetermined condition can be any time out of following 1 to 4.

1. time when the communication service is ended in the wireless LAN spot
2. time when the congestion degree of the first base station is less than the threshold, or the communication quality of the first base station is equal to or greater than a certain level
3. time when the wireless communication device 610 is started to be charged
4. time at the predetermined time (for example, at 3 a.m.)

These transmission timings may be set by the user's manual manipulation (for example, change manipulation in menu screen).

"Example of Wireless Communication Device Operation"

FIG. 45 is a flow chart showing an exemplary processing procedure of the effective communication speed measurement processing by the wireless communication device 610 in the eighth embodiment of the present technology.

First, the wireless communication device 610 starts the communication service in the wireless LAN spot (step S971). Subsequently, the wireless communication device 610 measures the effective communication speed (step S972), and memorizes the effective communication speed obtained by the measurement as the history information (step S973).

Subsequently, the wireless communication device 610 judges whether or not the communication service is ended in the wireless LAN spot. In a case where the communication service is not ended, a step returns to the step S972, and the measurement of the effective communication speed (step S972) and the memory of the effective communication speed (step S973) is repeatedly performed.

Further, in a case where the communication service is ended in the wireless LAN spot (step S974), the wireless communication device 610 judges whether or not the transmission timing satisfies the predetermined condition (step S975). Further, the transmission timing satisfying the predetermined condition can be any timing out of the above described 1 to 4.

In a case where the transmission timing does not satisfy the predetermined condition (step S975), a monitoring is continuously performed. On the other hand, the transmission timing satisfies the predetermined condition (step S975), the wireless communication device 610 transmits the history information of the effective communication speed memorized to the information processing device 630 through the wireless control device 620 (step S976).

In this way, in the eighth embodiment of the present technology, while the user receives the communication service in the wireless LAN spot, the wireless communication device 610 measures the effective communication speed. Ina case where the transmission timing satisfies the predetermined condition, the wireless communication device 610 transmits the history information to the information processing device 630. Further, as a method of detecting the effective communication speed, in conjunction with the performance of web browsing, content downloading, video watching or the like, the user may also measure a cumulative number of download packets, a cumulative number of download bytes, or a cumulative change in the number of download bits per each unit time (for example, one second), a cumulative number of upload packet, a cumulative number of upload byte, or a cumulative number of upload bits per each unit time, and calculate a download and upload speeds. The average value of the measured download and upload speeds for a certain period of time (for example, ten seconds) may be used as the effective communication speed. According to this method, the effective communication speed can be measured without generating new communication for the measurement of the effective communication speed.

Further, when the information processing device 630 receives history information of the effective communication speed, the information processing device 630 measures the history information of the effective communication speed in each base station and calculates the effective communication speed of each base station. The information processing device 630 can select the base station (second base station) in which the predetermined condition is satisfied by the effective communication speed, and recommend the base station to the user. That is, the selection unit of the information processing device 630 can select only the second base station in which the predetermined condition is satisfied by the effective communication speed.

For example, the wireless LAN spot (second base station) in which the effective communication speed is low in any time slot can be estimated to be the wireless LAN spot using the ADSL in the above described backhaul line. In this way, the wireless LAN spot (second base station) in which the communication speed is low all the time may be excluded from the base station group recommended to the user. For example, a processing such as not displaying on the map may be performed in the wireless communication device.

In addition, in the second to eighth embodiments of the present technology, the information processing device performs each processing such as the predictive migration path, based on the result of the processing, and may causes information (base station information or the like) to be displayed on the display unit of the wireless communication device. However, each processing (calculation of predictive migration path or the like) in which information processing is able to be performed is performed by the information processing system, and the information (base station information or the like) may be displayed on the wireless communication device based on the result of the processing. In addition, each processing (calculation of predictive migration path or the like) in which information processing is able to be performed is performed by the information processing system existing on the network may be performed by the information processing system, and the information (base station information or the like) based on the processing result may be displayed on the wireless communication device. In addition, the information processing system on the network is system which is configured of one or a plurality of devices, and cloud computing is assumed.

Further, in the second to eighth embodiments of the present technology, the information processing device (for example, information processing device 300) which is configured as a unit has been described as an example. However, these information processing devices include each units, it is also possible to apply the present technology to the information processing system which is constituted by a plurality of devices. In addition, the embodiment of the present technology can be applied to a portable-type wireless communication device (for example, a data communication-dedicated terminal device), or stationary-type wireless communication device (for example, a wireless communication device for collecting data of the vending machine).

In the first to eighth embodiment of the technology, an example which causes base station information or the like to be output by causing base station information or the like to be displayed on the display unit of the wireless communication device. However, for example, a voice output unit (for example, speaker) of the wireless communication device may cause the base station information to be output. For example, associate voice information in the base station information (for example, the message "There is uncharged base station at the store in front of the station), the voice output unit of the wireless communication device is able to cause the voice information to be output. Further, in the electronic devices (for example, outer voice output device, outer display device) which is connected to the wireless communication device, the base station information may be output. In this case, the wireless communication device transmits the base station information or the like to the electronic device and the electronic device causes the base station information to be output.

In addition, the above described embodiment is to show an example for embodying the technology, facts according to the embodiment, and a specific matter of the invention in claims are in corresponding relation each other. In the same manner, the specific matter of the invention in claims, and facts according to the embodiment of the present technology having same name with this are in the corresponding relationship. However, without being limited to the embodiments of the present technology, the embodiments can be realized by performing various modifications to the embodiments without departing from the scope of the claims.

Further, processing procedures described in the above embodiment, which may be regarded as a method having a series of procedures, further, a program to cause a series of procedures to be executed in the computer or a recording media to memorize the program may be captured. As the recording media, for example, CD (Compact Disc), MD (MiniDisc), DVD (Digital Versatile Disk), memory card, Blu-Ray Disc (registered trademark) or the like may be used.

The present technology is able to adopt following configurations.

(1) An information processing device includes a position information acquisition unit which acquires position information on a position at which a wireless communication device exists, and a control unit which performs control to cause base station information to be output from the wireless communication device, where the base station information is related to a position of a second base station which is different from a first base station in a communication system which becomes a connection subject of the wireless communication device based on the acquired position information.

(2) The information processing device according to (1), wherein the control unit performs control for displaying the base station information in a display unit of the wireless communication device.

(3) The information processing device according to (2), wherein the control unit displays a map which includes a position in which the wireless communication device exists or the vicinity thereof to the display unit, and performs the control for disposing and displaying the base station information to the position of second base station which is related to the base station information concerned on the map.

(4) The information processing device according to (2) or (3), further includes a selection unit that selects a second base station out of a plurality of the second base stations which exists in a predetermined range which includes a position specified by the acquired position information,
wherein the control unit performs control for displaying the base station information which is related to the selected second base station in the display unit.

(5) The information processing device according to (4), further includes a migration path calculation unit which calculates as a predictive migration path, a migration path along with the wireless communication device is predicted to migrate based on a plurality of pieces of the position information which is acquired regularly or irregularly by an acquisition unit,
wherein the selection unit selects the second base station which exists in a predetermined range which includes a position specified by the acquired position information out of the plurality of the second base stations, and a second base station which exists in a predetermined range which includes the calculated predictive migration path out of the plurality of the second base stations, and wherein the control unit performs control for displaying the base station information which is related to the selected second base stations in the display unit.

(6) The information processing device according to (5), further includes a congestion degree acquisition unit which acquires a congestion degree of the first base station which exists in the predetermined range which includes the calculated predictive migration path, wherein the selection unit performs the selection of the second base station only when the acquired congestion degree is large compared to a threshold value which is set to be a reference.

(7) The information processing device according to (4), further includes a product type information unit which acquires information which is related to a product type of the wireless communication device, wherein the selection acquisition unit further selects a specific second base station out of the selected second base stations based on the information which is related to the acquired product type.

(8) The information processing device according to (4), further includes a communication history information acquisition unit which acquires history information which is related to communication of the wireless communication device, and wherein the selection unit further selects a specific second base station out of the selected second base stations based on the acquired communication history information acquisition unit.

(9) The information processing device according to (8), further includes a communication cost calculation unit which calculates a communication cost of the wireless communication device based on the acquired history information, wherein the selection unit selects a specific second base station only when the calculated communication cost is large compared to a threshold value which is set to be a reference.

(10) The information processing device according to (4), further includes an interference information acquisition unit which acquires, from the wireless communication device which uses the second base station, information which is related to an interference which is received by the second base station from other base stations, wherein the selection unit further selects the specific second base station out of the selected second base station based on the information which is related to the acquired interference.

(11) The information processing device according to any one of (8) to (10), wherein the control unit performs control for setting up setting information e which is used in a connection with the specific second base station in the wireless communication device.

(12) The information processing device according to any one of (2) to (11), wherein the control unit performs control for displaying the base station information and information which is related to a store in which the second base station is disposed on the display unit.

(13) The information processing device according to (12), further includes a purchase history information acquisition unit which acquires information which is related to a purchase history of an owner of the wireless communication device in the store, and a communication cost setting unit which sets a communication cost when the wireless communication device uses the second base station which is disposed at the store based on the information which is related to the acquired purchase history. (14) The information processing device which is the wireless communication device according to any one of (2) to (13), further includes a first wireless communication unit which performs wireless communication between the first base stations, a second wireless communication unit which performs wireless communication between the second base stations, a manipulation reception unit which receives a selection manipulation which selects a desired second base station out of the second base station which is displayed in the display unit, a judgment unit which judges whether or not the wireless communication device exists in a communication area of the second base station selected by the selection manipulation based on a position of second base station selected by the selection manipulation and a position specified by position information acquired by the position information acquisition unit, and a power management unit to control the power of the second wireless communication unit for connecting the second base station which is selected by the selection manipulation based on a judgment result by the judgment unit.

(15) The communication processing device according to any one of (2) to (14), further includes when the information processing device is the wireless communication device, a manipulation reception unit which receives a selection manipulation which selects a desired second base station out of the second base stations which are displayed in the display unit, wherein the control unit performs the control for displaying a movement support image for supporting movement toward a second base station which is selected by a selection manipulation in the display unit based on both a position of a selected second base station by the selection manipulation and a position specified by position information which is acquired by the position information acquisition unit.

(16) The information processing device according to any one of (1) to (15), wherein the second base station is lower in terms of a communication cost than the first base station, or wherein the second base station is faster in terms of a communication speed than the first base station.

(17) The information processing device according to (4), wherein the selection unit selects only the second base station in which an effective communication speed satisfies a predetermined condition.

(18) A wireless communication device includes a position information acquisition unit which acquires position information which is related to a position in which a wireless communication device exists, and an output control unit which outputs base station information which is related to a position of a second base station which is different from a first base station in a communication system which becomes a connection subject of the wireless communication device based on the acquired position information. (19) A communication system includes an information processing device which is provided with a position information acquisition unit which acquires position information which is related to a position in which a wireless communication device exists, and a transmission control unit which transmits base station information which is related to a position of second base station which is different from a first base station in a communication system which becomes a connection subject of the wireless communication device based on the acquired position information to the wireless communication device; and a wireless communication device which is provided with a display control unit which displays the base station information which is transmitted from the information processing device in a display unit.

(20) An information processing method includes acquiring position information which is related to a position in which a wireless communication device exists, and performing control to cause a base station information which is related to a position of a second base station which is different from a first base station in a communication system which becomes a connection subject of the wireless communication device based on the acquired position information to be output from the wireless communication device.

(21) An information processing device includes a control unit to control display of information of a base station of a first wireless communication method existing around a predictive migration path by using position information of the information processing device, the information processing device using a second wireless communication method.

(22) The information processing device according to (21), wherein the information processing device is a mobile wireless communication device.

(23) The information processing device according to (21), wherein the predicative path is calculated based on predetermined stored position information.

(24) The information processing device according to (23), wherein the predetermined stored position information includes information acquired from the information processing device.

(25) The information processing device according to (21), wherein the control unit controls display of a predetermined base station based on a determination of whether a user has a predetermined status.

(26) The information processing device according to (25), wherein whether the user has the predetermined status is determined based on a comparison of a communication cost with a threshold value.

(27) The information processing device according to (26), wherein the control unit causes display of the predetermined base station when the user is determined to have the predetermined status, wherein the user is determined to have the predetermined status when the communication cost is determined to be large compared to the threshold value.

(28) The information processing device according to (21), wherein the base station is a base station selected based on interference information.

(29) The information processing device according to (21), wherein a communication cost with respect to communication service for the information processing device through the base station is set based on information relating to a purchase history in a store.

(30) The information processing device according to (21), wherein the control unit controls display of the predictive migration path.

(31) The information processing device according to (21), wherein the base station is within a predetermined range including the predictive migration path.

(32) The information processing device according to (21), wherein the control unit controls display of an indicator around the information of the base station when the information of the base station is selected.

(33) The information processing device according to (21), wherein the control unit controls display of an indicator indicating migration of the device.

(34) The information processing device according to (33), wherein the indicator indicating migration of the device is displayed when the information of the base station is selected.

(35) The information processing device according to (21), wherein the control unit controls display of an indication of traveling direction of the device.

(36) The information processing device according to (35), wherein the indication of traveling direction of the device indicates a shortest path from a current position of the device to the base station.

(37) The information processing device according to (35), wherein the indication of traveling direction of device is determined based on information of migration of the device.

(38) The information processing device according to (21), wherein the control unit controls display of a predetermined base station based on a determination of whether a predetermined condition based on communication speed is satisfied.

(39) An information processing method including controlling, by a processor, display of information of a base station of a first wireless communication method existing around a predictive migration path by using position information of the information processing device, the information processing device using a second wireless communication method.

(40) A non-transitory recording medium recorded with a program executable by a computer, the program including controlling display of information of a base station of a first wireless communication method existing around a predictive migration path by using position information of the information processing device, the information processing device using a second wireless communication method.

REFERENCE SIGNS LIST

100 communication system
101 network
110 and 120, 620 communication control device
111 and 121 first base station
112 and 122 cell
131 to 137 second base station
200, 220, 250, and 610 wireless communication device
201 wireless communication unit
202, 221, and 302 position information acquisition unit
203 base station selection unit
204, 225, and 252 display control unit
205 and 226 map information memory unit
206 and 227 display unit
207 and 228 manipulation reception unit
210 base station information memory unit
222 and 303 position information memory unit
223 wireless communication unit
224, 306, 360, 370, 375, and 390 base station information memory unit
251 first wireless communication unit
253 judgment unit
254 power management unit
255 second wireless communication unit
300, 310, 315, 340, 345, 380, 385, 500, 520, and 630 information processing device
301 communication unit
304 migration path calculation unit
305 first selection unit
307, 312, 317, 342, 347, and 387 second selection unit
308, 382, 501, and 523 transmission control unit
311 communication history information acquisition unit
316 base station congestion degree information acquisition unit
320 communication history information memory unit
330 information memory unit for base station congestion degree
341 product type information acquisition unit
346 communication cost calculation unit 350 product type information memory unit
381 setting information memory unit
386 interference information acquisition unit
510 store information memory unit
521 purchase history information acquisition unit
522 communication cost setting unit
530 purchase history information memory unit

The invention claimed is:

1. An information processing device, comprising:
  circuitry configured to:
    control a display unit to:
      display first information of a first base station based on position information of the information processing device,
        wherein the first base station uses a first wireless communication method to communicate with the information processing device, and
        wherein the first base station is in a specific proximity of a predictive migration path;
    obtain a degree of congestion in the first base station, as a ratio of dynamic occupation to a total capacity for the first base station;
    obtain a degree of congestion in a second base station;
    output map information associated with the degree of congestion in the second base station; and
    select the second base station, based on the degree of congestion in the first base station and a speed of communication between the information processing device and the second base station.

2. The information processing device of claim 1, wherein a first coverage of the first base station is wider than a second coverage of the second base station.

3. The information processing device of claim 1, wherein the information processing device is a mobile wireless communication device.

4. The information processing device of claim 1, further comprising a memory, wherein the circuitry is further configured to:
  store the position information in the memory; and
  calculate the predictive migration path based on the position information.

5. The information processing device of claim 4, wherein the circuitry is further configured to acquire the position information from a server.

6. The information processing device of claim 1,
  wherein the circuitry is further configured to control the display unit to display second information of the second base station based on a status of a user, and
  wherein the status of the user corresponds to a latest communication cost.

7. The information processing device of claim 6, wherein the status of the user is based on a comparison of the latest communication cost with a threshold value.

8. The information processing device of claim 7,
  wherein the circuitry is further configured to control the display unit to display the second information of the second base station based on the status of the user, and
  wherein the status of the user corresponds to the latest communication cost that is larger than the threshold value.

9. The information processing device of claim 1, wherein the circuitry is further configured to select the first base station based on interference information.

10. The information processing device of claim 1,
  wherein the circuitry is further configured to set a communication cost of a communication service based on information corresponding to a purchase history in a store, and
  wherein the communication service is for the information processing device through the first base station.

11. The information processing device of claim 1, wherein the circuitry is further configured to control the display unit to display the predictive migration path.

12. The information processing device of claim 1, wherein the first base station is within a geographical area range that includes the predictive migration path.

13. The information processing device of claim 1, wherein the circuitry is further configured to control the display unit to display an indicator along with the first information of the first base station based on a selection of the first information of the first base station.

14. The information processing device of claim 1, wherein the circuitry is further configured to control the display unit to display an indicator that indicates migration of the information processing device.

15. The information processing device of claim 14, wherein the display of the indicator that indicates migration is displayed based on a selection of the first information of the first base station.

16. The information processing device of claim 1, wherein the circuitry is further configured to control the display unit to display an indication of a direction of travel of the information processing device.

17. The information processing device of claim 16, wherein the indication of the direction of travel of the information processing device indicates a shortest path from a current position of the information processing device to the first base station.

18. The information processing device of claim 16, wherein the circuitry is further configured to determine the indication of the direction of travel of the information processing device based on information of migration of the information processing device.

19. The information processing device of claim 1, wherein the circuitry is further configured to control the display unit to display information of the second base station based on the speed of communication.

20. An information processing method, comprising:
  in an information processing device:
    controlling display of first information of a first base station based on position information of the information processing device,
      wherein the first base station uses a first wireless communication method to communicate with the information processing device, and
      wherein the first base station is in a specific proximity of a predictive migration path;
    obtaining a degree of congestion in the first base station, as a ratio of dynamic occupation to a total capacity for the first base station;
    obtaining a degree of congestion in a second base station;
    outputting map information associated with the degree of congestion in the second base station; and
    selecting the second base station, based on the degree of congestion in the first base station and a speed of communication between the information processing device and the second base station.

21. A non-transitory computer-readable medium having stored thereon computer-executable instructions that when executed by an information processing device, cause the information processing device to execute operations, the operations comprising:
    controlling display of first information of a first base station based on position information of the information processing device,
        wherein the first base station uses a first wireless communication method to communicate with the information processing device, and
        wherein the first base station is in a specific proximity of a predictive migration path;
    obtaining a degree of congestion in the first base station, as a ratio of dynamic occupation to a total capacity for the first base station;
    obtaining a degree of congestion in a second base station;
    outputting map information associated with the degree of congestion in the second base station; and
    selecting the second base station, based on the degree of congestion in the first base station and a speed of communication between the information processing device and the second base station.

22. An information processing system, comprising:
circuitry configured to:
    obtain wireless communication history information of a mobile terminal;
    obtain first information of a first base station that uses a first communication method;
    obtain second information of a second base station that uses a second communication method;
    obtain map information based on a position of the mobile terminal;
    associate the map information with the first information and the second information;
    display the map information associated with the first information and the second information;
    obtain a degree of congestion in the first base station, as a ratio of dynamic occupation to a total capacity for the first base station;
    obtain a degree of congestion in the second base station;
    output map information associated with the degree of congestion in the second base station; and
    select the second base station, based on the degree of congestion in the first base station and a speed of communication between the mobile terminal and the second base station.

23. An information processing device, comprising:
circuitry configured to:
control a display unit to
    display first information of a first base station based on position information of the information processing device,
        wherein the first base station uses a first wireless communication method to communicate with the information processing device, and
        wherein the first base station is in a specific proximity of a predictive migration path;
    obtain a degree of congestion in the first base station, as a ratio of dynamic occupation to a total capacity for the first base station;
    obtain a degree of congestion in a second base station;
    output map information associated with the degree of congestion in the second base station;
    set a communication cost of a communication service based on information corresponding to a purchase history in a store, wherein the communication service is for the information processing device through the first base station; and
    select the second base station, based on the degree of congestion in the first base station and a speed of communication between the information processing device and the second base station.

\* \* \* \* \*